United States Patent
Hasegawa

(10) Patent No.: US 6,961,223 B2
(45) Date of Patent: Nov. 1, 2005

(54) SPIN-VALVE THIN-FILM MAGNETIC ELEMENT WITHOUT SENSING CURRENT SHUNT AND THIN-FILM MAGNETIC HEAD INCLUDING THE SAME

(75) Inventor: Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 336 days.

(21) Appl. No.: 10/015,091

(22) Filed: Oct. 23, 2001

(65) Prior Publication Data

US 2002/0051328 A1 May 2, 2002

(30) Foreign Application Priority Data

Oct. 27, 2000 (JP) ........................................ 2000-328276
Nov. 21, 2000 (JP) ........................................ 2000-354145

(51) Int. Cl.[7] ................................................. G11B 5/39
(52) U.S. Cl. ................................... 360/322; 360/324.1
(58) Field of Search ........................... 360/322, 324.1, 360/324.11, 324.12, 327.1

(56) References Cited

U.S. PATENT DOCUMENTS

| | | | | |
|---|---|---|---|---|
| 4,782,414 A | * | 11/1988 | Krounbi et al. | ............. 360/320 |
| 5,641,557 A | | 6/1997 | Ishiwata | |
| 5,664,316 A | * | 9/1997 | Chen et al. | ............. 29/603.08 |
| 5,876,843 A | | 3/1999 | Ishiwata | |
| 5,936,810 A | * | 8/1999 | Nakamoto et al. | ........ 360/324.1 |
| 6,118,621 A | * | 9/2000 | Ohsawa et al. | ............. 360/327 |
| 6,118,624 A | * | 9/2000 | Fukuzawa et al. | ..... 360/324.12 |
| 6,407,004 B1 | * | 6/2002 | Kimura et al. | ............. 438/720 |
| 6,535,363 B1 | * | 3/2003 | Hosomi et al. | ........... 360/324.1 |
| 6,587,315 B1 | * | 7/2003 | Aoki et al. | ................. 360/322 |
| 6,744,607 B2 | * | 6/2004 | Freitag et al. | ............... 360/322 |
| 2003/0011943 A1 | * | 1/2003 | Webb et al. | ............. 360/324.1 |

FOREIGN PATENT DOCUMENTS

| | | | |
|---|---|---|---|
| JP | 2000-207713 | 7/2000 | |
| JP | 2000-216455 | 8/2000 | |
| JP | 2000276719 A | * 10/2000 | ............ G11B/5/39 |
| JP | 2000285414 A | * 10/2000 | ............ G11B/5/39 |
| JP | 2001-43512 | 2/2001 | |

* cited by examiner

Primary Examiner—Brian E. Miller
(74) Attorney, Agent, or Firm—Brinks Hofer Gilson & Lione

(57) ABSTRACT

A spin-valve thin-film magnetic element includes a laminate including a free magnetic layer and a pinned magnetic layer. A pair of hard bias layers is provided on both sides of the laminate to orient the magnetic moment of the free magnetic layer in one direction. A pair of insulating layers extend over the hard bias layers and both top ends of the laminate in the track width direction. A pair of lead layers is provided on the insulating layers. Each lead layer has an overlay section extending over the insulating layer and the laminate. The edge of the overlay section is in direct contact with the central portion of the laminate.

26 Claims, 34 Drawing Sheets

SPIN-VALVE THIN-FILM MAGNETIC ELEMENT WITHOUT SENSING CURRENT SHUNT AND THIN-FILM MAGNETIC HEAD INCLUDING THE SAME

BACKGROUND OF THE INVENTION

1. Field of the Invention

The present invention relates to spin-valve thin-film magnetic elements, thin-film magnetic heads, floating magnetic heads, and methods for making the spin-valve thin-film magnetic elements. In particular, the present invention relates to a technology for preventing a sensing current shunt in a spin-valve thin-film magnetic element in order to reduce side reading.

2. Description of the Related Art

Spin-valve thin-film magnetic elements are a type of giant magnetoresistive element (GMR) exhibiting a giant magnetoresistive effect and detecting recording magnetic fields from recording media such as a hard disk.

The spin-valve thin-film magnetic elements have relatively simple structures and high rates of changes in resistance to external magnetic fields and exhibit high sensitivity to weak magnetic fields.

FIG. 19 is a cross-sectional view of a conventional dual spin-valve thin-film magnetic element viewed from the air-bearing surface (ABS) which faces a recording medium. In this element, a nonmagnetic conductive layer, a pinned magnetic layer, and an antiferromagnetic layer are deposited on each of two sides of a free magnetic layer. In FIG. 19, the recording medium such as a hard disk moves in the Z direction and generates a leakage magnetic field in the Y direction.

The conventional spin-valve thin-film magnetic element 301 shown in FIG. 19 includes a substrate 302 and a laminate 312 formed on the substrate 302. The laminate 312 includes an underlayer 303 composed of Ta or the like, a first antiferromagnetic layer 304, a first pinned magnetic layer 305, a first nonmagnetic conductive layer 306 composed of Cu or the like, a free magnetic layer 307, a second nonmagnetic conductive layer 308 composed of Cu or the like, a second pinned magnetic layer 309, a second antiferromagnetic layer 310, and a protective film 311 from the bottom. A pair of hard bias layers 332 is formed on both sides of the laminate 312, and a pair of lead layers 334 is formed on the hard bias layers 332. The hard bias layers 332 are composed of a CoPt alloy or the like and the lead layers 334 are composed of Cu or the like.

The first pinned magnetic layer 305 is a laminate of a first pinned ferromagnetic sublayer 305a, a first nonmagnetic interlayer 305b, and a second pinned ferromagnetic sublayer 305c. The second pinned ferromagnetic sublayer 305c is thicker than the first pinned ferromagnetic sublayer 305a.

The first pinned ferromagnetic sublayer 305a is magnetically coupled with the first antiferromagnetic layer 304. Thus, the magnetic moment of the first pinned ferromagnetic sublayer 305a is pinned in the Y direction. Furthermore, the second pinned ferromagnetic sublayer 305c is antiferromagnetically coupled with the first pinned ferromagnetic sublayer 305a. Thus, the magnetic moment of the second pinned ferromagnetic sublayer 305c is pinned in the opposite direction of the Y direction.

As described above, the magnetic moments of the first pinned ferromagnetic sublayer 305a and the first nonmagnetic interlayer 305b are antiparallel and mutually counteract each other. Since the second pinned ferromagnetic sublayer 305c is thicker than the first pinned ferromagnetic sublayer 305a, a small magnetic moment remains in the second pinned ferromagnetic sublayer 305c. Thus, the overall magnetic moment of the first pinned magnetic layer 305 is pinned in the opposite direction of the Y direction in the drawing.

The second pinned magnetic layer 309 is a laminate of a third pinned ferromagnetic sublayer 309a, a second nonmagnetic interlayer 309b, and a fourth pinned ferromagnetic sublayer 309c. The third pinned ferromagnetic sublayer 309a is thicker than the fourth pinned ferromagnetic sublayer 309c.

The fourth pinned ferromagnetic sublayer 309c is magnetically coupled with the second antiferromagnetic layer 310. Thus, the magnetic moment of the fourth pinned ferromagnetic sublayer 309c is pinned in the opposite direction of the Y direction. Furthermore, the third pinned ferromagnetic sublayer 309a is antiferromagnetically coupled with the fourth pinned ferromagnetic sublayer 309c. Thus, the magnetic moment of the third pinned ferromagnetic sublayer 309a is pinned in the Y direction.

The magnetic moment of the third pinned ferromagnetic sublayer 309a and the magnetic moment of the fourth pinned ferromagnetic sublayer 309c also mutually counteract each other in the second pinned magnetic layer 309. Since the third pinned ferromagnetic sublayer 309a is thicker than the fourth pinned ferromagnetic sublayer 309c, a magnetic moment remains in the third pinned ferromagnetic sublayer 309a. Thus, the overall magnetic moment of the second pinned magnetic layer 309 is pinned in the Y direction in the drawing.

The first pinned ferromagnetic sublayer 305a and the second pinned ferromagnetic sublayer 305c in the first pinned magnetic layer 305 and the third pinned ferromagnetic sublayer 309a and the fourth pinned ferromagnetic sublayer 309c in the second pinned magnetic layer 309 are antiferromagnetically coupled with each other. Moreover, each of the second pinned ferromagnetic sublayer 305c and the third pinned ferromagnetic sublayer 309a has a residual magnetic moment. Accordingly, the first pinned magnetic layer 305 and the second pinned magnetic layer 309 exhibit a synthetic ferrimagnetic state.

The free magnetic layer 307 is a laminate of a first antidiffusion sublayer 307a composed of Co or the like, a free ferromagnetic layer 307b composed of a NiFe alloy, and a second antidiffusion sublayer 307c composed of Co or the like. The first antidiffusion sublayer 307a and the second antidiffusion sublayer 307c prevent mutual diffusion between the first nonmagnetic conductive layer 306 and the second nonmagnetic conductive layer 308.

The magnetic moment of the free magnetic layer 307 is oriented in the $X_1$ direction (track width direction) in the drawing by a bias magnetic field from the hard bias layers 332. Accordingly, the magnetic moment of the free magnetic layer 307 is substantially orthogonal to the magnetic moment of the first pinned magnetic layer 305 and the magnetic moment of the second pinned magnetic layer 309.

The lead layers 334 on the hard bias layers 332 extend from both sides to the center of the laminate 312 in the $X_1$ direction (track width direction), and partly overhang on the both end portions of the laminate 312 in the track width direction to form overlay sections 334a thereof. These overlay sections 334a are distant from each other at a distance Tw on the laminate 312.

The first antiferromagnetic layer 304 extends towards both sides in the $X_1$ direction (track width direction) compared to the first pinned magnetic layer 305 and the free magnetic layer 307 to form protrusions 304a. The protrusions 304a and the hard bias layers 332 are separated by bias underlayers 331 composed of Ta, W, or Cr. The hard bias layers 332 and the lead layers 334 are separated by interlayers 333 composed of Ta, W, or Cr.

In this spin-valve thin-film magnetic element 301, the lead layers 334 supply a sensing current to the laminate 312. The magnetic moment of the free magnetic layer 307 varies from the $X_1$ direction to the Y direction in response to a leakage magnetic field in the Y direction from a magnetic recording medium. The electrical resistance of the element changes in connection with the relationship between the change in the magnetic moment of the free magnetic layer 307 and the magnetic moments of the first and second pinned magnetic layer 305 and 309, respectively. This effect is called a magnetoresistive effect (MR effect). The leakage magnetic field from the magnetic recording medium is detected as a change in voltage caused by the change in electrical resistance.

In this spin-valve thin-film magnetic element 301, the sensing current primarily flows into the laminate 312 from the lead layers 334 via the vicinities of the edges 334b of the overlay sections 334a, as shown in FIG. 19. Thus, in the laminate 312, the sensing current is concentrated in the central region which is not covered by the overlay sections 334a. This central region, therefore, exhibits a noticeable MR effect and high detection sensitivity to the leakage magnetic field from the magnetic recording medium. This central region is referred to as a sensitive region S.

In contrast, in regions covered by the overlay sections 334a, the sensing current is extremely low compared with the sensitive region S. These regions exhibit a poor MR effect and thus low detection sensitivity to the leakage magnetic field. These regions are referred to as insensitive regions N.

As described above, the overlay sections 334a form the sensitive region S which contributes to reading the recording magnetic field from the magnetic recording medium and the insensitive regions N which do not contribute to the reading. The width Tw of the sensitive region S corresponds to the track width of the spin-valve thin-film magnetic element 301. In other words, the track width of the spin-valve thin-film magnetic element 301 can be reduced by providing the overlay sections 334a.

In such a configuration, however, the sensing current includes a shunt component J2 which flows into the laminate 312 from the base portion 334c of one overlay section 334a and a shunt component J3 which flows into other layers at the substrate side from one lead layer 334 via the corresponding hard bias layer 332. These shunt currents J2 and J3 are not negligible.

These shunt currents J2 and J3 generate a change in magnetoresistance in the insensitive regions N. These insensitive regions N generate signals on the recording track of the magnetic recording medium.

When the width of the recording tracks and the distance between the recording tracks are reduced to increase recording density, side reading in which signals on the adjoining recording tracks are read out occurs during reading the signals which are read out in the sensitive region S. Such side reading may adversely affect as noise to the output signal and may produce erroneous results.

Furthermore, essential requirements for spin-valve thin-film magnetic elements are improvements in output characteristics and sensitivity.

SUMMARY OF THE INVENTION

It is objects of the present invention to provide the following:

(1) a spin-valve thin-film magnetic element exhibiting improved output characteristics;

(2) a spin-valve thin-film magnetic element which does not generate side reading; and (3) a method for making the spin-valve thin-film magnetic element.

According to an aspect of the present invention, a spin-valve thin-film magnetic element comprises: a laminate comprising at least a free magnetic layer and a pinned magnetic layer and exhibiting a magnetoresistive effect; a pair of hard bias layers lying at least on both sides of the free magnetic layer in the track width direction and orienting the magnetic moment of the free magnetic layer in one direction; a pair of insulating layers extending over the hard bias layers and both ends of the laminate in the track width direction; and a pair of lead layers extending on said pair of insulating layers, wherein said pair of lead layers have overlay sections which extend towards the center of the laminate and are in direct contact with parts of the laminate.

According to the spin-valve thin-film magnetic element of the present invention, only the edges of the overlay sections of the lead layers are in contact with the laminate and the other portions of the lead layers are insulated from the laminate and the hard bias layers. Thus, the insulating layers lying at both sides of the laminate in the track width direction block the detecting current shunt. Since the detecting current exclusively flows into the laminate through the edge of one of the overlay sections, the both ends of the laminate do not exhibit a magnetoresistive effect. Accordingly, the spin-valve thin-film magnetic element does not exhibit side reading.

Preferably, the width of the edge of each of the overlay sections in the track width direction is in the range of 0.01 μm to 0.05 μm.

Each lead layer and the laminate thereby have a large contact area which decreases the contact resistance at the edge and conducts a large sensing current to the laminate.

Preferably, the insulating layers comprise at least one oxide selected from the group consisting of aluminum oxide, silicon oxide, tantalum oxide, titanium oxide, zirconium oxide, hafnium oxide, chromium oxide, vanadium oxide, and niobium oxide.

Preferably, each of the insulating layers has a thickness in the range of 0.5 nm to 20 nm.

The above material and the thickness ensure blocking the sensing current shunt at both ends of the laminate in the track width direction, thus preventing side reading of the spin-valve thin-film magnetic element.

Preferably, each of the overlay sections has a thickness in the range of 0.1 μm to 0.3 μm in the track width direction.

By this width of the overlay sections, the both ends of the free magnetic layer of which the magnetic moment is fixed by a hard bias magnetic field function as insensitive regions having substantially the same width as the width of the overlay sections, improving the reading sensitivity of the spin-valve thin-film magnetic element.

Preferably, the laminate comprises the free magnetic layer, a nonmagnetic conductive layer, and an antiferromagnetic layer, for pinning the magnetic moment of the pinned magnetic layer by an exchange coupling magnetic field, which are deposited in that order.

The laminate may comprise a nonmagnetic conductive layer, the pinned magnetic layer, and an antiferromagnetic layer, for pinning the magnetic moment of the pinned magnetic layer by an exchange coupling magnetic field, which are deposited, in that order, on each of the two sides of the free magnetic layer in the thickness direction.

More preferably, the free magnetic layer exhibits a synthetic ferrimagnetic state. An exemplary free magnetic layer having the synthetic ferrimagnetic state is a laminate of at least two ferromagnetic layers and at least one nonmagnetic interlayer disposed therebetween. In such a configuration, the magnetic moments of the adjacent two ferromagnetic layers are antiparallel to each other and the overall free magnetic layer exhibits the ferrimagnetic state.

Preferably, the pinned magnetic layer exhibits a synthetic ferrimagnetic state. An exemplary pinned magnetic layer having the synthetic ferrimagnetic state is a laminate of at least two ferromagnetic layers and at least one nonmagnetic interlayer disposed therebetween. In such a configuration, the magnetic moments of the adjacent two ferromagnetic layers are antiparallel to each other and the overall pinned magnetic layer exhibits the ferrimagnetic state.

According to another aspect of the present invention, a thin-film magnetic head comprises the above spin-valve thin-film magnetic element, the spin-valve thin-film magnetic element functioning as a read element for magnetically recorded information.

This thin-film magnetic head including the spin-valve thin-film magnetic element according to the present invention as a read element exhibits high read output for recorded information and a low possibility of side reading head.

According to another aspect of the present invention, a floating magnetic head comprises a slider and the above thin-film magnetic head.

This floating magnetic head exhibits high read output for magnetic information and a low possibility of side reading.

According to another aspect of the present invention, a method for making a spin-valve thin-film magnetic element comprises: a laminate forming step comprising: forming a laminate including at least a free magnetic layer and a pinned magnetic layer on a substrate, forming a first lift-off resist layer on the laminate, the first lift-off resist layer having a pair of side faces and a pair of incisions which are provided on the laminate at both sides in the track width direction such that the pair of incisions lies between the side faces and a contact face which is in contact with the laminate, and irradiating the laminate with etching particles so as to etch the entirety or a part of the layers constituting the laminate lying at the outer region of each of the side faces of the first lift-off resist layer in the track width direction, the laminate thereby substantially having a trapezoidal cross-section; a bias layer forming step for depositing first sputtering particles on the two sides of the laminate at a sputtering angle $\theta_1$ with respect to the substrate to form a pair of hard bias layers up to at least the level of the free magnetic layer; an insulating layer forming step for depositing second sputtering particles at a sputtering angle $\theta_2$, wherein $\theta_1>\theta_2$, with respect to the substrate to form a pair of insulating layers which extend over the hard bias layers and the laminate in the incisions; a second resist layer forming step comprising: removing the first lift-off resist layer, and forming a second lift-off resist layer substantially in the center of the upper face of the laminate, the second lift-off resist layer having a contact face which is narrower than that of the first lift-off resist layer, a pair of side faces provided in the track width direction, and a pair of incisions, each incision provided between the corresponding side face and the contact face; and a lead layer forming step for depositing third sputtering particles to form a pair of lead layers which extends over the insulating layers and the laminate in the incisions of the second lift-off resist layer.

As described above, the insulating layers are deposited on the laminate in the incisions of the first lift-off resist layer at the sputtering angle $\theta_2$ and the lead layers are deposited on the laminate in the incisions of the second lift-off resist layer. The insulating layers extend on the both ends of the laminate in the track width direction and the lead layers further extend toward the center of the laminate and are in contact with the laminate. The resulting spin-valve thin-film magnetic element does not exhibit side reading.

After the second lift-off resist layer is removed, the laminate in the incisions may be partly etched by being irradiated with second etching particles.

This etching process cleans the faces of the laminate which will be in contact with the lead layers and ensures close contact between the lead layers and the laminate. Thus, the sensing current effectively flows into the laminate.

Preferably, the sputtering angle $\theta_1$ is in the range of 60° to 90° and the sputtering angle $\theta_2$ is in the range of 40° to 80°.

Since the sputtering angle $\theta_2$ during the formation of the insulating layers is smaller than the sputtering angle $\theta_1$ during the formation of the hard bias layers, the insulating layers are formed on the laminate in the incisions of the first lift-off resist layer. Thus, the sensing current shunt is effectively prevented.

According to another aspect of the present invention, a method for making a spin-valve thin-film magnetic element comprises: a laminate forming step comprising: forming a laminate including at least a free magnetic layer and a pinned magnetic layer on a substrate, forming a first lift-off resist layer on the laminate, the first lift-off resist layer having a pair of side faces and a pair of incisions which are provided on the laminate at both sides in the track width direction such that the pair of incisions lie between the side faces and a contact face which is in contact with the laminate, and irradiating the laminate with etching particles so as to etch the entirety or a part of the layers constituting the laminate lying at the outer region of each of the side faces of the first lift-off resist layer in the track width direction, the laminate thereby substantially having a trapezoidal cross-section; a bias layer forming step for depositing first sputtering particles on the two sides of the laminate to form a pair of hard bias layers up to at least the level of the free magnetic layer; a second resist layer forming step comprising: removing the first lift-off resist layer, and forming a second lift-off resist layer substantially in the center of the upper face of the laminate, the second lift-off resist layer having a contact face which is narrower than that of the first lift-off resist layer, a pair of side faces provided in the track width direction, and a pair of incisions, each incision provided between the corresponding side face and the contact face; an insulating layer forming step for depositing second sputtering particles at a sputtering angle $\theta_3$ with respect to the substrate to form a pair of insulating layers which extend over the hard bias layers and the laminate lying at the outer regions of the side faces of the second lift-off resist layer in the track width direction; and a lead layer forming step for depositing third sputtering particles at a sputtering angle $\theta_4$, wherein $\theta_3>\theta_4$, with respect to the substrate to form a pair of lead layers which extends over the insulating layers and the laminate in the incisions of the second lift-off resist layer.

As described above, the insulating layers are deposited on the outer regions of the both sides of the second lift-off resist layer in the track width direction at the sputtering angle $\theta_3$ with respect to the substrate and the lead layers are deposited on the laminate in the incisions of the second lift-off resist layer at the sputtering angle $\theta_4$. The insulating layers extend on the both ends of the laminate in the track width direction and the lead layers further extend toward the center of the laminate and are in contact with the laminate. The resulting spin-valve thin-film magnetic element does not exhibit side reading.

After the insulating layers are formed, the laminate in the incisions of the second lift-off resist layer may be partly etched by being irradiated with other etching particles.

This etching process cleans the faces of the laminate which will be in contact with the lead layers and ensures close contact between the lead layers and the laminate. Thus, the sensing current effectively flows into the laminate.

Preferably, the sputtering angle $\theta_3$ is in the range of 60° to 90° and the sputtering angle $\theta_4$ is in the range of 40° to 80°.

Since the sputtering angle $\theta_4$ during the formation of the lead layers is smaller than the sputtering angle $\theta_3$ during the formation of the insulating layers, the lead layers are formed in the incisions of the first lift-off resist layer. Thus, the lead layers securely come into contact with the laminate.

According to another aspect of the present invention, a spin-valve thin-film magnetic element comprises: a substrate; a laminate on the substrate, the laminate comprising at least a free magnetic layer and a pinned magnetic layer and exhibiting a magnetoresistive effect; a pair of hard bias layers lying at least on both sides of the free magnetic layer in the track width direction and orienting the magnetic moment of the free magnetic layer in one direction; a pair of lead layers lying at least on the hard bias layers; and a pair of insulating layers, each lying at least between one side face of the laminate in the track width direction and each hard bias layer, wherein the pair of lead layers have overlay sections which extend on parts of the laminate, the edges of the overlay sections being in contact with the laminate.

According to the spin-valve thin-film magnetic element of the present invention, the sides of the laminate are insulated from the hard bias layers and the lead layers by the insulating layers. Thus, the insulating layers lying at both sides of the laminate in the track width direction block the detecting current shunt. Since the detecting current exclusively flows into the laminate through the edge of one of the overlay sections, the both ends of the laminate do not exhibit a magnetoresistive effect. Accordingly, the spin-valve thin-film magnetic element does not exhibit side reading.

Preferably, each of the insulating layers has a thickness in the range of 0.5 nm to 5 nm at the side faces of the laminate.

At a thickness less than 0.5 nm, pinholes would be formed in the insulating layers. At a thickness exceeding 5 nm, the insulating layers shield the bias magnetic field from the hard bias layers and the magnetic moment of the free magnetic layer may not be oriented in a predetermined direction.

Preferably, the insulating layers comprise at least one oxide selected from the group consisting of aluminum oxide, silicon oxide, tantalum oxide, titanium oxide, zirconium oxide, hafnium oxide, chromium oxide, vanadium oxide, and niobium oxide.

The above material ensures blocking the sensing current shunt at both ends of the laminate in the track width direction, thus preventing side reading of the spin-valve thin-film magnetic element.

Preferably, the insulating layers further extend between the hard bias layers and the substrate. The sensing current shunt into the laminate from one lead layer through the corresponding hard bias layer is thereby prevented.

Preferably, the hard bias layers and the insulating layers are separated by bias underlayers. The hard bias layers formed on the bias underlayers have a large coercive force and a large remanence ratio, thus increasing a bias magnetic field which is required for a single-domain alignment of the free magnetic layer.

Preferably, the insulating layers further extend on the top ends of the laminate in the track width direction, and the overlay sections of the leads extend toward the center of the laminate compared with the insulating layers and are in contact with the laminate. Only the edges of the overlay sections are in contact with the laminate and other portions of the lead layers are insulating from the laminate and the hard bias layers by the insulating layers. Since the sensing current shunt is blocked by the insulating layers, the sensing current exclusively flows into the laminate from the edge of one of the overlay sections, thus preventing side reading of the spin-valve thin-film magnetic element.

Preferably, the insulating layers have a thickness in the range of 0.5 nm to 20 nm at top ends of the laminate. The insulating layers securely block the sensing current shunt to the ends of the laminate in the track width direction, securely preventing side reading.

Preferably, the edges of the overlay sections in the track width direction have a thickness in the range of 0.01 $\mu$m to 0.05 $\mu$m in the track width direction. Since the lead layers are in contact with the laminate at large areas, the contact resistance therebetween is reduced. Thus, a large detecting current flows into the laminate.

Preferably, the edges of the overlay sections in the track width direction have a thickness in the range of 0.1 $\mu$m to 0.3 $\mu$m. The ends of the free magnetic layer of which the magnetic moment is fixed by the hard bias magnetic field function as insensitive regions having the same width as that of the overlay sections, improving the read sensitivity.

Preferably, the laminate comprises the free magnetic layer, a nonmagnetic conductive layer, and an antiferromagnetic layer, for pinning the magnetic moment of the pinned magnetic layer by an exchange coupling magnetic field, which are deposited in that order.

The laminate may comprise a nonmagnetic conductive layer, the pinned magnetic layer, and an antiferromagnetic layer, for pinning the magnetic moment of the pinned magnetic layer by an exchange coupling magnetic field, which are deposited, in that order, on each of the two sides of the free magnetic layer in the thickness direction.

More preferably, the free magnetic layer exhibits a synthetic ferrimagnetic state. An exemplary free magnetic layer having the synthetic ferrimagnetic state is a laminate of at least two ferromagnetic layers and at least one nonmagnetic interlayer disposed therebetween. In such a configuration, the magnetic moments of the adjacent two ferromagnetic layers are antiparallel to each other and the overall free magnetic layer exhibits the ferrimagnetic state.

Preferably, the pinned magnetic layer exhibits a synthetic ferrimagnetic state. An exemplary pinned magnetic layer having the synthetic ferrimagnetic state is a laminate of at least two ferromagnetic layers and at least one nonmagnetic interlayer disposed therebetween. In such a configuration, the magnetic moments of the adjacent two ferromagnetic layers are antiparallel to each other and the overall pinned magnetic layer exhibits the ferrimagnetic state.

Preferably, other insulating layers extend between the hard bias layers and the lead layers and to the ends of the laminate in the track width direction. The insulating layers reduce the sensing current shunt between the lead layers and the hard bias layers. Thus, the shunt from the sides of the laminate is more effectively prevented. These insulating layers and the above-mentioned insulating layer may have an integrated structure and may be composed of the same material.

According to another aspect of the present invention, a thin-film magnetic head comprises the above mentioned spin-valve thin-film magnetic element, the spin-valve thin-film magnetic element functioning as a read element for magnetically recorded information.

According to another aspect of the present invention, a floating magnetic head comprising a slider and the above-mentioned thin-film magnetic head.

This thin-film magnetic head including the spin-valve thin-film magnetic element according to the present invention as a read element exhibits high read output for recorded information and a low possibility of side reading head.

This floating magnetic head exhibits high read output for magnetic information and a low possibility of side reading.

According to another aspect of the present invention, a method for making a spin-valve thin-film magnetic element comprises: a laminate forming step comprising: forming a laminate including at least a free magnetic layer and a pinned magnetic layer on a substrate, forming a first lift-off resist layer on the laminate, the first lift-off resist layer having a pair of side faces and a pair of incisions which are provided on the laminate at both sides in the track width direction such that the pair of incisions lies between the side faces and a contact face which is in contact with the laminate, and irradiating the laminate with first etching particles so as to etch the entirety or a part of the layers constituting the laminate lying at the outer region of each of the side faces of the first lift-off resist layer in the track width direction, the laminate thereby substantially having a trapezoidal cross-section; a first insulating layer forming step for depositing first sputtering particles at a sputtering angle $\theta_{d1}$ with respect to the substrate to form insulating layers which extend over the side faces of the laminate and the top ends of the laminate in the incisions; a bias layer forming step for depositing second sputtering particles on the two sides of the laminate at a sputtering angle $\theta_{d2}$, wherein $\theta_{d2} > \theta_{d1}$, with respect to the substrate to form a pair of hard bias layers on the insulating layers up to at least the level of the free magnetic layer; a second resist layer forming step comprising: removing the first lift-off resist layer, and forming a second lift-off resist layer substantially in the center of the upper face of the laminate, the second lift-off resist layer having a contact face which is narrower than that of the first lift-off resist layer, a pair of side faces provided in the track width direction, and a pair of incisions, each incision provided between the corresponding side face and the contact face; and a lead layer forming step for depositing third sputtering particles to form a pair of lead layers which extends over the insulating layers and the laminate in the incisions of the second lift-off resist layer.

In this method, after the second lift-off resist layer is removed, the laminate in the incisions may be partly etched by being irradiated with second etching particles. This etching process cleans the faces of the laminate which will be in contact with the lead layers and ensures close contact between the lead layers and the laminate. Thus, the sensing current effectively flows into the laminate.

Preferably, the sputtering angle $\theta_{d1}$ is in the range of 40° to 80° and the sputtering angle $\theta_{d2}$ is in the range of 60° to 90°. Since the sputtering angle $\theta_{d2}$ for forming the insulating layers is smaller than the sputtering angle $\theta_{d2}$ for forming the hard bias layers, the insulating layers can be formed in the incisions of the first lift-off resist layer. Accordingly, the sensing current shunt can be further decreased.

Preferably, after the hard bias layers are deposited, fourth sputtering particles are deposited to form insulating layers on the hard bias layers. The insulating layers more effectively block the sensing current shunt from the lead layers to the hard bias layers.

According to another aspect of the present invention, a method for making a spin-valve thin-film magnetic element comprises: a laminate forming step comprising: forming a laminate including at least a free magnetic layer and a pinned magnetic layer on a substrate, forming a first lift-off resist layer on the laminate, the first lift-off resist layer having a pair of side faces and a pair of incisions which are provided on the laminate at both sides in the track width direction such that the pair of incisions lies between the side faces and a contact face which is in contact with the laminate, and irradiating the laminate with etching particles so as to etch the entirety or a part of the layers constituting the laminate lying at the outer region of each of the side faces of the first lift-off resist layer in the track width direction, the laminate thereby substantially having a trapezoidal cross-section; a first insulating layer forming step for depositing first sputtering particles to form insulating layers which extend over the side faces of the laminate; a bias layer forming step for depositing second sputtering particles on the two side faces of the laminate to form a pair of hard bias layers up to at least the level of the free magnetic layer; a second resist layer forming step comprising: removing the first lift-off resist layer, and forming a second lift-off resist layer substantially in the center of the upper face of the laminate, the second lift-off resist layer having a contact face which is narrower than that of the first lift-off resist layer, a pair of side faces provided in the track width direction, and a pair of incisions, each incision provided between the corresponding side face and the contact face; and a second insulating layer forming step for depositing third sputtering particles at a sputtering angle $\theta_{d3}$ with respect to the substrate to form a pair of insulating layers which extend over the hard bias layers and the laminate lying in the incisions of the second lift-off resist layer; and a lead layer forming step for depositing fourth sputtering particles at a sputtering angle $\theta_{d4}$, wherein $\theta_{d3} > \theta_{d4}$, with respect to the substrate to form a pair of lead layers which extends over the insulating layers and the laminate in the incisions of the second lift-off resist layer.

Since the lead layers are formed over the laminate in the incisions of the second lift-off resist layer and the hard bias layers, the lead layers are in contact with the central portions of the laminate. The resulting spin-valve thin-film magnetic element does not generate side reading. The first and second insulating layers may be integrated or may be composed of the same material.

After the insulating layers are formed, the laminate in the incisions of the second lift-off resist layer may be partly etched by being irradiated with other etching particles.

Preferably, the sputtering angle $\theta_{d3}$ is in the range of 60° to 90° and the sputtering angle $\theta_{d4}$ is in the range of 40° to 80°. Since the sputtering angle $\theta_{d4}$ for forming the lead layers is smaller than the sputtering angle $\theta_{d3}$ for forming the insulating layers, the lead layers can be formed in the incisions of the second lift-off resist layer. Accordingly, the sensing current shunt can be further decreased.

DESCRIPTION OF THE PREFERRED EMBODIMENTS

The embodiments of the present invention will now be described with FIGS. 1 to 18 and 20 to 35. In these drawings, a magnetic recording medium moves in the Z direction, and a leakage magnetic field is generated from the magnetic recording medium in the Y direction. The $X_1$ direction represents the track width direction of the spin-valve thin-film magnetic element.

First Embodiment

Figure 1:
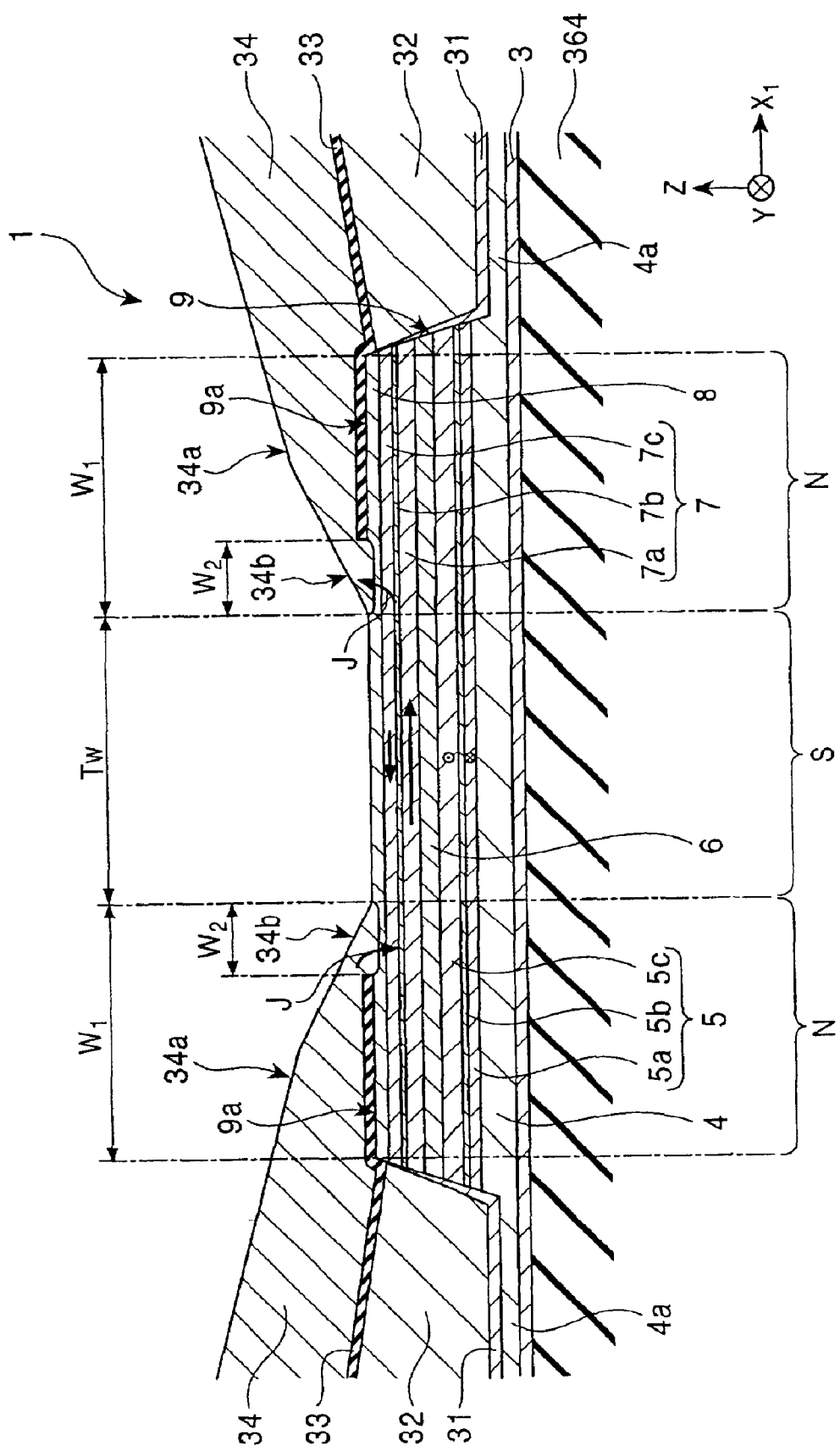
FIG. 1 is a schematic cross-sectional view of a spin-valve thin-film magnetic element in accordance with a first embodiment of the present invention.
Figure 2:
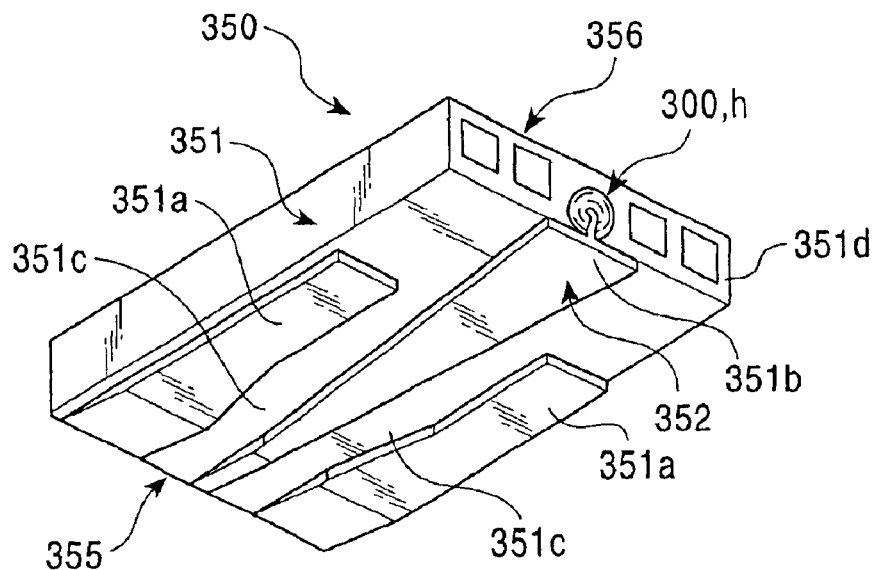
FIG. 2 is a perspective view of a floating magnetic head including the spin-valve thin-film magnetic element shown in FIG. 1.
Figure 3:
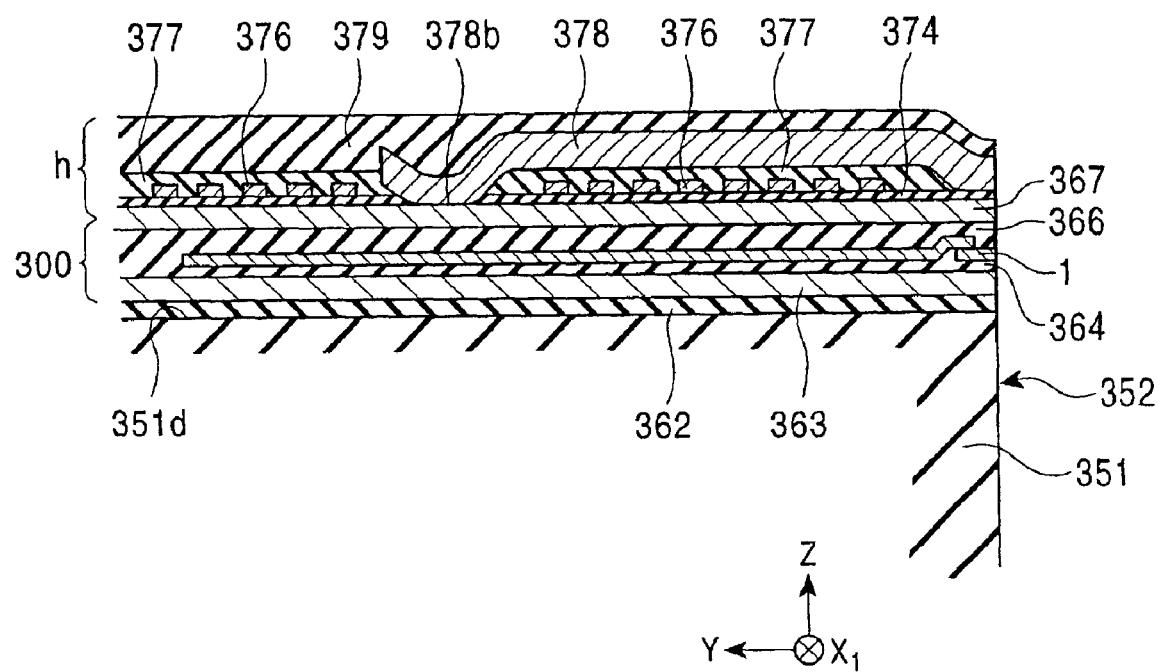
FIG. 3 is a cross-sectional view of a thin-film magnetic head including the spin-valve thin-film magnetic element shown in FIG. 1.

FIG. 1 is a schematic cross-sectional view, when viewed from a magnetic recording medium, of a spin-valve thin-film magnetic element 1 in accordance with a first embodiment of the present invention. FIG. 2 shows a floating magnetic head 350 having a thin-film magnetic head 300 which includes the spin-valve thin-film magnetic element 1. FIG. 3 is a cross-sectional view of the main portion of the thin-film magnetic head 300.

The floating magnetic head 350 shown in FIG. 2 includes a slider 351 and the thin-film magnetic head 300 which is provided on one side face 351d of the slider 351. The slider 351 has a leading end 355 lying at the upstream side of the moving direction of the magnetic recording medium and a trailing end 356. The slider 351 also has rails 351a and 351b on an opposing face 352 which opposes the magnetic recording medium. Air grooves 351c are thereby formed between the rails 351a and 351b.

Referring to FIG. 3, the thin-film magnetic head 300 is deposited on an insulating layer 362 which is formed on the side face 351d of the slider 351. This thin-film magnetic head 300 includes a lower shielding layer 363 provided on the insulating layer 362, a lower insulating layer 364 formed on the lower shielding layer 363, the spin-valve thin-film magnetic element 1 formed on the lower insulating layer 364 and exposed to the opposing face 352, an upper insulating layer 366 which covers the spin-valve thin-film magnetic element 1, and an upper shielding layer 367 which covers the upper insulating layer 366. The upper shielding layer 367 also functions as a lower core layer of an inductive head h, as described below.

The inductive head h includes the lower core layer (upper shielding layer) 367, a gap layer 374 provided on the upper shielding layer 367, a coil layer 376, an upper insulating layer 377 which covers the coil layer 376, and an upper core layer 378 which is coupled with the gap layer 374 at the opposing face 352 and the upper shielding layer 367 in the center of the coil layer 376.

The coil layer 376 has a planar spiral pattern. A base 378b of the upper core layer 378 is magnetically coupled with the upper shielding layer 367 in the center of the coil layer 376.

The upper core layer 378 is covered by a core protective layer 379 composed of alumina or the like.

Referring to FIG. 1, the spin-valve thin-film magnetic element 1 of the present invention is a bottom-type single spin-valve thin-film magnetic element including a free magnetic layer, a nonmagnetic conductive layer, a pinned magnetic layer, and an antiferromagnetic layer which lies at a lower insulating layer side.

The spin-valve thin-film magnetic element 1 includes a laminate 9 and is formed on a substrate as a lower insulating layer 364. The laminate 9 includes an underlayer 3 composed of Ta or the like, an antiferromagnetic layer 4, a pinned magnetic layer 5, a nonmagnetic conductive layer 6 composed of Cu or the like, a free magnetic layer 7, and a protective layer 8 composed of Ta or the like from the bottom. A pair of hard bias layers 32 composed of a CoPt alloy or the like is formed on both sides of the laminate 9 to orient the magnetic moment of the free magnetic layer 7. Furthermore, a pair of lead layers 34 is formed at least on the hard bias layers 32 to supply a sensing current to the laminate 9. The lead layers 34 are composed of Cr, Ta, W, Au, Rh, Cu, or the like.

The free magnetic layer 7 is a composite of a first free ferromagnetic sublayer 7a, a first nonmagnetic interlayer 7b, and a second free ferromagnetic layer 7c. The thickness of the second free ferromagnetic layer 7c is smaller than that of the first free ferromagnetic sublayer 7a.

The magnetization of the first free ferromagnetic sublayer 7a is oriented in the $X_1$ direction by a bias magnetic field of the hard bias layers 32. The second free ferromagnetic layer 7c is antiferromagnetically coupled with the first free ferromagnetic sublayer 7a through the first nonmagnetic interlayer 7b and the magnetic moment of the second free ferromagnetic layer 7c is oriented to the opposite direction of the $X_1$ direction.

Since the magnetic moments of the first free ferromagnetic sublayer 7a and the second free ferromagnetic layer 7c are antiparallel to each other, these magnetic moments mutually counteract. Since the first free ferromagnetic sublayer 7a is thicker than the second free ferromagnetic layer 7c, a small magnetic moment remains in the first free ferromagnetic sublayer 7a. Thus, the overall magnetic moment of the free magnetic layer 7 is oriented in the $X_1$ direction.

The second free ferromagnetic layer 7c may be thicker than the first free ferromagnetic sublayer 7a in this embodiment. In such a case, the overall magnetic moment of the free magnetic layer 7 is oriented in the direction of the magnetic moment of the second free ferromagnetic layer 7c.

The first free ferromagnetic sublayer 7a and the second free ferromagnetic layer 7c are composed of a NiFe alloy, elemental Co, a CoNiFe alloy, a CoFe alloy, and a CoNi alloy. Among these, a NiFe alloy is preferred. Furthermore, the first free ferromagnetic sublayer 7a and the second free ferromagnetic layer 7c are composed of the same material. The first nonmagnetic interlayer 7b is preferably composed of at least one metal of Ru, Rh, Ir, Cr, Re, and Cu and more preferably Ru.

The first free ferromagnetic sublayer 7a preferably has a thickness in the range of 3 to 6 nm. The second free ferromagnetic layer 7c preferably has a thickness in the range of 0.5 to 4 nm. The first nonmagnetic interlayer 7b preferably has a thickness in the range of 0.7 to 0.9 nm.

In the free magnetic layer 7, the first free ferromagnetic sublayer 7a and the second free ferromagnetic layer 7c are antiferromagnetically coupled with each other and the magnetic moment of the first free ferromagnetic sublayer 7a remains; hence, the free magnetic layer 7 exhibits synthetic ferrimagnetism. The magnetic moment of the free magnetic layer 7 can, therefore, vary in response to a slight change in an external magnetic field, resulting in increased sensitivity of the spin-valve thin-film magnetic element 1.

The pinned magnetic layer 5 is a composite of a first pinned ferromagnetic sublayer 5a, a second nonmagnetic interlayer 5b, and a second pinned ferromagnetic sublayer 5c. The second pinned ferromagnetic sublayer 5c is thicker than the first pinned ferromagnetic sublayer 5a.

The magnetic moment of the first pinned ferromagnetic sublayer 5a is pinned in the Y direction by an exchange coupling magnetic field with the antiferromagnetic layer 4, while the second pinned ferromagnetic sublayer 5c is antiferromagnetically coupled with the first pinned ferromagnetic sublayer 5a through the second nonmagnetic interlayer 5b and the magnetic moment of the second pinned ferromagnetic sublayer 5c is pinned in the opposite direction of the Y direction.

Since the magnetic moments of the first pinned ferromagnetic sublayer 5a and the second pinned ferromagnetic sublayer 5c are antiparallel to each other, these magnetic moments mutually counteract. Since the second pinned ferromagnetic sublayer 5c is thicker than the first pinned ferromagnetic sublayer 5a, a small magnetic moment remains in the second pinned ferromagnetic sublayer 5c. Thus, the overall magnetic moment of the pinned magnetic layer 5 is pinned in the opposite direction of the Y direction.

In this embodiment, the first pinned ferromagnetic sublayer 5a may be thicker than the second pinned ferromagnetic sublayer 5c. In such a case, the overall magnetic moment of the pinned magnetic layer 5 is pinned in the direction of the magnetic moment of the first pinned ferromagnetic sublayer 5a.

The first pinned ferromagnetic sublayer 5a and the second pinned ferromagnetic sublayer 5c are composed of a NiFe ally, elemental Co, a CoNiFe alloy, a CoFe alloy, a CoNi alloy, or the like. Among these materials, elemental Co is preferred. Moreover, the first pinned ferromagnetic sublayer 5a and the second pinned ferromagnetic sublayer 5c are preferably composed of the same material. The second nonmagnetic interlayer 5b is preferably composed of at least one metal of Ru, Rh, Ir, Cr, Re, and Cu and more preferably Ru.

The first pinned ferromagnetic sublayer 5a has a thickness in the range of 1 nm to 2.5 nm. The second pinned ferromagnetic sublayer 5c has a thickness in the range of 2 to 3 nm. The second nonmagnetic interlayer 5b has a thickness in the range of 0.7 nm to 0.9 nm.

In the pinned magnetic layer 5, the first pinned ferromagnetic sublayer 5a and the second pinned ferromagnetic sublayer 5c are antiferromagnetically coupled with each other and the magnetic moment of the second pinned ferromagnetic sublayer 5c remains; hence, the pinned magnetic layer 5 exhibits synthetic ferrimagnetism. The magnetic moment of the pinned magnetic layer 5 can, therefore, be firmly pinned. The magnetic moment of the free magnetic layer 7 in substantially orthogonal to the magnetic moment of the pinned magnetic layer 5.

Each of the free magnetic layer 7 and the pinned magnetic layer 5 has two ferromagnetic sublayers (first and second free ferromagnetic sublayers 7a and 7c and first and second pinned ferromagnetic sublayers 5a and 5c, respectively). Alternatively, each layer may have three or more ferromagnetic sublayers. In such a case, it is preferable that these ferromagnetic sublayers be separated by nonmagnetic interlayers and the magnetic moments of two adjacent ferromagnetic sublayers be antiparallel to each other so that the overall layer is in a ferrimagnetic state.

The nonmagnetic conductive layer 6 moderates magnetic coupling between the free magnetic layer 7 and the pinned magnetic layer 5. Furthermore, a sensing current primarily flows in the nonmagnetic conductive layer 6. Thus, the nonmagnetic conductive layer 6 is preferably composed of a conductive nonmagnetic material, such as Cu, Cr, Au, and Ag, and more preferably composed of Cu. The nonmagnetic conductive layer 6 preferably has a thickness in the range of 2 nm to 3 nm.

The antiferromagnetic layer 4 is preferably composed of a PtMn alloy. The PtMn alloy exhibits higher corrosion resistance compared with NiMn alloys and FeMn alloys which have been conventionally used for antiferromagnetic layers, a high blocking temperature, and a large exchange coupling magnetic field.

The antiferromagnetic layer 4 may be composed of either an XMn alloy or a PtX'Mn alloy wherein X is one metal selected from Pt, Pd, Ir, Rh, Ru, and Os and X' is at least one element selected from Pd, Cr, Ru, Ni, Ir, Rh, Os, Au, Ag, Ne, Ar, Xe, and Kr.

In the PtMn alloy and the XMn alloy, Pt and X contents are preferably in the range of preferably 37 to 63 atomic percent and more preferably 44 to 57 atomic percent.

In the PtX'Mn alloy, the total of X' and Pt contents is in the range of preferably 37 to 63 atomic percent and more preferably 44 to 57 atomic percent.

The antiferromagnetic layer 4 preferably has a thickness in the range of 8 to 20 nm.

Using an alloy having the above composition, the antiferromagnetic layer 4 is annealed in a magnetic field to generate a large exchange coupling magnetic field. This exchange coupling magnetic field firmly pins the magnetic moment of the pinned magnetic layer 5. In particular, an antiferromagnetic layer 4 composed of a PtMn alloy exhibits an exchange coupling magnetic field exceeding $6.4 \times 10^4$ A/m and has an extremely high blocking temperature of 653 K (380° C.) in which the antiferromagnetic layer 4 loses the exchange coupling magnetic field.

The antiferromagnetic layer 4 extends towards both sides in the $X_1$ direction, and the hard bias layers 32 and the lead layers 34 are provided on the extensions 4a of the antiferromagnetic layer 4 in that order. The extensions 4a and the hard bias layers 32 are separated by bias underlayers 31 composed of Ta, W, or Cr. When the bias underlayers 31 are composed of, for example, Cr which is a nonmagnetic metal and has a body centered cubic (bcc) structure, the hard bias layers 32 formed thereon have a large coercive force and a large remanence ratio, thus increasing a bias magnetic field which is required for a single-domain alignment of the free magnetic layer 7.

The hard bias layers 32 are composed of, for example, a CoPt alloy and are provided in both sides of the laminate 9 in the $X_1$ direction (track width direction). In this embodiment, the hard bias layers 32 extend on both sides of the free magnetic layer 7 in the $X_1$ direction to effectively apply a bias magnetic field to the free magnetic layer 7, to orient the magnetic moment of the free magnetic layer 7, and to reduce Barkhausen noise.

The hard bias layers 32 are covered by insulating layers 33 which extend to cover the both top ends 9a of the laminate 9 in the $X_1$ direction. The top ends 9a are adjacent to the hard bias layers 32.

The insulating layers 33 are preferably composed of one oxide selected from aluminum oxide, silicon oxide, tantalum oxide, titanium oxide, zirconium oxide, hafnium oxide, chromium oxide, vanadium oxide, and niobium oxide or one compound oxide composed of at least two of these oxides. The insulating layers 33 have a thickness in the range of 0.5 nm to 20 nm.

At a thickness less than 0.5 nm, pinholes would be formed in the insulating layers 33. At a thickness exceeding 20 nm, the gap width undesirably increases because the spin-valve thin-film magnetic element 1 has a large thickness.

The lead layers 34 are formed on the hard bias layers 32 separated by the insulating layers 33, and extend toward the center of the laminate 9 compared with the insulating layers 33. In other words, the lead layers 34 have overlay sections 34a, and edges 34b thereof partially extend on and are in contact with the laminate 9.

The two lead layers 34 are disposed at a distance Tw in the $X_1$ direction. This distance Tw defines an optical track width of the spin-valve thin-film magnetic element 1.

The width (represented by symbol $W_1$ in FIG. 1) of the overlay sections 34a in the track width direction is preferably in the range of 0.1 μm to 0.3 μm. In such a configuration, the bias magnetic field fixes the magnetic moment of the free magnetic layer at both ends. Since no sensing currents flow at the both ends of the free magnetic layer, the spin-valve thin-film magnetic element 1 has a reduced track width.

The lead layers 34 are in contact with the laminate 9 only at the edges 34b and are insulated from the laminate 9 and the hard bias layers 32 at other portions. Thus, a sensing current from one lead layer 34 flows into the laminate 9 via one edge 34b and the other lead layer 34 via the other edge 34b, as shown in arrows J in the drawing.

The width $W_2$ of the edges 34b of the lead layers 34 in the $X_1$ direction is preferably in the range of 0.01 μm to 0.05 μm to ensure wide contact areas between the lead layers 34 and the laminate 9. Since the contact resistance at the edges 34b is reduced, the sensing current effectively flows in the laminate 9.

Since the lead layers 34 are insulated from the hard bias layers 32 by the insulating layers 33, the sensing current does not flow into one top end 9a of the laminate 9 from one hard bias layer 32 and into the other hard bias layer 32 via the other hard bias layer 32.

Moreover, the insulating layers 33 extend between the overlay sections 34a and the top ends 9a of the laminate 9; hence, the sensing current does not flow into one top end 9a via one overlay section 34a and into the other top end 9a via the other overlay section 34a.

In the laminate 9, the sensing current is concentrated in the center which is not provided with the lead layers 34. Thus, the center exhibits an outstanding magnetoresistive (MR) effect and a high sensitivity to a leakage magnetic field from a magnetic recording medium. Thus, the center is defined as a sensitive region S, as shown in FIG. 1.

In contrast, the sensing current flows in only small portions of the laminate 9 which are in contact with the edges 34b. Thus, the top portions exhibit a small MR effect and are insensitive to the leakage magnetic field of the magnetic recording medium.

Moreover, at the top ends 9a of the laminate 9, the magnetic moment of the free magnetic layer 7 is firmly fixed by the bias magnetic field from the hard bias layers 32; hence, these top ends 9a barely exhibit an MR effect.

In addition, the insulating layers 33 prevent the sensing current from flowing in the top ends 9a. Thus, the top ends 9a exhibit no MR effects and are quite insensitive to the leakage magnetic field from the magnetic recording medium.

Accordingly, the top portions in contact with the edges 34b are defined as insensitive regions N, as shown in FIG. 1.

As described above, the laminate 9 is divided into the sensitive region S, which contributes to reading the recording magnetic field from the magnetic recording medium, and the insensitive regions N, which does not contribute to reading the recording magnetic field. Since the width Tw of the sensitive region S corresponds to the track width, the track width of the spin-valve thin-film magnetic element 1 can be reduced.

Moreover, the sensing current can be concentrated into the sensitive region S of the laminate 9, the rate of change in resistance in the sensitive region S is improved, resulting in improved output characteristics of the spin-valve thin-film magnetic element 1.

Since the insulating layers 33 prevent the sensing current from flowing in the top ends 9a of the laminate 9, the top ends 9a do not exhibit an MR effect. Thus, the spin-valve thin-film magnetic element 1 does not generate side reading.

A first method for making the spin-valve thin-film magnetic element 1 will now be described with reference to the drawings.

This method includes a laminate forming step which forms a laminate having a trapezoidal cross-section on a substrate, a bias layer forming step for depositing hard bias layers, an insulating layer forming step, a second resist layer forming step, an etching step, and a lead layer forming step.

Figure 4:
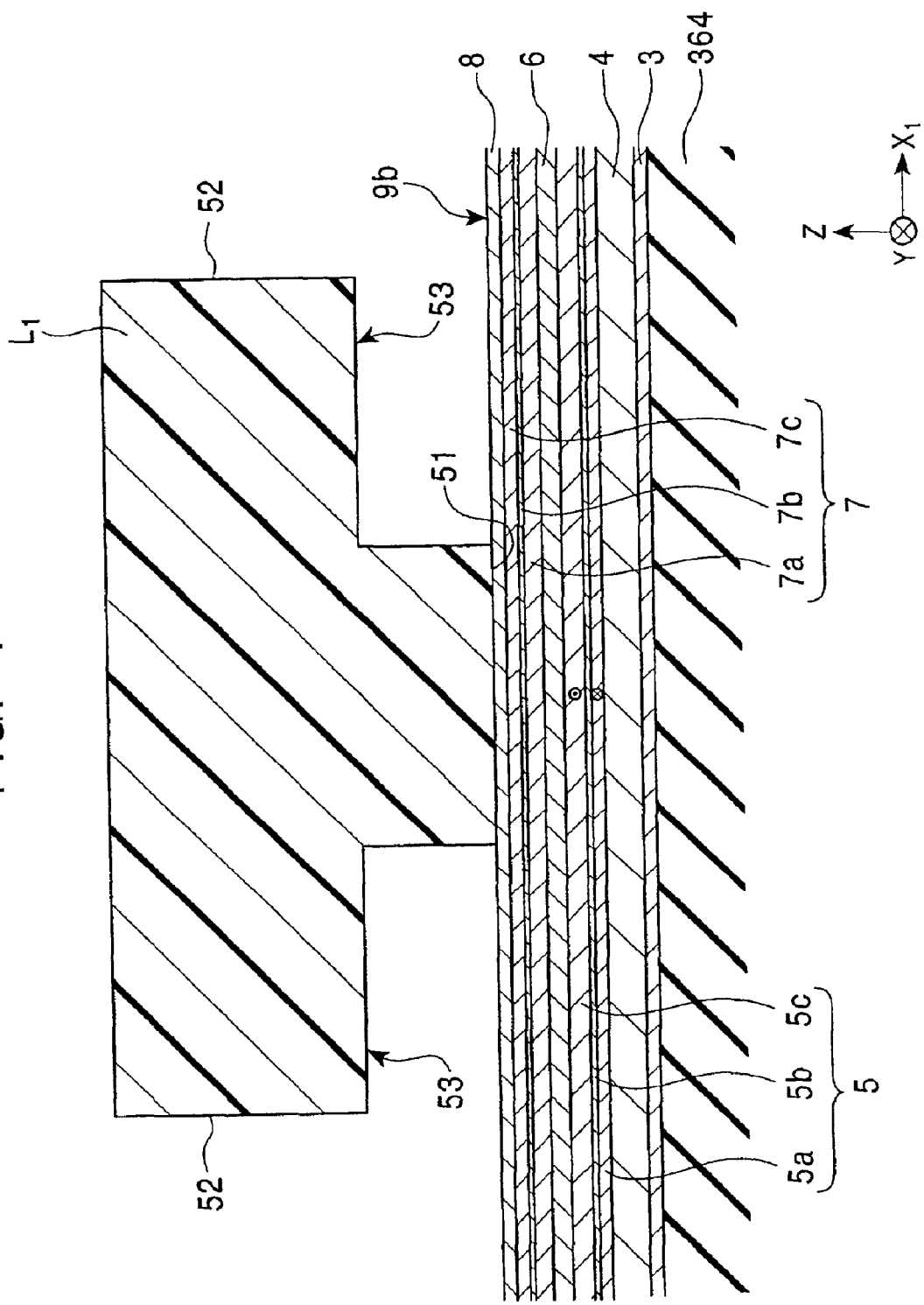
FIG. 4 is a cross-sectional view showing a laminate forming step in a method for making the spin-valve thin-film magnetic element in accordance with the first embodiment of the present invention.

Referring to FIG. 4, in the laminate forming step, the underlayer 3, the antiferromagnetic layer 4, the first pinned ferromagnetic sublayer 5a, the second nonmagnetic interlayer 5b, the second pinned ferromagnetic sublayer 5c, the nonmagnetic conductive layer 6, the first free ferromagnetic sublayer 7a, the first nonmagnetic interlayer 7b, the second free ferromagnetic layer 7c, and the protective layer 8 are deposited in that order on the lower insulating layer (substrate) 364 to form a laminate layer 9b.

The laminate layer 9b is annealed in a magnetic field to pin the magnetic moment of the pinned magnetic layer 5 by an exchange coupling magnetic field from the antiferromagnetic layer 4 to the pinned magnetic layer 5.

Next, a first lift-off resist layer $L_1$ is formed on the laminate layer 9b. The first lift-off resist layer $L_1$ has a contact face 51 which is in contact with the laminate layer 9b and two side faces 52, the contact face 51 lying between these side faces 52. A pair of incisions 53 is provided between the side faces 52 and the contact face 51 in the track width direction.

Figure 5:
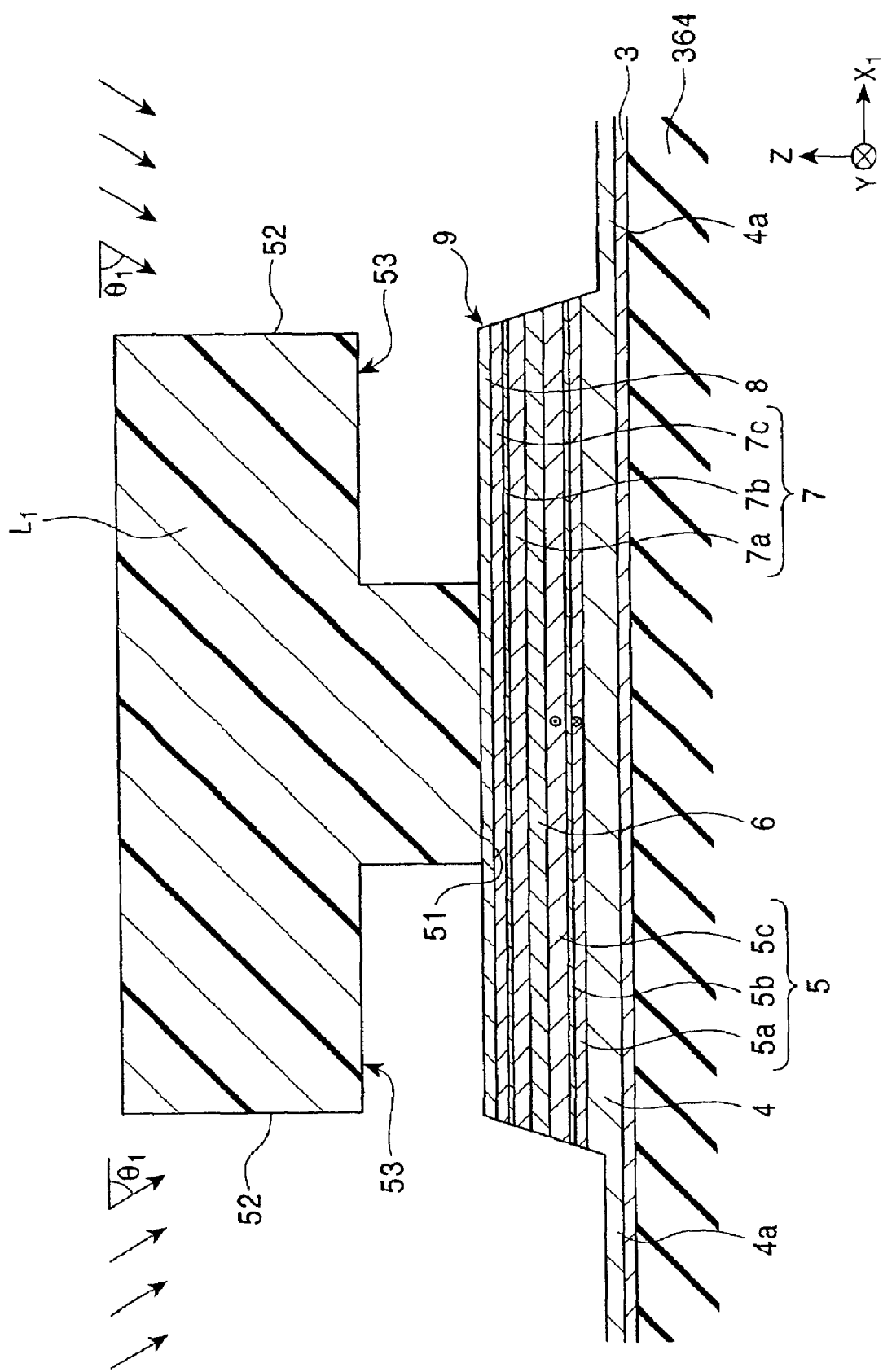
FIG. 5 is a cross-sectional view showing a laminate forming step subsequent to the step shown in FIG. 4.

Referring to FIG. 5, the laminate layer 9b is irradiated with etching particles containing ion beams of inert gas such as Ar at an etching angle $\theta_1$ with respect to the lower insulating layer (substrate) 364 to etch both sides of the laminate layer 9b so that the lower half (extension) 4a of the antiferromagnetic layer 4 remains at each of the both sides which lie outside the side faces 52 of the first lift-off resist layer $L_1$ in the $X_1$ direction (track width direction). The laminate 9 thereby has a trapezoidal cross-section 9 and the antiferromagnetic layer 4 has extensions 4a which extend at both sides in the $X_1$ direction.

The irradiation with etching particles is preferably performed by ion milling with Ar or reverse sputtering. Since these methods use highly directional etching particles, the etching particles can be oriented in a specific direction.

The etching angle $\theta_1$ defining the direction of the etching particles is preferably in the range of 60° to 90°. This etching angle $\theta_1$ can be controlled by adjusting, for example, the angle between an ion gun grid and the lower insulating layer 364.

Both sides of the laminate layer 9b can be anisotropically etched by etching particles which are incident on the laminate layer 9b at the etching angle $\theta_1$ to form the laminate 9 having a trapezoidal cross-section.

Figure 6:
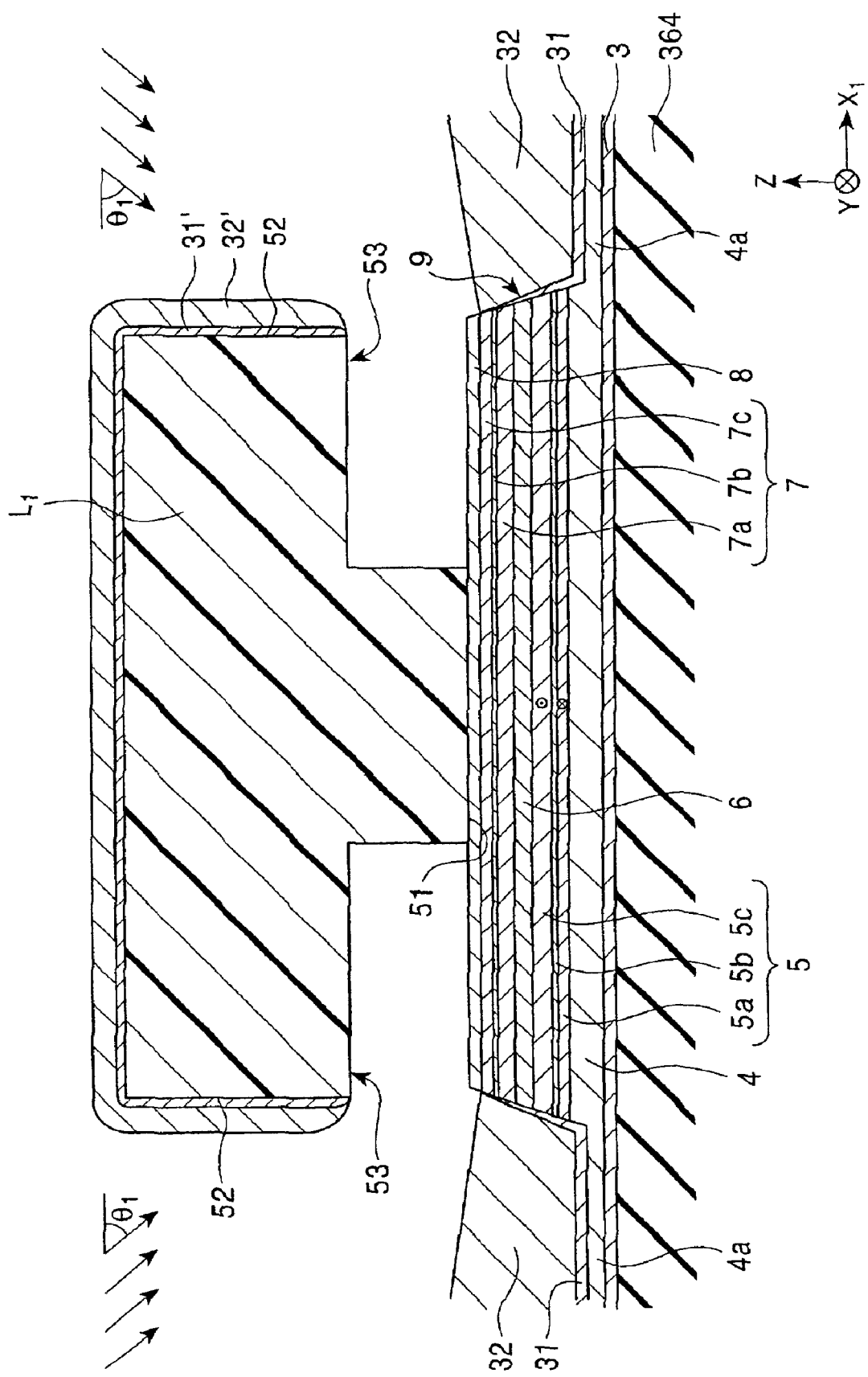
FIG. 6 is a cross-sectional view showing a hard bias layer forming step subsequent to the step shown in FIG. 5.

Referring to FIG. 6, in the bias layer forming step, the bias underlayers 31 and the hard bias layers 32 are deposited on both sides of the laminate 9 by a first sputtering process using sputtering particles at a sputtering angle $\theta_1$ (equal to the etching angle $\theta_1$) with respect to the lower insulating layer 364. The first sputtering process may be ion beam sputtering or the like. The bias underlayers 31 and the hard bias layers 32 are deposited on the extensions 4a which extend at both sides of the laminate 9. The hard bias layers 32 are preferably deposited up to at least the level of the free magnetic layer 7.

During this bias layer forming step, the sputtering particles are also deposited on the first lift-off resist layer $L_1$ to form layers 31' and 32' which have the same compositions as those of the bias underlayers 31 and the hard bias layers 32.

Figure 7:
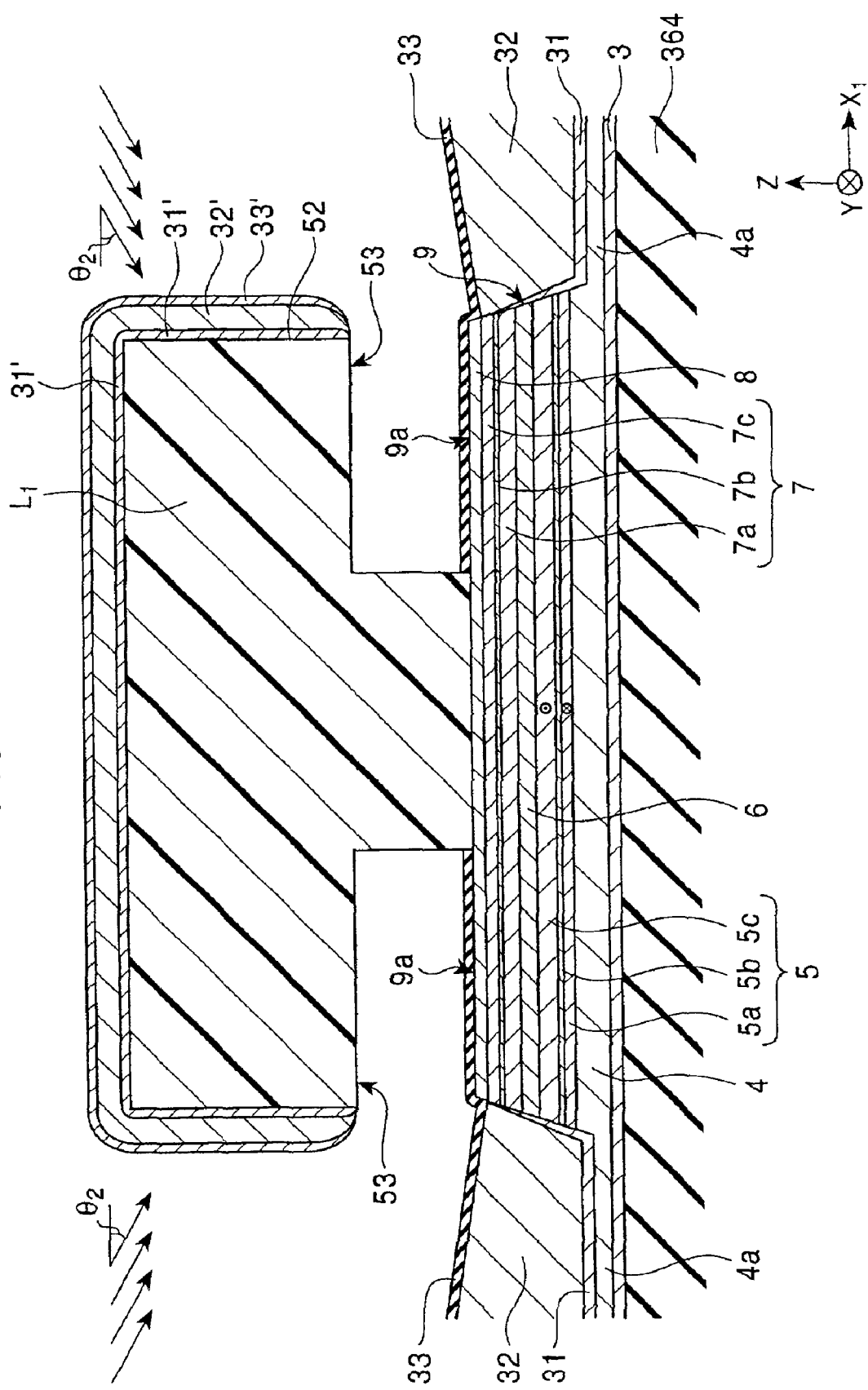
FIG. 7 is a cross-sectional view showing an insulating layer forming step subsequent to the step shown in FIG. 6.

Referring to FIG. 7, in the insulating layer forming step, the insulating layers 33 are deposited on the hard bias layers 32 by a second sputtering process using another type of sputtering particle at a sputtering angle $\theta_2$ (angle $\theta_1$>angle $\theta_2$) with respect to the lower insulating layer 364. Sputtering particles also enter the incisions 53 of the first lift-off resist layer $L_1$ so that the insulating layers 33 extend on the laminate 9 below the incisions 53.

The sputtering particles also are deposited on the first lift-off resist layer $L_1$ to form a layer 33' which has the same composition as that of the insulating layers 33.

In the second sputtering process, the sputtering particles are preferably deposited by ion beam sputtering or the like as in the above method. The sputtering angle $\theta_2$ is preferably in the range of 40° to 80°. The sputtering angle $\theta_2$ is preferably smaller than the etching angle $\theta_1$. The sputtering angle $\theta_2$ is controlled by adjusting, for example, the angle between the surface of a target for sputtering and the lower insulating layer 364.

Since the second sputtering process is performed at the sputtering angle $\theta_2$, the second sputtering particles enter the incisions 53. The insulating layers 33 thereby extend over the hard bias layers 32 and the top ends 9a of the laminate 9.

Figure 8:
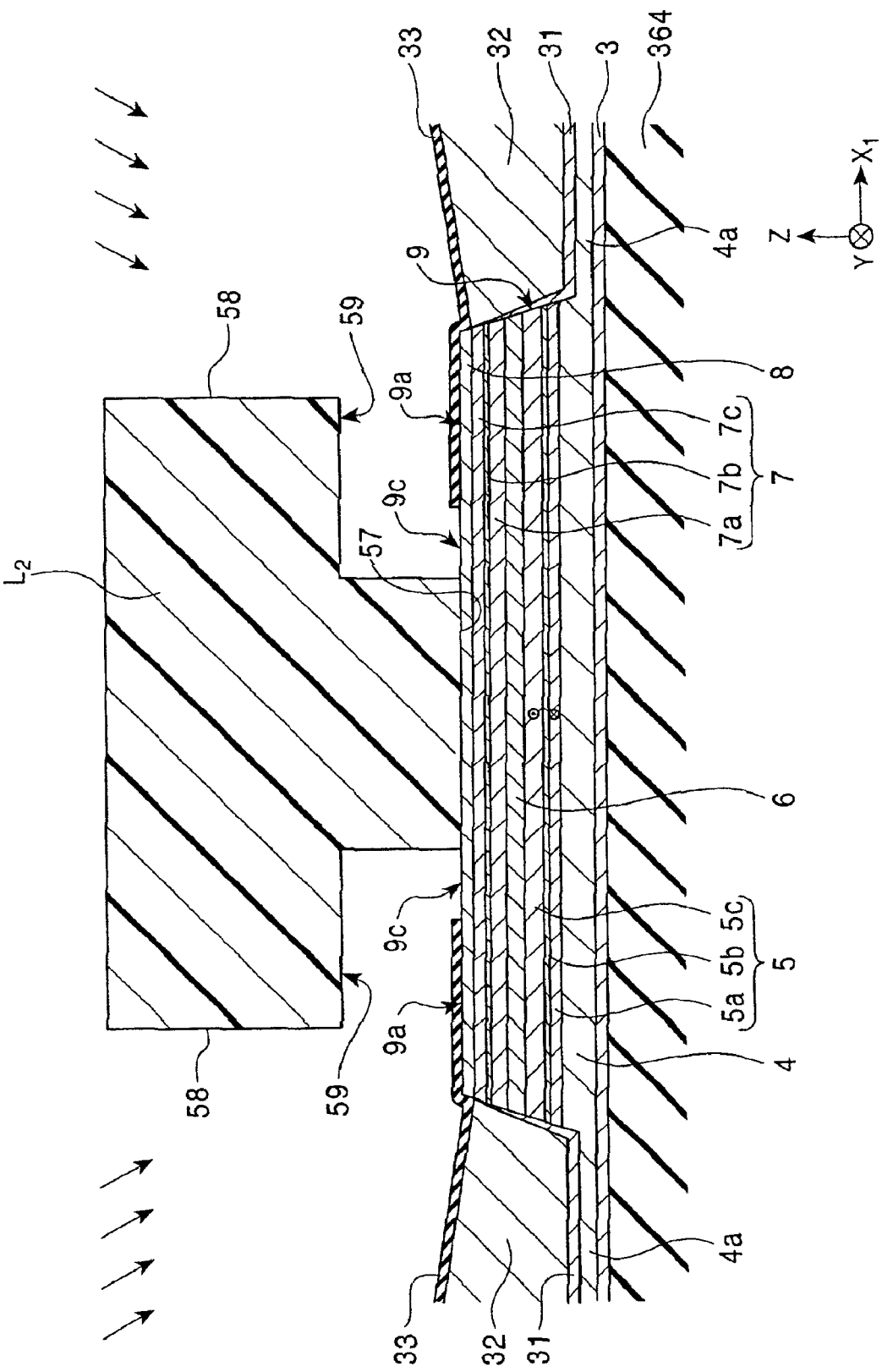
FIG. 8 is a cross-sectional view showing a second resist layer forming step subsequent to the step shown in FIG. 7.

With reference to FIG. 8, in the second resist layer forming step, the first lift-off resist layer $L_1$ is removed, and then a second lift-off resist layer $L_2$ is formed substantially on the central surface of the laminate 9. The second lift-off resist layer $L_2$ has a contact face 57 which is in contact with the laminate 9 and two side faces 58, the contact face 57 lying between these side faces 58. A pair of incisions 59 is provided between the side faces 58 and the contact face 57 in the $X_1$ direction. The width of the contact face 57 in the $X_1$ direction is smaller than that of the contact face 51 of the first lift-off resist layer $L_1$.

By forming the second lift-off resist layer $L_2$ in such a manner, the protective layer 8 is partially exposed under the incisions 59 to form exposed surfaces 9c.

The width of the exposed surfaces 9c in the $X_1$ direction is defined by the difference between the width of the contact face 51 of the first lift-off resist layer $L_1$ in the $X_1$ direction and the width of the contact face 57 of the second lift-off resist layer $L_2$ in the $X_1$ direction. This width of the exposed surfaces 9c corresponds to the width $W_2$ of the edges 34b of the lead layers 34 in FIG. 1. Thus, the first lift-off resist layer $L_1$ and the second lift-off resist layer $L_2$ precisely control the width of the exposed surfaces 9c and the contact area of the lead layers 34 so that the sensing current effectively flows in the laminate 9.

Figure 9:
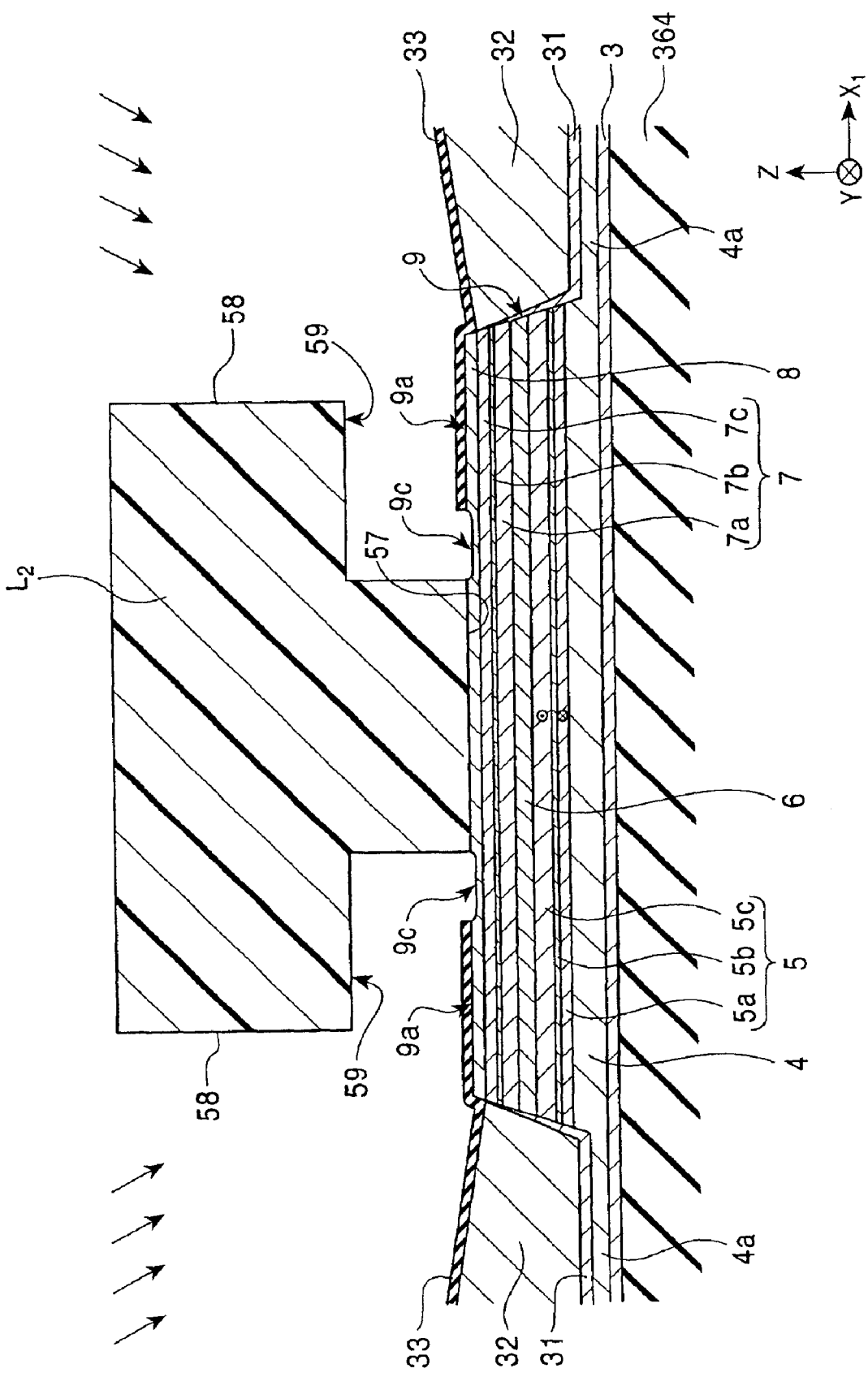
FIG. 9 is a cross-sectional view showing an etching step subsequent to the step shown in FIG. 8.

Referring to FIG. 9, in the etching step, the exposed surfaces 9c are etched by irradiation with second etching particles. The insulating layers 33 are also etched to become thinner in this process.

The surfaces of the exposed surfaces 9c have been contaminated by various contaminants during removing the first lift-off resist layer $L_1$ and forming the second lift-off resist layer $L_2$ in the second resist layer forming step. If the lead layers 34 are formed without removing these contaminants, the contact resistance between the lead layers 34 and the laminate 9 may increase. The exposed surfaces 9c are cleaned by this etching step.

Figure 10:
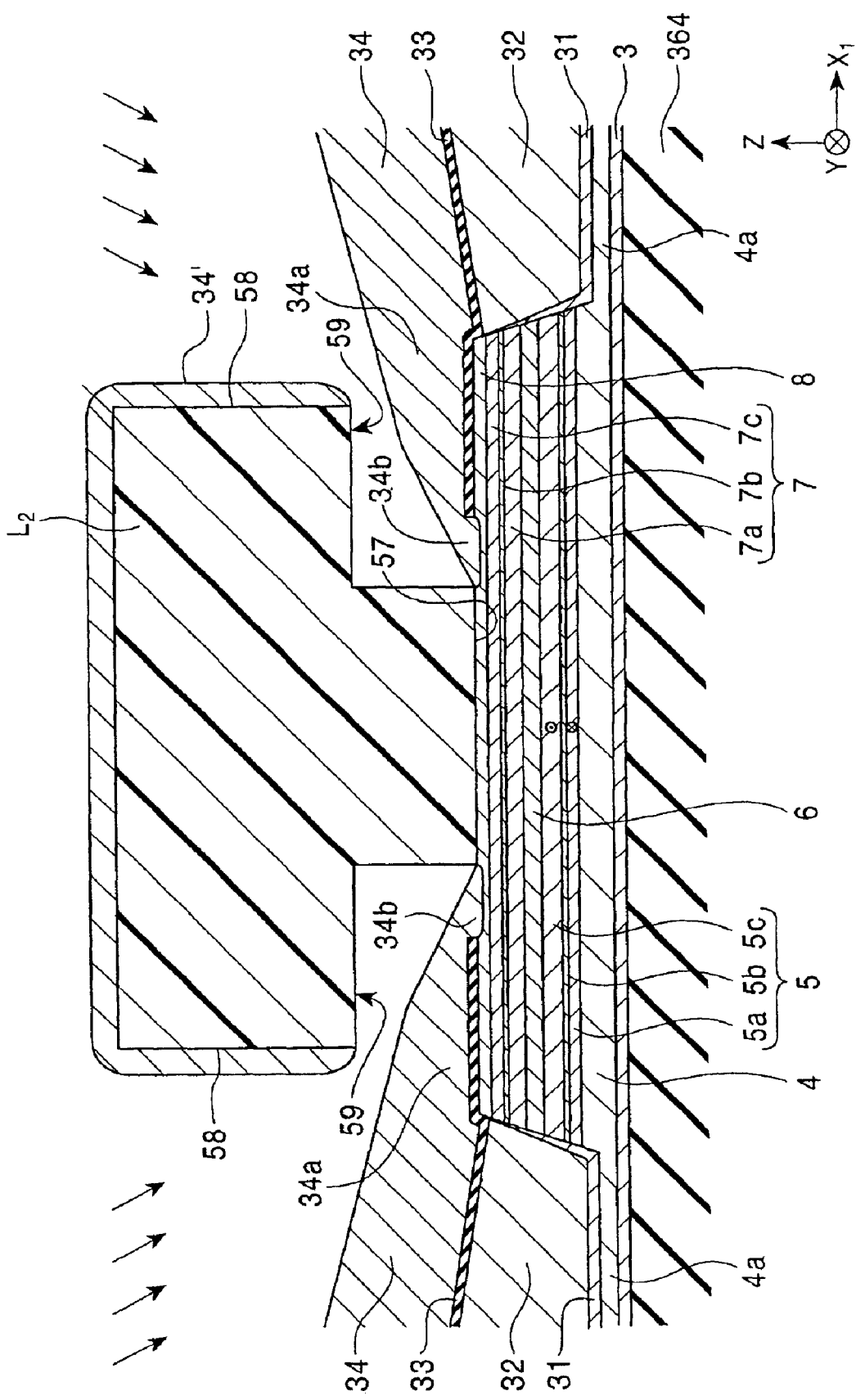
FIG. 10 is a cross-sectional view showing a lead layer forming step subsequent to the step shown in FIG. 9.

Referring to FIG. 10, in the lead layer forming step, the lead layers 34 are deposited on the insulating layers 33 by a third sputtering process using another type of sputtering particles. In this process, sputtering particles enter the incisions 59 of the second lift-off resist layer $L_2$, so that the lead layers 34 extend over the insulating layers 33 and the exposed surfaces 9c in the incisions 59.

The sputtering particles are also deposited on the second lift-off resist layer $L_2$ to form a layer 34' having the same composition as that of the lead layers 34.

In this process, the sputtering particles are preferably deposited by ion beam sputtering as described above. Preferably, the sputtering angle in the third sputtering process is substantially equal to the etching angle of the etching particles in the etching step.

As described above, the lead layers 34 have the overlay sections 34a which extend on the exposed surfaces 9c in the central regions of the laminate 9. The edges 34b of the overlay sections 34a come into direct contact with the laminate 9.

In the final stage, the second lift-off resist layer $L_2$ is removed, and the laminate 9 is annealed in a magnetic field so that the hard bias layers 32 generates a bias magnetic field which orients the magnetic moment of the free magnetic layer 7 in the $X_1$ direction. The spin-valve thin-film magnetic element 1 shown in FIG. 1 is thereby formed.

According to the first method for making the spin-valve thin-film magnetic element 1, the second sputtering process is performed at a sputtering angle $\theta_2$ to form the insulating layers 33 in the incisions 53 of the first lift-off resist layer $L_1$. Moreover, the third sputtering process is performed at a sputtering angle $\theta_2$ to form the lead layers 34 in the incisions 59 of the second lift-off resist layer $L_2$. Thus, the insulating layers 33 extend on the top ends 9a of the laminate 9. Moreover, the lead layers 34 extend towards the center of the laminate 9 compared with the insulating layers 33 and are in direct contact with the laminate 9. Accordingly, the spin-valve thin-film magnetic element 1 does not generate side reading.

A second method for making the spin-valve thin-film magnetic element 1 of the present invention will now be described with reference to the drawings.

In the second method, the hard bias layers are formed and then a second lift-off resist layer is formed to form the insulating layers and the lead layers.

The second method includes a laminate forming step, a bias layer forming step, a second resist layer forming step, an insulating layer forming step, an etching step, and a lead layer forming step.

Figure 11:
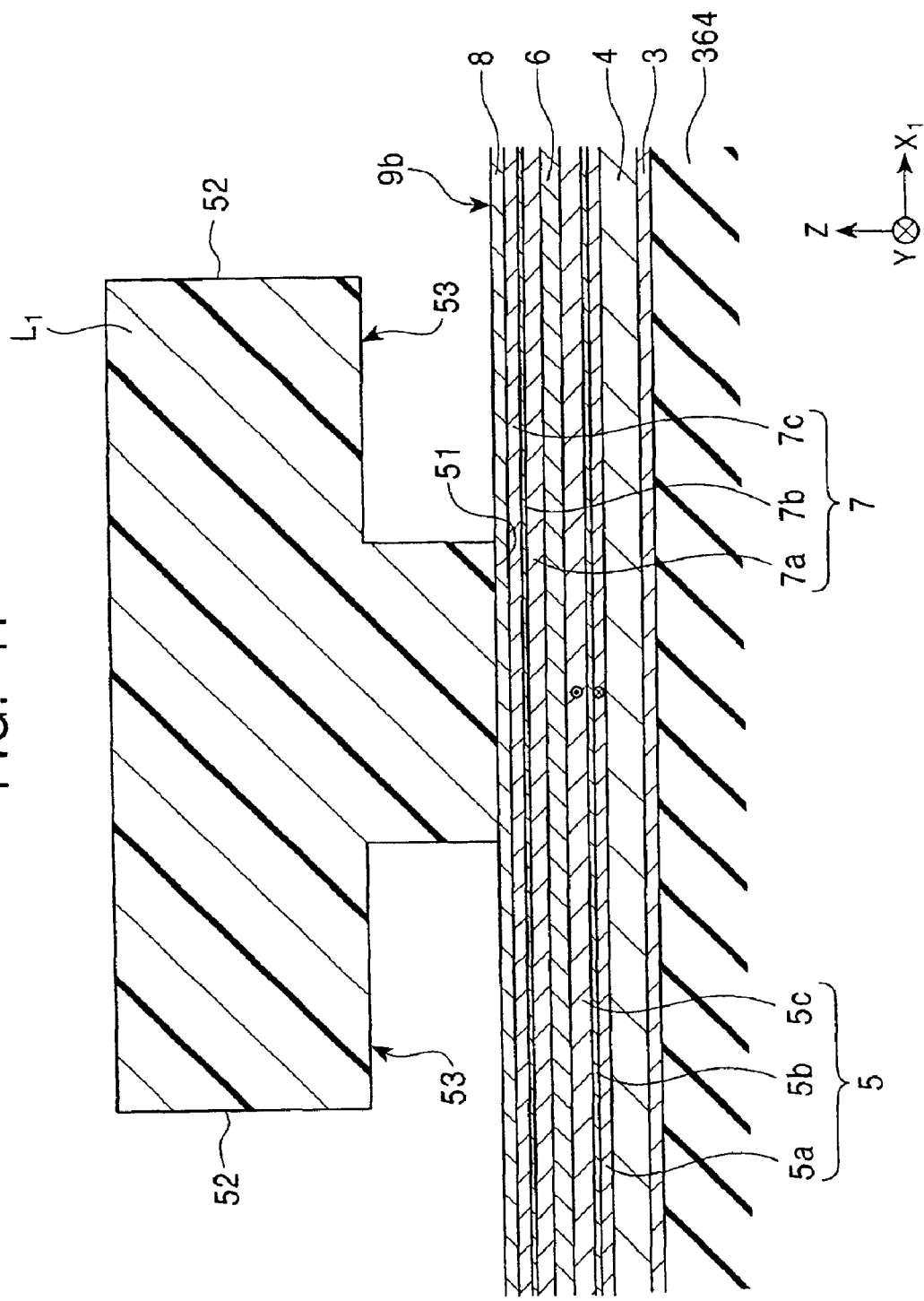
FIG. 11 is a cross-sectional view showing a laminate forming step in another method for making a spin-valve thin-film magnetic element of the present invention.

Referring to FIG. 11, in the laminate forming step, layers from the underlayer 3 to the protective layer 8 are deposited to form the laminate layer 9b as shown in FIG. 4, and the laminate layer 9b is annealed in a magnetic field to pin the magnetic moment of the pinned magnetic layer 5 by an exchange coupling magnetic field from the antiferromagnetic layer 4 to the pinned magnetic layer 5. A first lift-off resist layer $L_1$ is formed on the laminate layer 9b. The first lift-off resist layer $L_1$ has a contact face 51 which is in contact with the laminate layer 9b and two side faces 52, the contact face 51 lying between these side faces 52. A pair of incisions 53 is provided between the side faces 52 and the contact face 51 in the track width direction.

Figure 12:
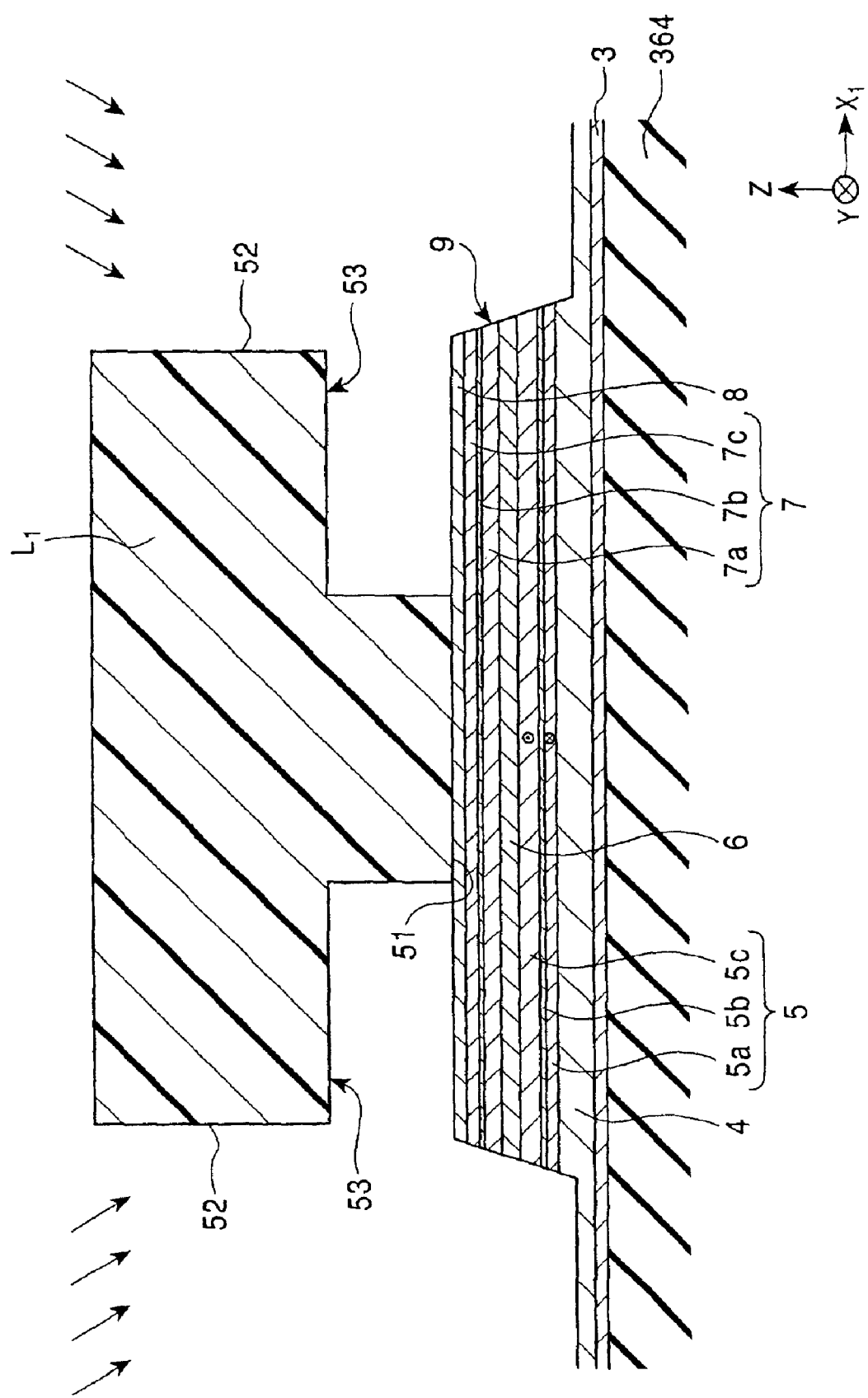
FIG. 12 is a cross-sectional view showing a laminate forming step subsequent to the step shown in FIG. 11.

Referring to FIG. 12, the laminate layer 9b is irradiated with etching particles to etch both sides of the laminate layer 9b as in FIG. 5 so that the lower half (extension) 4a of the antiferromagnetic layer 4 remains at each of the both sides in the $X_1$ direction. The laminate 9 thereby has a trapezoidal cross-section and the antiferromagnetic layer 4 has extensions 4a which extend at both sides in the $X_1$ direction.

Figure 13:
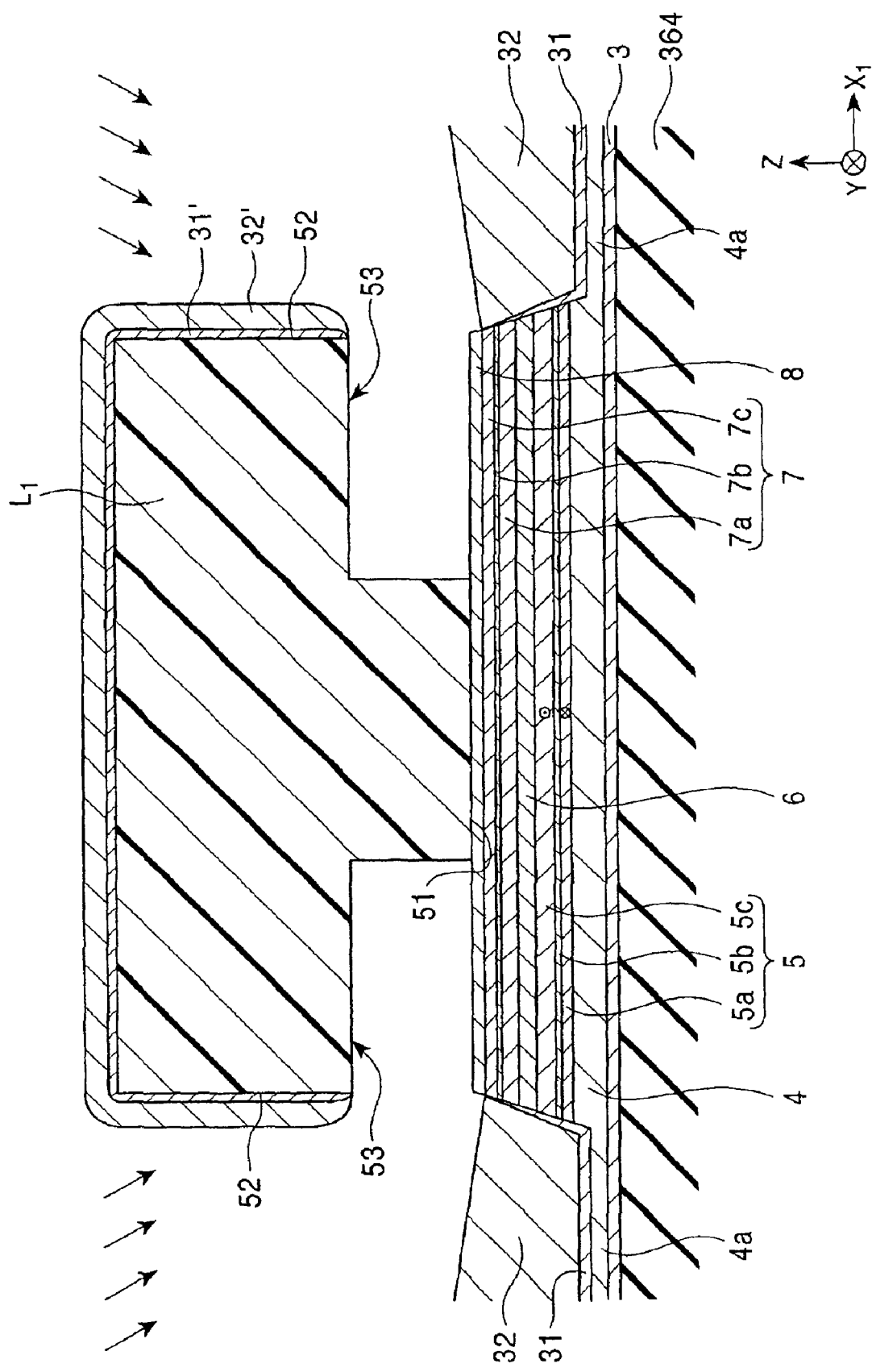
FIG. 13 is a cross-sectional view showing a hard bias layer forming step subsequent to the step shown in FIG. 12.

Referring to FIG. 13, the bias underlayers 31 and the hard bias layers 32 are deposited on both sides of the laminate 9 by a first sputtering process, as in FIG. 6. The bias underlayers 31 and the hard bias layers 32 are deposited on the extensions 4a which extend at both sides of the laminate 9. The hard bias layers 32 are preferably deposited up to at least the level of the free magnetic layer 7.

During this step, sputtering particles are deposited on the first lift-off resist layer $L_1$ to form layers 31' and 32' which have the same compositions as those of the bias underlayers 31 and the hard bias layers 32.

Figure 14:
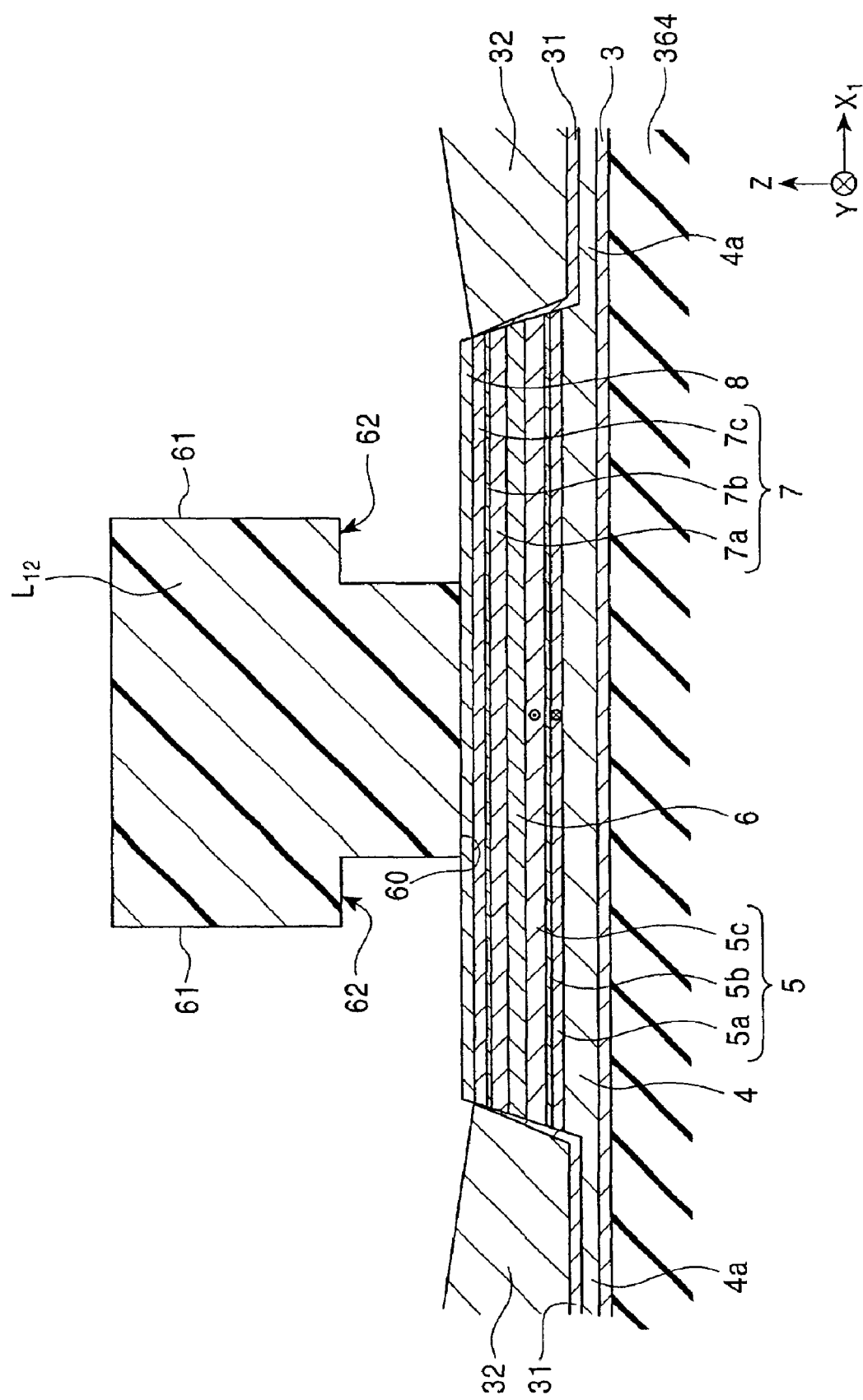
FIG. 14 is a cross-sectional view showing a second resist layer forming step subsequent to the step shown in FIG. 13.

Referring to FIG. 14, in the second resist layer forming step, the first lift-off resist layer $L_1$ is removed and then a second lift-off resist layer $L_{12}$ is formed on the laminate 9. The second lift-off resist layer $L_{12}$ has a contact face 60 which is in contact with the laminate 9 and two side faces 61, the contact face 60 lying between these side faces 61. A pair of incisions 62 is provided between the side faces 61 and the contact face 60 in the $X_1$ direction. The width of the contact face 60 in the $X_1$ direction is smaller than that of the contact face 51 of the first lift-off resist layer $L_1$.

Furthermore, the distance between the side faces 61 is smaller than the distance between the side faces 52 of the first lift-off resist layer $L_1$ and smaller than the width of the upper face in the track width direction of the laminate 9.

Figure 15:
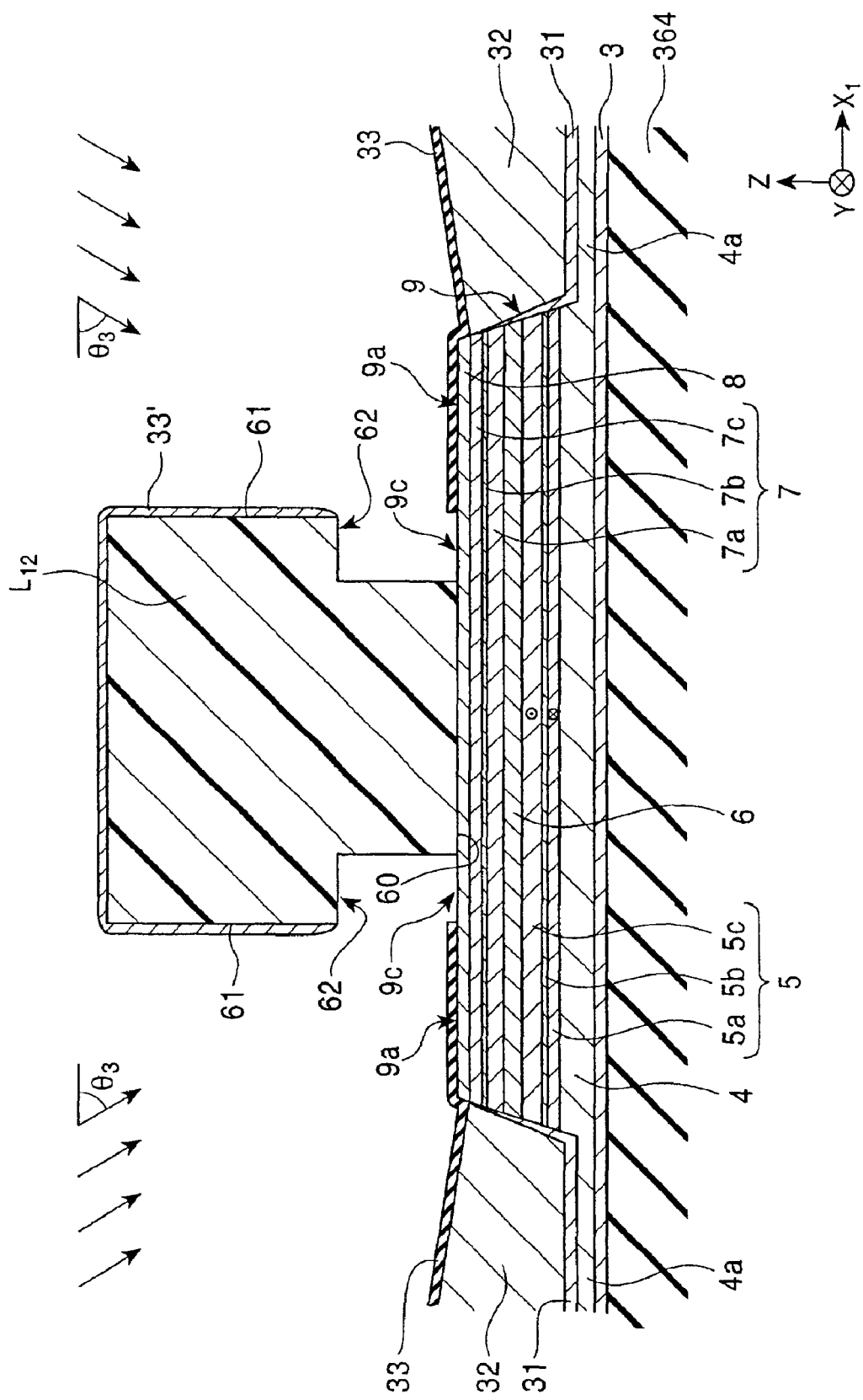
FIG. 15 is a cross-sectional view showing an insulating layer forming step subsequent to the step shown in FIG. 14.

Referring to FIG. 15, in the insulating layer forming step, the insulating layers 33 are deposited on the laminate 9 at the outer regions of the side faces 61 of the second lift-off resist layer $L_{12}$ in the $X_1$ direction by a second sputtering process using another type of sputtering particle at a sputtering angle $\theta_3$ with respect to the lower insulating layer 364. The insulating layers 33 extend over the top ends 9a of the laminate 9 and the hard bias layers 32 at the outer regions of the side faces 61.

In this process, sputtering particles having the sputtering angle $\theta_3$ do not enter the incisions 62 of the second lift-off resist layer $L_{12}$. As a result, the insulating layers 33 are not formed on the exposed surfaces 9c of the laminate 9 in the incisions 62.

The sputtering particles are also deposited on the second lift-off resist layer $L_{12}$ to form a layer 33' which has the same composition as that of the insulating layers 33.

In this process, the sputtering particles are preferably deposited by ion beam sputtering or the like as in the above method. The sputtering angle $\theta_3$ is preferably in the range of 60° to 90°. At a sputtering angle $\theta_3$ of less than 60°, the sputtering particles are incident on the incisions 62 of the second lift-off resist layer $L_{12}$. In such a state, the lead layers formed in a subsequent step will not come into contact with the laminate 9. At a sputtering angle $\theta_3$ exceeding 90°, the ends of the insulating layers 33 are not positioned at the side faces 61.

The sputtering angle $\theta_3$ is controlled by adjusting, for example, the angle between the surface of a target for sputtering and the lower insulating layer 364.

Since the second sputtering process is performed at the sputtering angle $\theta_3$, the insulating layers 33 are formed so as to extend over the hard bias layers 32 and the top ends 9a of the laminate 9 and not to extend on the exposed surfaces 9c of the laminate 9 in the incisions 62.

Figure 16:
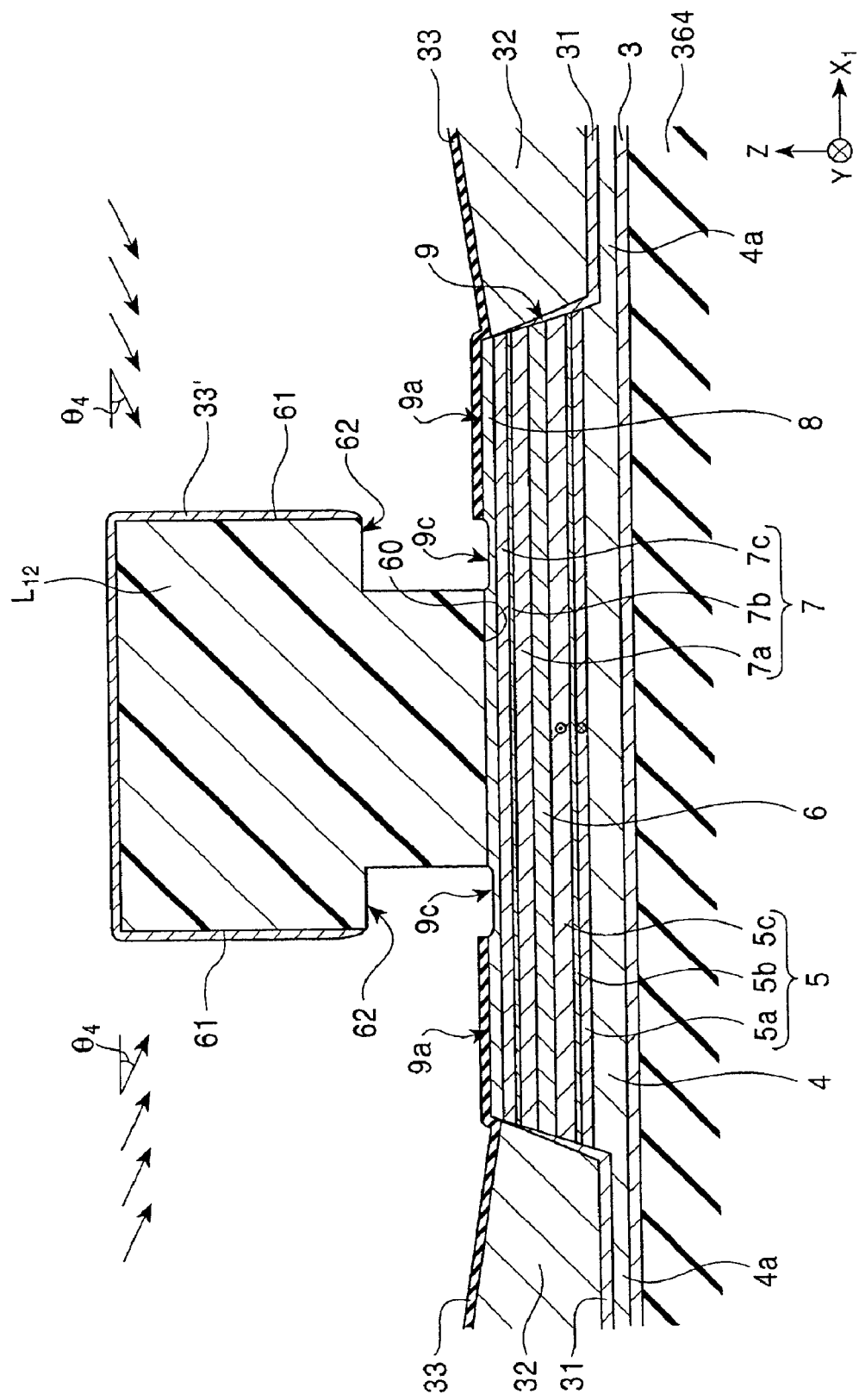
FIG. 16 is a cross-sectional view showing an etching step subsequent to the step shown in FIG. 15.

Referring to FIG. 16, in the etching step, the exposed surfaces 9c of the laminate 9 in the incisions 62 are etched by irradiation with second etching particles at a sputtering angle $\theta_4$ ($\theta_3 > \theta_4$). The insulating layers 33 are also etched to become thinner in this process.

The surfaces of the exposed surfaces 9c have been contaminated by various contaminants during removing the first lift-off resist layer $L_1$ and forming the second lift-off resist layer $L_{12}$ in the second resist layer forming step. If the lead layers 34 are formed without removing these contaminants, the contact resistance between the lead layers 34 and the laminate 9 may increase. The exposed surfaces 9c are cleaned by this etching step.

The sputtering angle $\theta_4$ is preferably in the range of 40° to 80°. Preferably, the sputtering angle $\theta_4$ is smaller than the sputtering angle $\theta_3$. This sputtering angle $\theta_4$ can be controlled by adjusting, for example, the angle between an ion gun grid and the lower insulating layer 364.

Since the sputtering angle $\theta_4$ is smaller than the sputtering angle $\theta_3$, the second etching particles enter the incisions 62 to etch the exposed surfaces 9c of the laminate 9.

At a sputtering angle $\theta_4$ of less than 40°, the second lift-off resist layer $L_{12}$ is excessively etched. The excess etching of the second lift-off resist layer $L_{12}$ will result in an erroneous size of the lead layers in the lead layer forming step. At a sputtering angle $\theta_4$ exceeding 80°, the second etching particles do not enter the incisions 62 and the exposed surfaces 9c will not be satisfactorily etched.

Figure 17:
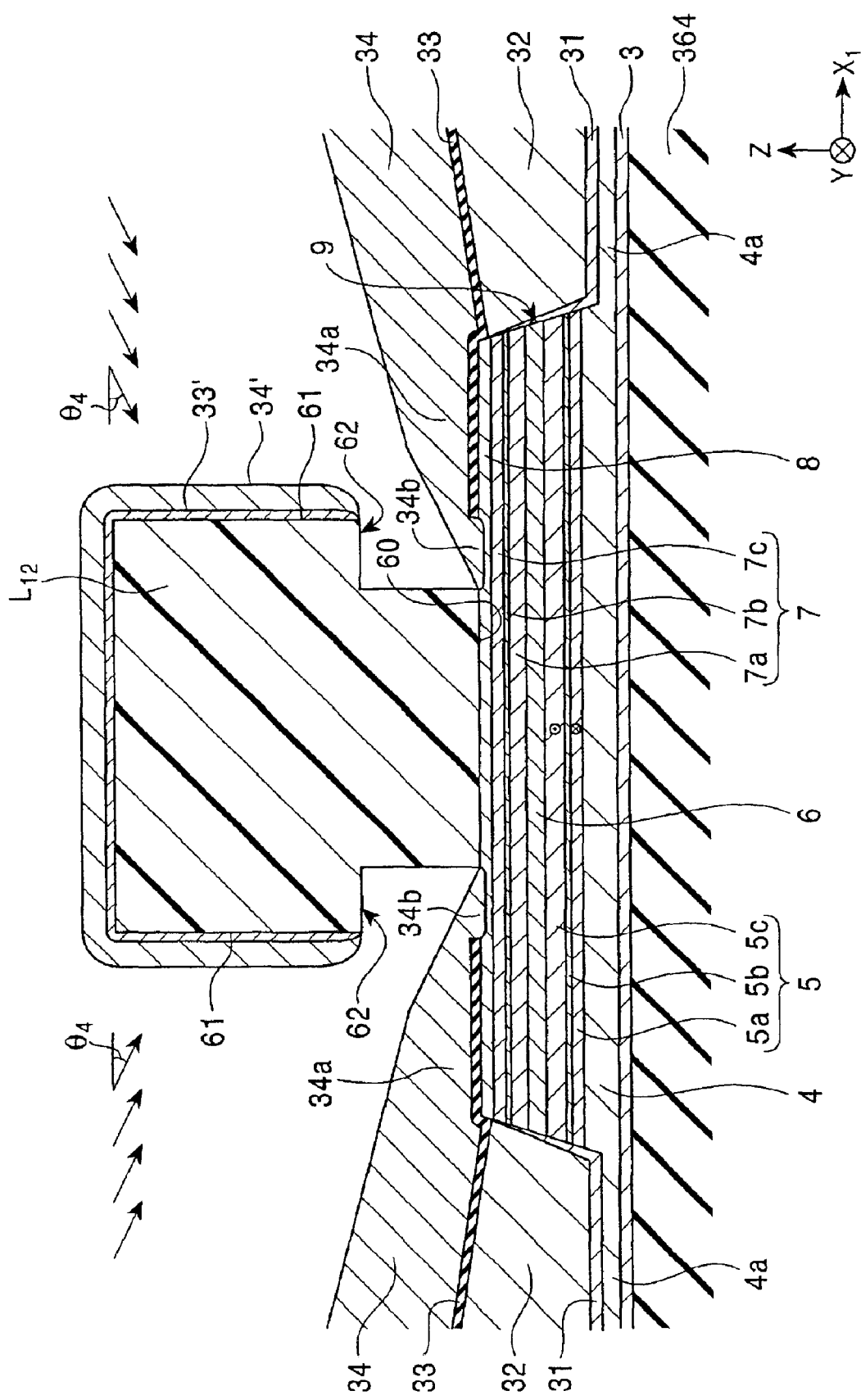
FIG. 17 is a cross-sectional view showing a lead layer forming step subsequent to the step shown in FIG. 16.

Referring to FIG. 17, in the lead layer forming step, the lead layers 34 are deposited on the insulating layers 33 by a third sputtering process using another type of sputtering particle at the sputtering angle $\theta_4$ with respect to the lower insulating layer 364. Sputtering particles enter the incisions 62 of the second lift-off resist layer $L_{12}$ so that the lead layers 34 extend on the exposed surfaces 9c in the incisions 62.

The sputtering particles are also deposited on the second lift-off resist layer $L_{12}$ to form a layer 34' having the same composition as that of the lead layers 34.

The third sputtering process is preferably performed by ion beam sputtering as described above. Preferably, the sputtering angle $\theta_4$ of the third sputtering process is substantially equal to the sputtering angle $\theta_4$ of the etching particles in the etching step so that the sputtering particles enter the incisions 62 of the second lift-off resist layer $L_{12}$.

As described above, the lead layers 34 have the overlay sections 34a which extend on the exposed surfaces 9c in the central regions of the laminate 9. The edges 34b of the overlay sections 34a come into direct contact with the laminate 9.

In the final stage, the second lift-off resist layer $L_{12}$ is removed, and the laminate 9 is annealed in a magnetic field so that the hard bias layers 32 generates a bias magnetic field which orients the magnetic moment of the free magnetic layer 7 in the $X_1$ direction. The spin-valve thin-film magnetic element 1 shown in FIG. 1 is thereby formed.

According to the second method for making the spin-valve thin-film magnetic element 1, the second sputtering process is performed at a sputtering angle $\theta_3$ to form the insulating layers 33 in the outer regions of the side faces 61 of the first lift-off resist layer $L_1$. Moreover, the third sputtering process is performed at a sputtering angle $\theta_4$ to form the lead layers 34 in the incisions 62 of the second lift-off resist layer $L_{12}$. Thus, the insulating layers 33 extend on the top ends 9a of the laminate 9. Moreover, the lead layers 34 extend towards the center of the laminate 9 compared with the insulating layers 33 and are in direct contact with the laminate 9. Accordingly, the spin-valve thin-film magnetic element 1 does not generate side reading.

Second Embodiment

Figure 18:
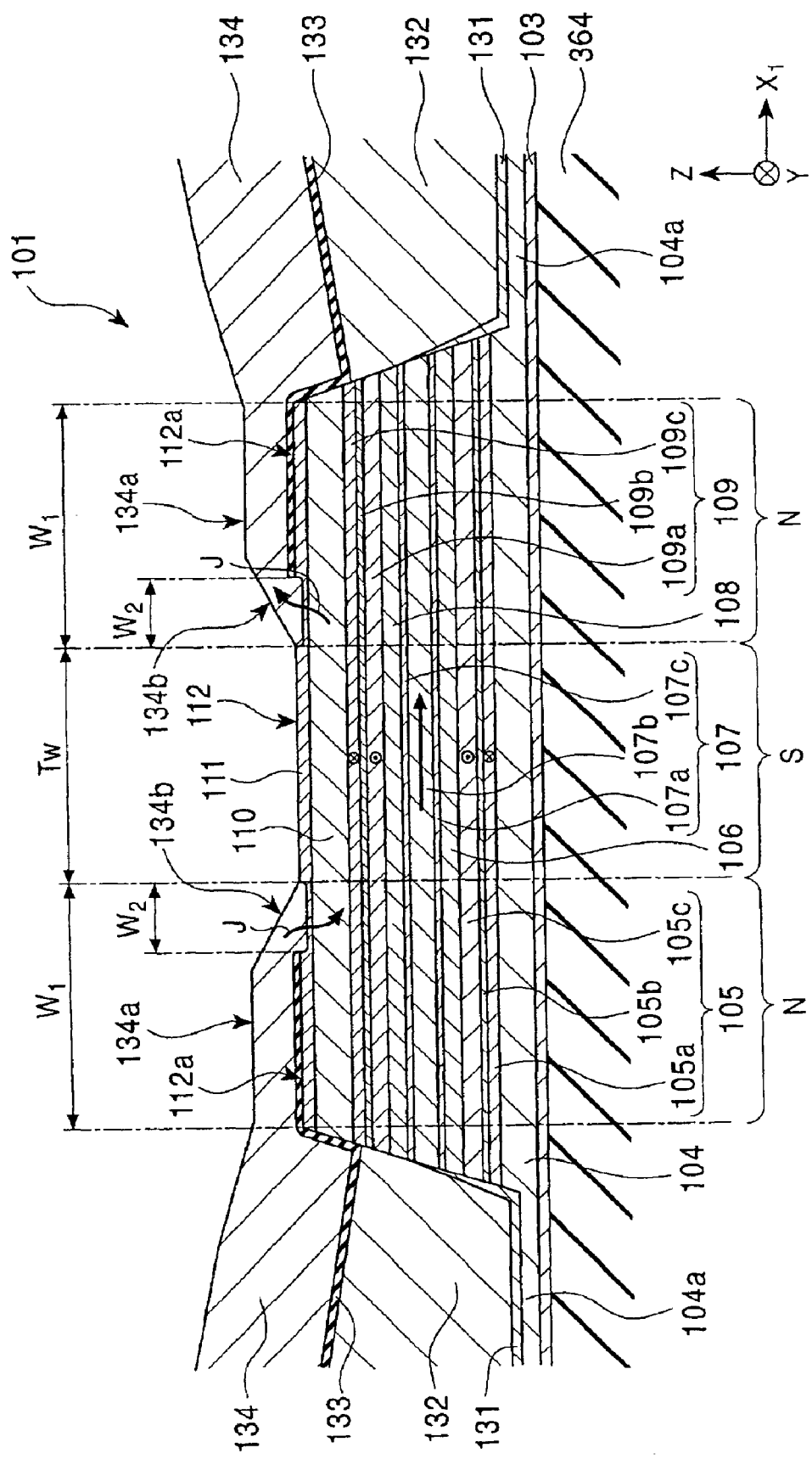
FIG. 18 is a schematic cross-sectional view of a spin-valve thin-film magnetic element in accordance with a second embodiment of the present invention.
Figure 19:
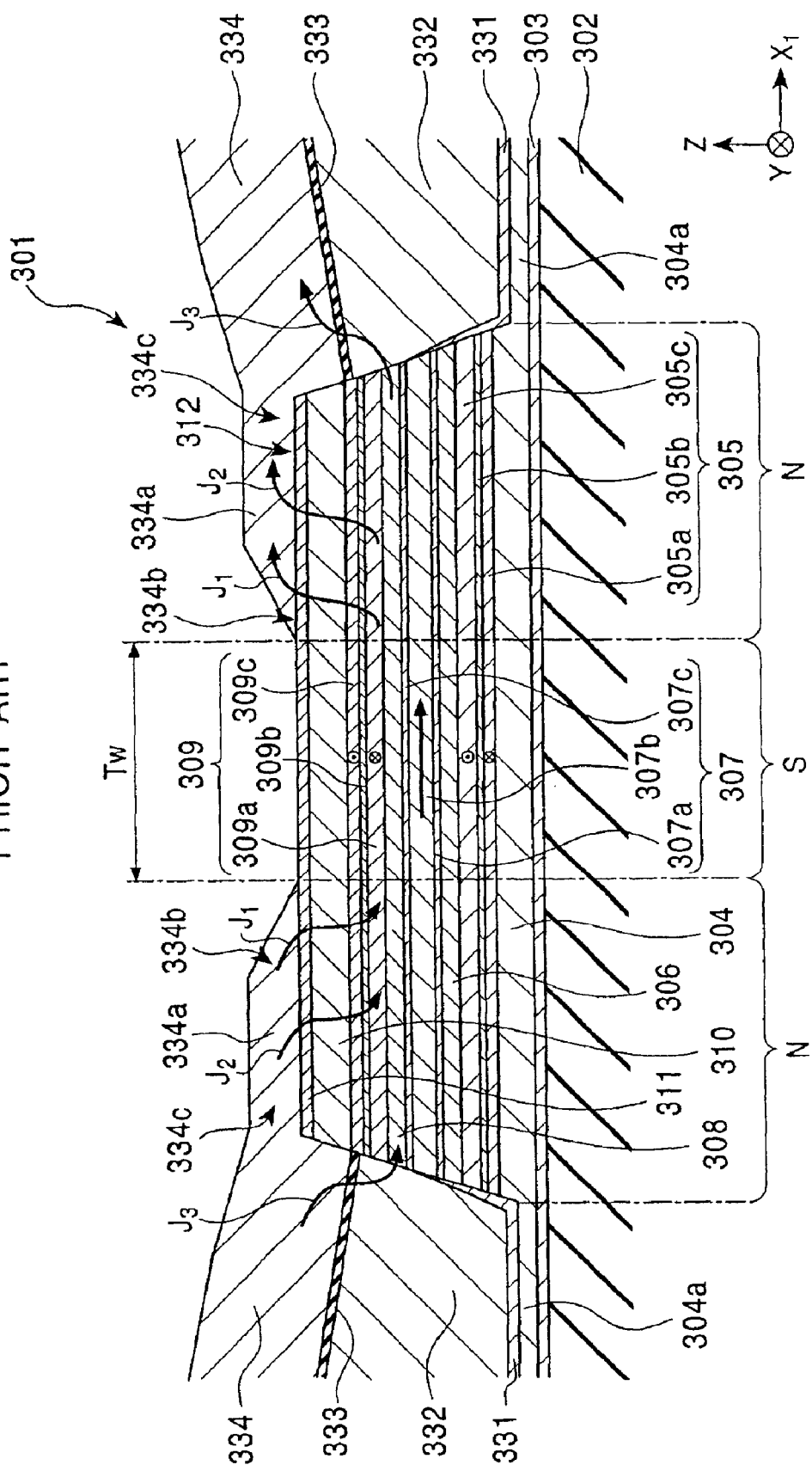
FIG. 19 is a cross-sectional view of a conventional spin-valve thin-film magnetic element.

A second embodiment of the present invention will now be described with reference to the drawings. FIG. 18 is a schematic cross-sectional view, when viewed from a magnetic recording medium, of a spin-valve thin-film magnetic element 101 in accordance with the second embodiment of the present invention.

This spin-valve thin-film magnetic element 101 also constitutes a thin-film magnetic head. The thin-film magnetic head and an inductive head constitute a floating magnetic head, like the first embodiment.

This spin-valve thin-film magnetic element 101 is of a dual type in which a first nonmagnetic conductive layer 106, a second nonmagnetic conductive layer 108, a first pinned magnetic layer 105, a second pinned magnetic layer 109, a first antiferromagnetic layer 104, and a second antiferromagnetic layer 110 are deposited on each of two faces of a free magnetic layer 107 in the thickness direction.

That is, the spin-valve thin-film magnetic element 101 has a lower insulating layer 364 and a laminate 112 formed on the lower insulating layer 364. The laminate 112 includes an underlayer 103, the first antiferromagnetic layer 104, the first pinned magnetic layer 105, the first nonmagnetic conductive layer 106, the free magnetic layer 107, the second nonmagnetic conductive layer 108, the second pinned magnetic layer 109, the second antiferromagnetic layer 110, and a protective layer 111, in that order from the bottom. The laminate 112 has a trapezoidal cross-section.

A pair of hard bias layers 132 composed of a CoPt alloy or the like is formed on both sides of the laminate 112 to orient the magnetic moment of the free magnetic layer 107. Furthermore, a pair of lead layers 134 is formed on the hard bias layers 132 to supply a sensing current to the laminate 112. The lead layers 134 are composed of Cr, Ta, W, Au, Rh, Cu, or the like.

As described above, the laminate 112 of this spin-valve thin-film magnetic element 101 has a dual spin-valve structure.

The free magnetic layer 107 is a composite of a first antidiffusion sublayer 107a composed of Co or the like, a free ferromagnetic sublayer 107b composed of a NiFe alloy or the like, and a second antidiffusion sublayer 107c composed of Co or the like. The first antidiffusion sublayer 107a and the second antidiffusion sublayer 107c prevent interdiffusion between the free ferromagnetic sublayer 107b and the first nonmagnetic conductive layer 106 and between the free ferromagnetic sublayer 107b and the second nonmagnetic conductive layer 108.

The thickness of each of the first antidiffusion sublayer 107a and the second antidiffusion sublayer 107c is preferably in the range of 0.2 nm to 1 nm, and the thickness of the free ferromagnetic sublayer 107b is preferably in the range of 1 nm to 5 nm.

The magnetic moment of the free magnetic layer 107 is oriented in the $X_1$ direction by a bias magnetic field from the hard bias layers 132. Since the free magnetic layer 107 is aligned in a single-domain state, Barkhausen noise of the spin-valve thin-film magnetic element 101 can be reduced.

The first antiferromagnetic layer 104 and the second antiferromagnetic layer 110 are provided to pin the magnetic moments of the first pinned magnetic layer 105 and the second pinned magnetic layer 109, respectively. These antiferromagnetic layers are preferably composed of the same PtMn alloy as that for the antiferromagnetic layer 4 in the first embodiment.

The first antiferromagnetic layer 104 and the second antiferromagnetic layer 110 may be composed of either an XMn alloy or a PtX'Mn alloy wherein X is one metal selected from Pt, Pd, Ir, Rh, Ru, and Os and X' is at least one element selected from Pd, Cr, Ru, Ni, Ir, Rh, Os, Au, Ag, Ne, Ar, Xe, and Kr, like the antiferromagnetic layer 4 in the first embodiment.

The composition of the PtMn alloy, the XMn alloy, and the PtX'Mn alloy and the thickness of the first antiferromagnetic layer 104 and the second antiferromagnetic layer 110 are substantially the same as those of the antiferromagnetic layer 4 in the first embodiment.

The thickness of the second antiferromagnetic layer 110 is preferably 12 nm or less and more preferably in the range of 8 nm to 12 nm.

Since the thickness of the second antiferromagnetic layer 110 having relatively high resistance is reduced to 12 nm or less, the sensing current from one lead layer 134 effectively flows into the laminate 112. Since the thickness of the second antiferromagnetic layer 110 is controlled to 8 nm or more, the exchange coupling magnetic field is sufficiently large to pin the magnetic moment of the second pinned magnetic layer 109.

Using an alloy having the above composition, the first antiferromagnetic layer 104 and the second antiferromagnetic layer 110 are annealed in a magnetic field to generate a large exchange coupling magnetic field. This exchange coupling magnetic field firmly pins the magnetic moment of the first pinned magnetic layer 105 and the magnetic moment of the second pinned magnetic layer 109. In particular, a first antiferromagnetic layer 104 and a second antiferromagnetic layer 110 composed of a PtMn alloy exhibit an exchange coupling magnetic field exceeding $6.4 \times 10^4$ A/m and have an extremely high blocking temperature of 653 K (380° C.) in which these antiferromagnetic layers lose the exchange coupling magnetic field.

The first pinned magnetic layer 105 is a composite of a first pinned ferromagnetic sublayer 105a, a first nonmagnetic interlayer 105b, and a second pinned ferromagnetic sublayer 105c. The second pinned ferromagnetic sublayer 105c is thicker than the first pinned ferromagnetic sublayer 105a.

The magnetic moment of the first pinned ferromagnetic sublayer 105a is pinned in the Y direction by an exchange coupling magnetic field with the first antiferromagnetic layer 104, while the second pinned ferromagnetic sublayer 105c is antiferromagnetically coupled with the first pinned ferromagnetic sublayer 105a and the magnetic moment of the second pinned ferromagnetic sublayer 105c is pinned in the opposite direction of the Y direction.

Since the magnetic moments of the first pinned ferromagnetic sublayer 105a and the second pinned ferromagnetic sublayer 105c are antiparallel to each other, these magnetic moments mutually counteract. Since the second pinned ferromagnetic sublayer 105c is thicker than the first pinned ferromagnetic sublayer 105a, a small magnetic moment remains in the second pinned ferromagnetic sublayer 105c. Thus, the overall magnetic moment of the pinned magnetic layer 105 is pinned in the opposite direction of the Y direction.

The second pinned magnetic layer 109 is a composite of a third pinned ferromagnetic sublayer 109a, a second nonmagnetic interlayer 109b, and a fourth pinned ferromagnetic sublayer 109c. The fourth pinned ferromagnetic sublayer 109c is thicker than the third pinned ferromagnetic sublayer 109a.

The magnetic moment of the fourth pinned ferromagnetic sublayer 109c is pinned in the Y direction by an exchange coupling magnetic field with the second antiferromagnetic layer 110, while the third pinned ferromagnetic sublayer 109a is antiferromagnetically coupled with the fourth pinned ferromagnetic sublayer 109c and the magnetic moment of the third pinned ferromagnetic sublayer 109a is pinned in the opposite direction of the Y direction.

Like the first pinned magnetic layer 105, the magnetic moments of the third pinned ferromagnetic sublayer 109a and fourth pinned ferromagnetic sublayer 109c mutually counteract. Since the fourth pinned ferromagnetic sublayer 109c is thicker than the third pinned ferromagnetic sublayer 109a, a small magnetic moment remains in the fourth pinned ferromagnetic sublayer 109c. Thus, the overall magnetic moment of the second pinned magnetic layer 109 is pinned in the Y direction in the drawing.

Accordingly, the first pinned ferromagnetic sublayer 105a and the second pinned ferromagnetic sublayer 105c in the first pinned magnetic layer 105 and the third pinned ferromagnetic sublayer 109a and the fourth pinned ferromagnetic sublayer 109c in the second pinned magnetic layer 109 are antiferromagnetically coupled with each other, and the magnetic moments of the second pinned ferromagnetic sublayer 105c and the fourth pinned ferromagnetic sublayer 109c slightly remain. Accordingly, the first pinned magnetic layer 105 and the second pinned magnetic layer 109 exhibit a synthetic ferrimagnetic state.

Moreover, the magnetic moment of the free magnetic layer 107 is substantially orthogonal to the magnetic moments of the first pinned magnetic layer 105 and the second pinned magnetic layer 109.

As shown in FIG. 18, the magnetic moment of the second pinned ferromagnetic sublayer 105c lying in the vicinity of the free magnetic layer 107 and the magnetic moment of the third pinned ferromagnetic sublayer 109a lying in the vicinity of the free magnetic layer 107 are oriented in the same direction. Thus, the magnetoresistive effect generated by the interaction between the free magnetic layer 107 and the first pinned magnetic layer 105 and the magnetoresistive effect generated by the interaction between the free magnetic layer 107 and the second pinned magnetic layer 109 do not counteract, resulting in a high rate of change in magnetoresistance of the spin-valve thin-film magnetic element 101.

The first, second, third, and fourth pinned ferromagnetic sublayers 105a, 105c, 109a, and 109c, respectively, are composed of a NiFe alloy, elemental Co, a CoNiFe alloy, a CoFe alloy, a CoNi alloy, or the like, and preferably composed of elemental Co. Preferably, the first, second, third, and fourth pinned ferromagnetic sublayers 105a, 105c, 109a, and 109c, respectively, are composed of the same material.

The first nonmagnetic interlayer 105b and the second nonmagnetic interlayer 109b are preferably composed of at least one metal of Ru, Rh, Ir, Cr, Re, and Cu and more preferably Ru.

Each of the first pinned ferromagnetic sublayer 105a and the fourth pinned ferromagnetic sublayer 109c has a thickness in the range of 1 nm to 3 nm. Each of the second pinned ferromagnetic sublayer 105c and the third pinned ferromagnetic sublayer 109a has a thickness in the range of 2 nm to 3 nm. Each of the first nonmagnetic interlayer 105b and the second nonmagnetic interlayer 109b has a thickness in the range of 0.7 nm to 0.9 nm.

Each of the first pinned magnetic layer 105 and the second pinned magnetic layer 109 has two pinned ferromagnetic sublayers (first, second, third, and fourth pinned ferromagnetic sublayers 105a, 105c, 109a, and 109c, respectively). Alternatively, each layer may have three or more pinned ferromagnetic sublayers. In such a case, it is preferable that these pinned ferromagnetic sublayers be separated by nonmagnetic interlayers and the magnetic moments of two adjacent pinned ferromagnetic sublayers be antiparallel to each other so that the overall layer is in a ferrimagnetic state.

Accordingly, the first and second pinned magnetic layers 105 and 109, respectively, exhibit synthetic ferrimagnetism and are firmly pinned.

The first and second nonmagnetic conductive layers 106 and 108 moderate magnetic coupling between the free magnetic layer 107 and the pinned magnetic layer 105 and between the free magnetic layer 107 and the second pinned magnetic layer 109, respectively. Furthermore, a sensing current primarily flows in the first and second nonmagnetic conductive layers 106 and 108, respectively. Thus, the first and second nonmagnetic conductive layers 106 and 108, respectively, are preferably composed of a conductive nonmagnetic material, such as Cu, Cr, Au, and Ag, and more preferably composed of Cu. The first and second nonmagnetic conductive layers 106 and 108, respectively, preferably have a thickness in the range of 2 nm to 3 nm.

The first antiferromagnetic layer 104 extends to both sides in the $X_1$ direction compared with the free magnetic layer 107. The hard bias layers 132 and the lead layers 134 are deposited in that order on the extensions 104a of the first antiferromagnetic layer 104.

The extensions 104a and the hard bias layers 132 are separated by bias underlayers 131 composed of Ta, W, or Cr. When hard bias layers 132 composed of Cr are formed on the bias underlayers 131, the hard bias layers 132 have a large coercive force and a large remanence ratio, thus increasing a bias magnetic field which is required for single-domain alignment of the free magnetic layer 107.

The hard bias layers 132 are composed of, for example, a CoPt alloy and are provided in both sides of the laminate 112 in the $X_1$ direction (track width direction). In this embodiment, the hard bias layers 132 extend on both sides of the free magnetic layer 107 in the $X_1$ direction to effectively apply a bias magnetic field to the free magnetic layer 107, to orient the magnetic moment of the free magnetic layer 107, and to reduce Barkhausen noise.

The hard bias layers 132 are covered by insulating layers 133 which extend to cover the both top ends 112a of the laminate 112 in the $X_1$ direction. The top ends 112a are adjacent to the hard bias layers 132.

Preferably, the insulating layers 133 are composed of the same material as that for and have the same thickness as that of the insulating layers 33 in the first embodiment.

The lead layers 134 are formed on the hard bias layers 132 separated by the insulating layers 133, and extend toward the center of the laminate 112 compared with the insulating layers 133. In other words, the lead layers 134 have overlay sections 134a, and edges 134b thereof partially extend on and are in contact with the laminate 112.

The two lead layers 134 are disposed at a distance Tw in the $X_1$ direction. This distance Tw defines an optical track width of the spin-valve thin-film magnetic element 101.

A preferred width $W_1$ of the overlay sections 134a and a preferred width W2 of the edges 134b are the same as those in the first embodiment.

The lead layers 134 are in contact with the laminate 112 only at the edges 134b thereof and are insulated from the laminate 112 and the hard bias layers 132 by the insulating layers 133 at the other portions.

Thus, a sensing current from one lead layer 134 flows into the laminate 112 only through one edge 134b and then into the other lead layer 134 through the other edge 134b, as shown by arrows J in FIG. 18.

Since the lead layers 134 are insulated from the hard bias layers 132 by the insulating layers 133, the sensing current does not flow into the hard bias layers 132 and thus into the top ends 112a.

Moreover, the insulating layers 133 between the overlay sections 134a and the top ends 112a of the laminate 112 prevent leakage of the sensing current therebetween.

Accordingly, in this spin-valve thin-film magnetic element 101, the sensing current is concentrated into the sensitive region S in the center which is not provided with the lead layers 134, like the spin-valve thin-film magnetic element 1 in the first embodiment.

In contrast, in regions covered by the edges 134b of the lead layers 134 and the insulating layers 133, the sensing current is low. These regions exhibit a poor MR effect and thus low detection sensitivity to the leakage magnetic field. In particular, the sensing current does not flow into the top ends 112a covered by the insulating layers 133, and the these top ends 112a do not have sensitivity to the leakage magnetic field from the magnetic recording medium. These regions are referred to as insensitive regions N, as shown in FIG. 18.

As described above, the laminate 112 is divided into the sensitive region S, which contributes to reading the recording magnetic field from the magnetic recording medium, and the insensitive regions N, which does not contribute to reading the recording magnetic field. Since the width Tw of the sensitive region S corresponds to the track width, the track width of the spin-valve thin-film magnetic element 101 can be reduced.

Moreover, the sensitive region S of the laminate 112 is distant from the hard bias layers 132; hence, the sensitive region S is not pinned by a strong bias magnetic field, resulting in improved output characteristics of the spin-valve thin-film magnetic element 101.

Since the insulating layers 133 prevent the sensing current from flowing in the top ends 112a of the laminate 112, the top ends 112a do not exhibit an MR effect. Thus, the spin-valve thin-film magnetic element 101 does not generate side reading.

In a method for making the above-mentioned spin-valve thin-film magnetic element 101, the first antiferromagnetic layer 104, the first pinned ferromagnetic sublayer 105a, the first nonmagnetic interlayer 105b, the second pinned ferromagnetic sublayer 105c, the first nonmagnetic conductive layer 106, the first antidiffusion sublayer 107a, the free ferromagnetic sublayer 107b, the second antidiffusion sublayer 107c, the second nonmagnetic conductive layer 108, the third pinned ferromagnetic sublayer 109a, the second nonmagnetic interlayer 109b, the fourth pinned ferromagnetic sublayer 109c, the second antiferromagnetic layer 110, and the protective layer 111 are deposited in that order in the laminate forming step. The other steps are the same as those in the first embodiment. That is, the spin-valve thin-film magnetic element 101 according to the second embodiment can also be made by any one of the two methods described in the first embodiment.

The present invention may have any modification of the above embodiments. For example, the free magnetic layer may have a ferromagnetic single-layer structure or a ferromagnetic-antidiffusion double-layer structure, in place of the ferromagnetic-antidiffusion-ferromagnetic triple-layer structure in this embodiment. Similarly, the pinned magnetic layer may have a ferromagnetic single-layer structure.

In the first embodiment, the free magnetic layer 7 and the protective layer 8 may be separated by a back layer. The back layer extends the mean free path of spin-up conduction electrons and thus increases the rate of change in resistance of the magnetoresistive element.

In the first embodiment, the laminate 9 may have a top-type single spin-valve configuration in which the antiferromagnetic layer lies at a position distant from the lower insulating layer (substrate) rather than the free magnetic layer. In the top-type configuration, for example, the underlayer, the free magnetic layer, the nonmagnetic conductive layer, the pinned magnetic layer, the antiferromagnetic layer, and the protective layer may be deposited in that order.

In the second embodiment, the free magnetic layer 107 may be a composite of two free ferromagnetic layers separated by a nonmagnetic conductive layer. These free ferromagnetic layers are antiferromagnetically coupled.

The first pinned magnetic layer 105 and/or the second pinned magnetic layer 109 may have a ferromagnetic single-layer configuration.

In the spin-valve thin-film magnetic element according to the first or second embodiment, the magnetic moment of the pinned magnetic layer may be pinned by a sensing current magnetic field which is generated by the sensing current, in place of the antiferromagnetic layer.

Third Embodiment

Figure 20:
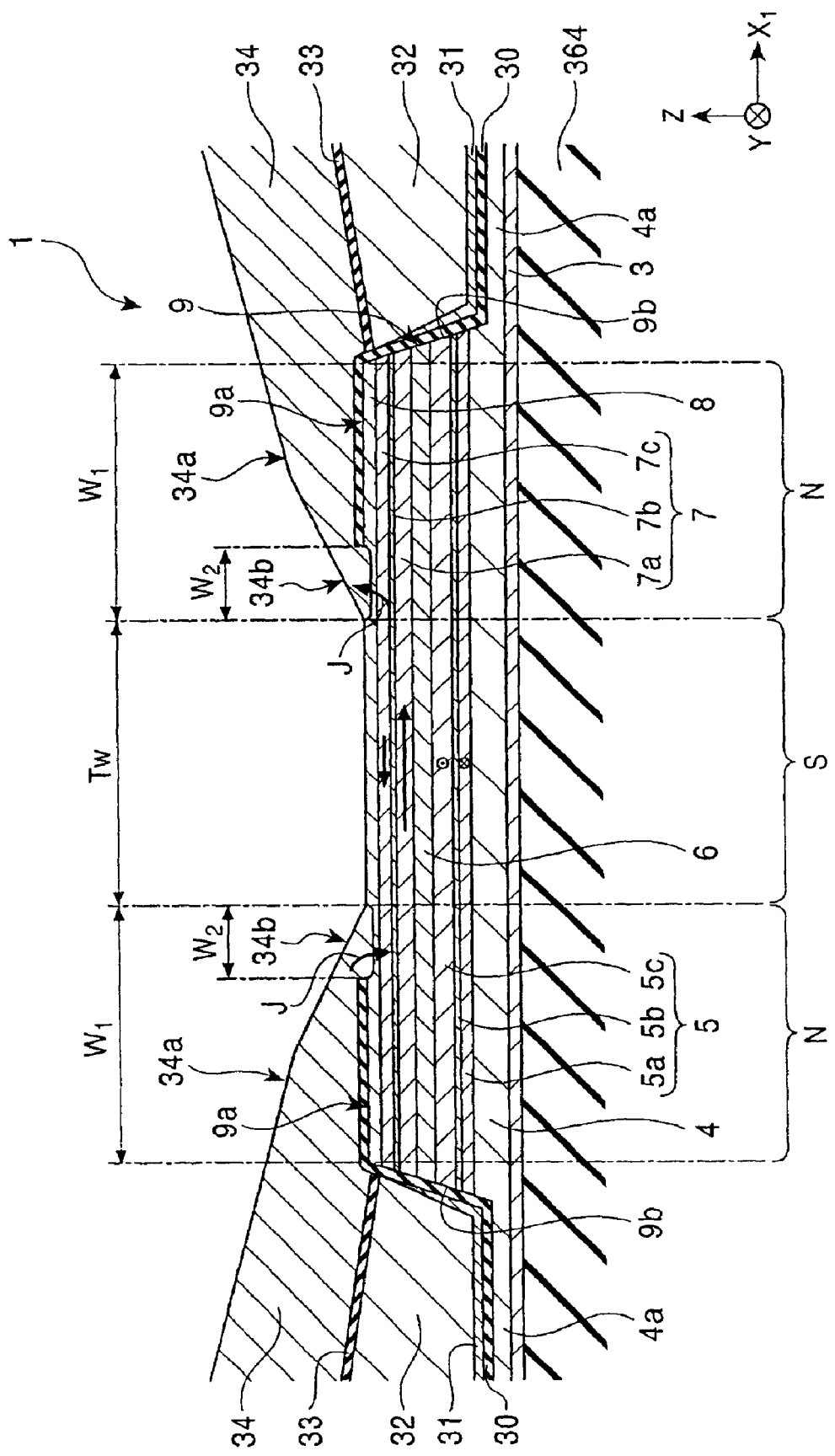
FIG. 20 is a schematic cross-sectional view of a spin-valve thin-film magnetic element in accordance with a third embodiment of the present invention.

FIG. 20 is a schematic cross-sectional view, when viewed from a magnetic recording medium, of a spin-valve thin-film magnetic element 1 in accordance with a third embodiment of the present invention. FIG. 2 shows a floating magnetic head 350 having a thin-film magnetic head 300 which includes the spin-valve thin-film magnetic element 1. FIG. 3 is a cross-sectional view of the main portion of the thin-film magnetic head 300.

The floating magnetic head 350 shown in FIG. 2 includes a slider 351 and the thin-film magnetic head 300 which is provided on one side face 351*d* of the slider 351. The slider 351 has a leading end 355 lying at the upstream side of the moving direction of the magnetic recording medium and a trailing end 356. The slider 351 also has rails 351*a* and 351*b* on an opposing face 352 which opposes the magnetic recording medium. Air grooves 351*c* are thereby formed between the rails 351*a* and 351*b*.

Referring to FIG. 3, the thin-film magnetic head 300 is deposited on an insulating layer 362 which is formed on the side face 351*d* of the slider 351. This thin-film magnetic head 300 includes a lower shielding layer 363 provided on the insulating layer 362, a lower insulating layer 364 formed on the lower shielding layer 363, the spin-valve thin-film magnetic element 1 formed on the lower insulating layer 364 and exposed to the opposing face 352, an upper insulating layer 366 which covers the spin-valve thin-film magnetic element 1, and an upper shielding layer 367 which covers the upper insulating layer 366. The upper shielding layer 367 also functions as a lower core layer of an inductive head h, as described below.

The inductive head h includes the lower core layer (upper shielding layer) 367, a gap layer 374 provided on the upper shielding layer 367, a coil layer 376, an upper insulating layer 377 which covers the coil layer 376, and an upper core layer 378 which is coupled with the gap layer 374 at the opposing face 352 and the upper shielding layer 367 in the center of the coil layer 376.

The coil layer 376 has a planar spiral pattern. A base 378*b* of the upper core layer 378 is magnetically coupled with the upper shielding layer 367 in the center of the coil layer 376.

The upper core layer 378 is covered by a core protective layer 379 composed of alumina or the like.

Referring to FIG. 20, the spin-valve thin-film magnetic element 1 of this embodiment is a bottom-type single spin-valve thin-film magnetic element including a free magnetic layer, a nonmagnetic conductive layer, a pinned magnetic layer, and an antiferromagnetic layer which lies at a lower insulating layer side.

The spin-valve thin-film magnetic element 1 includes a laminate 9 and is formed on a substrate as a lower insulating layer 364. The laminate 9 includes an underlayer 3 composed of Ta or the like, an antiferromagnetic layer 4, a pinned magnetic layer 5, a nonmagnetic conductive layer 6 composed of Cu or the like, a free magnetic layer 7, and a protective layer 8 composed of Ta or the like from the bottom. A pair of hard bias layers 32 composed of a CoPt alloy or the like is formed on both sides of the laminate 9 to orient the magnetic moment of the free magnetic layer 7. Furthermore, a pair of lead layers 34 is formed at least on the hard bias layers 32 to supply a sensing current to the laminate 9. The lead layers 34 are composed of Cr, Ta, W, Au, Rh, Cu, or the like.

The free magnetic layer 7 is a composite of a first free ferromagnetic sublayer 7*a*, a first nonmagnetic interlayer 7*b*, and a second free ferromagnetic sublayer 7*c*. The thickness of the second free ferromagnetic sublayer 7*c* is smaller than that of the first free ferromagnetic sublayer 7*a*.

The magnetic moment of the first free ferromagnetic sublayer 7*a* is oriented in the $X_1$ direction by a bias magnetic field of the hard bias layers 32. The second free ferromagnetic sublayer 7*c* is antiferromagnetically coupled with the first free ferromagnetic sublayer 7*a* through the first nonmagnetic interlayer 7*b* and the magnetic moment of the second free ferromagnetic sublayer 7*c* is oriented to the opposite direction of the $X_1$ direction.

Since the magnetic moments of the first free ferromagnetic sublayer 7*a* and the second free ferromagnetic sublayer 7*c* are antiparallel to each other, these magnetic moments mutually counteract. Since the first free ferromagnetic sublayer 7*a* is thicker than the second free ferromagnetic sublayer 7*c*, a small magnetic moment remains in the first free ferromagnetic sublayer 7*a*. Thus, the overall magnetic moment of the free magnetic layer 7 is oriented in the $X_1$ direction.

The second free ferromagnetic sublayer 7*c* may be thicker than the first free ferromagnetic sublayer 7*a* in this embodiment. In such a case, the overall magnetic moment of the free magnetic layer 7 is oriented in the direction of the magnetic moment of the second free ferromagnetic sublayer 7*c*.

The first free ferromagnetic sublayer 7*a* and the second free ferromagnetic sublayer 7*c* are composed of a NiFe alloy, elemental Co, a CoNiFe alloy, a CoFe alloy, and a CoNi alloy. Among these, a NiFe alloy is preferred. Furthermore, the first free ferromagnetic sublayer 7*a* and the second free ferromagnetic sublayer 7c are preferably composed of the same material. The first nonmagnetic interlayer 7b is preferably composed of at least one metal of Ru, Rh, Ir, Cr, Re, and Cu and more preferably Ru.

The first free ferromagnetic sublayer 7a preferably has a thickness in the range of 3 to 6 nm. The second free ferromagnetic sublayer 7c preferably has a thickness in the range of 0.5 to 4 nm. The first nonmagnetic interlayer 7b preferably has a thickness in the range of 0.7 to 0.9 nm.

In the free magnetic layer 7, the first free ferromagnetic sublayer 7a and the second free ferromagnetic sublayer 7c are antiferromagnetically coupled with each other and the magnetic moment of the first free ferromagnetic sublayer 7a remains; hence, the free magnetic layer 7 exhibits synthetic ferrimagnetism. The magnetic moment of the free magnetic layer 7 can, therefore, vary in response to a slight change in an external magnetic field, resulting in increased sensitivity of the spin-valve thin-film magnetic element 1.

The pinned magnetic layer 5 is a composite of a first pinned ferromagnetic sublayer 5a, a second nonmagnetic interlayer 5b, and a second pinned ferromagnetic sublayer 5c. The second pinned ferromagnetic sublayer 5c is thicker than the first pinned ferromagnetic sublayer 5a.

The magnetic moment of the first pinned ferromagnetic sublayer 5a is pinned in the Y direction by an exchange coupling magnetic field with the antiferromagnetic layer 4, while the second pinned ferromagnetic sublayer 5c is antiferromagnetically coupled with the first pinned ferromagnetic sublayer 5a through the second nonmagnetic interlayer 5b and the magnetic moment of the second pinned ferromagnetic sublayer 5c is pinned in the opposite direction of the Y direction.

Since the magnetic moments of the first pinned ferromagnetic sublayer 5a and the second pinned ferromagnetic sublayer 5c are antiparallel to each other, these magnetic moments mutually counteract. Since the second pinned ferromagnetic sublayer 5c is thicker than the first pinned ferromagnetic sublayer 5a, a small magnetic moment remains in the second pinned ferromagnetic sublayer 5c. Thus, the overall magnetic moment of the pinned magnetic layer 5 is pinned in the opposite direction of the Y direction.

In this embodiment, the first pinned ferromagnetic sublayer 5a may be thicker than the second pinned ferromagnetic sublayer 5c. In such a case, the overall magnetic moment of the pinned magnetic layer 5 is pinned in the direction of the magnetic moment of the first pinned ferromagnetic sublayer 5a.

The first pinned ferromagnetic sublayer 5a and the second pinned ferromagnetic sublayer 5c are composed of a NiFe ally, elemental Co, a CoNiFe alloy, a CoFe alloy, a CoNi alloy, or the like. Among these materials, elemental Co is preferred. Moreover, the first pinned ferromagnetic sublayer 5a and the second pinned ferromagnetic sublayer 5c are preferably composed of the same material. The second nonmagnetic interlayer 5b is preferably composed of at least one metal of Ru, Rh, Ir, Cr, Re, and Cu and more preferably Ru.

The first pinned ferromagnetic sublayer 5a has a thickness in the range of 1 to 2.5 nm. The second pinned ferromagnetic sublayer 5c has a thickness in the range of 2 to 3 nm. The second nonmagnetic interlayer 5b has a thickness in the range of 0.7 to 0.9 nm.

In the pinned magnetic layer 5, the first pinned ferromagnetic sublayer 5a and the second pinned ferromagnetic sublayer 5c are antiferromagnetically coupled with each other and the magnetic moment of the second pinned ferromagnetic sublayer 5c remains; hence, the pinned magnetic layer 5 exhibits synthetic ferrimagnetism. The magnetic moment of the pinned magnetic layer 5 can, therefore, be firmly pinned. The magnetic moment of the free magnetic layer 7 is substantially orthogonal to the magnetic moment of the pinned magnetic layer 5.

Each of the free magnetic layer 7 and the pinned magnetic layer 5 has two ferromagnetic layers (first and second free ferromagnetic sublayers 7a and 7c and first and second pinned ferromagnetic sublayers 5a and 5c, respectively). Alternatively, each layer may have three or more ferromagnetic sublayers. In such a case, it is preferable that these ferromagnetic sublayers be separated by nonmagnetic interlayers and the magnetic moments of two adjacent ferromagnetic layers be antiparallel to each other so that the overall layer is in a ferrimagnetic state.

The nonmagnetic conductive layer 6 moderates magnetic coupling between the free magnetic layer 7 and the pinned magnetic layer 5. Furthermore, a sensing current primarily flows in the nonmagnetic conductive layer 6. Thus, the nonmagnetic conductive layer 6 is preferably formed of a conductive nonmagnetic material, such as Cu, Cr, Au, and Ag, and more preferably formed of Cu. The nonmagnetic conductive layer 6 preferably has a thickness in the range of 2 to 3 nm.

The antiferromagnetic layer 4 is preferably composed of a PtMn alloy. The PtMn alloy exhibits higher corrosion resistance compared with NiMn alloys and FeMn alloys which have been conventionally used for antiferromagnetic layers, a high blocking temperature, and a large exchange coupling magnetic field.

The antiferromagnetic layer 4 may be composed of either an XMn alloy or a PtX'Mn alloy wherein X is one metal selected from Pt, Pd, Ir, Rh, Ru, and Os and X' is at least one element selected from Pd, Cr, Ru, Ni, Ir, Rh, Os, Au, Ag, Ne, Ar, Xe, and Kr.

In the PtMn alloy and the XMn alloy, Pt and X contents are preferably in the range of 37 to 63 atomic percent and more preferably 44 to 57 atomic percent.

In the PtX'Mn alloy, the total of X' and Pt contents is preferably in the range of 37 to 63 atomic percent and more preferably 44 to 57 atomic percent.

The antiferromagnetic layer 4 preferably has a thickness in the range of 8 to 20 nm.

An alloy having the above composition is annealed in a magnetic field to make an antiferromagnetic layer which generates a large exchange coupling magnetic field. This exchange coupling magnetic field firmly pins the magnetic moment of the pinned magnetic layer 5. In particular, an antiferromagnetic layer 4 composed of a PtMn alloy exhibits an exchange coupling magnetic field exceeding $6.4 \times 10^4$ A/m and has an extremely high blocking temperature of 653 K (380° C.) in which the antiferromagnetic layer 4 loses the exchange coupling magnetic field.

The antiferromagnetic layer 4 extends towards both sides in the $X_1$ direction. Insulating layers 30, the hard bias layers 32, and the lead layers 34 are provided on the extensions 4a of the antiferromagnetic layer 4. The insulating layers 30 are also provided on side faces 9b of the laminate 9.

The insulating layers 30 and the hard bias layers 32 are separated by bias underlayers 31 composed of Ta, W, or Cr. When the bias underlayers 31 are composed of, for example, Cr which is a nonmagnetic metal and has a body centered cubic (bcc) structure, the hard bias layers 32 formed thereon have a large coercive force and a large remanence ratio, thus increasing a bias magnetic field required for single-domain alignment of the free magnetic layer 7.

The hard bias layers 32 are composed of, for example, a CoPt alloy and are provided at both sides of the laminate 9 in the $X_1$ direction (track width direction). In this embodiment, the hard bias layers 32 extend on both sides of the free magnetic layer 7 in the $X_1$ direction to effectively apply a bias magnetic field to the free magnetic layer 7, to orient the magnetic moment of the free magnetic layer 7, and to reduce Barkhausen noise.

The insulating layers 30 are provided over the extensions 4a, the side faces 9b of the laminate 9, and top ends 9a in the $X_1$ direction of the laminate 9. The top ends 9a are adjacent to the hard bias layers 32.

The hard bias layers 32 are covered by insulating layers 33. The insulating layers 33 are joined to the insulating layers 30 at sides of the laminate 9 above the hard bias layers 32.

The insulating layers 30 and 33 are preferably composed of one oxide selected from aluminum oxide, silicon oxide, tantalum oxide, titanium oxide, zirconium oxide, hafnium oxide, chromium oxide, vanadium oxide, and niobium oxide or one compound oxide composed of at least two of these oxides. The thickness of these layers is preferably in the range of 0.5 nm to 20 nm.

If the thickness of the insulating layers 30 is less than 0.5 nm at the side faces 9b of the laminate 9, pinholes would be formed in the insulating layers 30, resulting in insufficient insulation between the hard bias layers 32 and the laminate 9. At a thickness exceeding 20 nm, the bias magnetic field from the hard bias layers 32 may not sufficiently orient the magnetic moment of the free magnetic layer 7 in the direction described above. Furthermore, the gap width undesirably increases because the spin-valve thin-film magnetic element 1 has a large thickness.

If the thickness of the insulating layers 33 is less than 0.5 nm, pin holes would be formed in the insulating layers 33. At a thickness exceeding 20 nm, the gap width undesirably increases because the spin-valve thin-film magnetic element 1 has a large thickness.

The lead layers 34 are formed on the hard bias layers 32 separated by the insulating layers 33, and extend toward the center of the laminate 9 compared with the insulating layers 30. In other words, the lead layers 34 have overlay sections 34a and edges 34b thereof partially extend on and are in contact with the laminate 9.

The two lead layers 34 are disposed at a distance Tw in the $X_1$ direction. This distance Tw defines an optical track width of the spin-valve thin-film magnetic element 1.

The width (represented by symbol $W_1$ in FIG. 20) of the overlay sections 34a in the track width direction is preferably in the range of 0.1 μm to 0.3 μm. In such a configuration, the bias magnetic field fixes the magnetic moment of the free magnetic layer at both ends. Since no sensing currents flow at the both ends of the free magnetic layer, the spin-valve thin-film magnetic element 1 has a reduced track width.

The lead layers 34 are in contact with the laminate 9 only at the edges 34b and are insulated from the laminate 9 by the insulating layers 30 at other portions. The lead layers 34 are also insulated from the hard bias layers 32 by the insulating layers 33. Thus, a sensing current from one lead layer 34 flows into the laminate 9 via one edge 34b and the other lead layer 34 via the other edge 34b, as shown in arrows J in the drawing, and the sensing current does not flow through the side faces 9b into the laminate 9.

The width $W_2$ of the edges 34b of the lead layers 34 in the $X_1$ direction is preferably in the range of 0.01 μm to 0.05 μm to ensure wide contact areas between the lead layers 34 and the laminate 9. Since the contact resistance at the edges 34b is reduced, the sensing current effectively flows in the laminate 9.

Since the lead layers 34 are insulated from the hard bias layers 32 by the insulating layers 33 and since the hard bias layers 32 are insulated from the side faces 9b of the laminate 9 by the insulating layers 30, the sensing current does not flow into the side faces 9b via the hard bias layers 32.

Moreover, the insulating layers 30 extend between the overlay sections 34a and the top ends 9a of the laminate 9; hence, the sensing current does not flow into one top end 9a via one overlay section 34a and into the other top end 9a via the other overlay section 34a.

In the laminate 9, the sensing current is concentrated in the center which is not provided with the lead layers 34. Thus, the center exhibits an outstanding magnetoresistive (MR) effect and a high sensitivity to a leakage magnetic field from a magnetic recording medium. Thus, the center is defined as a sensitive region S, as shown in FIG. 20.

In contrast, the sensing current flows in only small portions of the laminate 9 which are in contact with the edges 34b. Thus, the top portions exhibit a small MR effect and are insensitive to the leakage magnetic field of the magnetic recording medium.

Moreover, at the top ends 9a of the laminate 9, the magnetic moment of the free magnetic layer 7 is firmly fixed by the bias magnetic field from the hard bias layers 32; hence, these top ends 9a barely exhibit an MR effect.

In addition, the insulating layers 30 prevent the sensing current from flowing in the top ends 9a. Thus, the top ends 9a exhibit no MR effects and is quite insensitive to the leakage magnetic field from the magnetic recording medium.

Accordingly, the top portions in contact with the edges 34b are defined as insensitive regions N, as shown in FIG. 20.

As described above, the laminate 9 is divided into the sensitive region S, which contributes to reading the recording magnetic field from the magnetic recording medium, and the insensitive regions N, which do not contribute to reading the recording magnetic field. Since the width Tw of the sensitive region S corresponds to the track width, the track width of the spin-valve thin-film magnetic element 1 can be reduced.

Moreover, the sensing current can be concentrated into the sensitive region S of the laminate 9, the rate of change in resistance in the sensitive region S is improved, resulting in improved output characteristics of the spin-valve thin-film magnetic element 1.

Since the insulating layers 30 prevent the sensing current from flowing in the top ends 9a of the laminate 9, the top ends 9a do not exhibit an MR effect. Thus, the spin-valve thin-film magnetic element 1 does not generate side reading.

A third method for making the spin-valve thin-film magnetic element 1 according to the third embodiment will now be described with reference to the drawings.

This method includes a laminate forming step which forms a laminate having a trapezoidal cross-section on a substrate, a bias layer forming step for depositing hard bias layers, an insulating layer forming step, a second resist layer forming step, an etching step, and a lead layer forming step.

Figure 21:
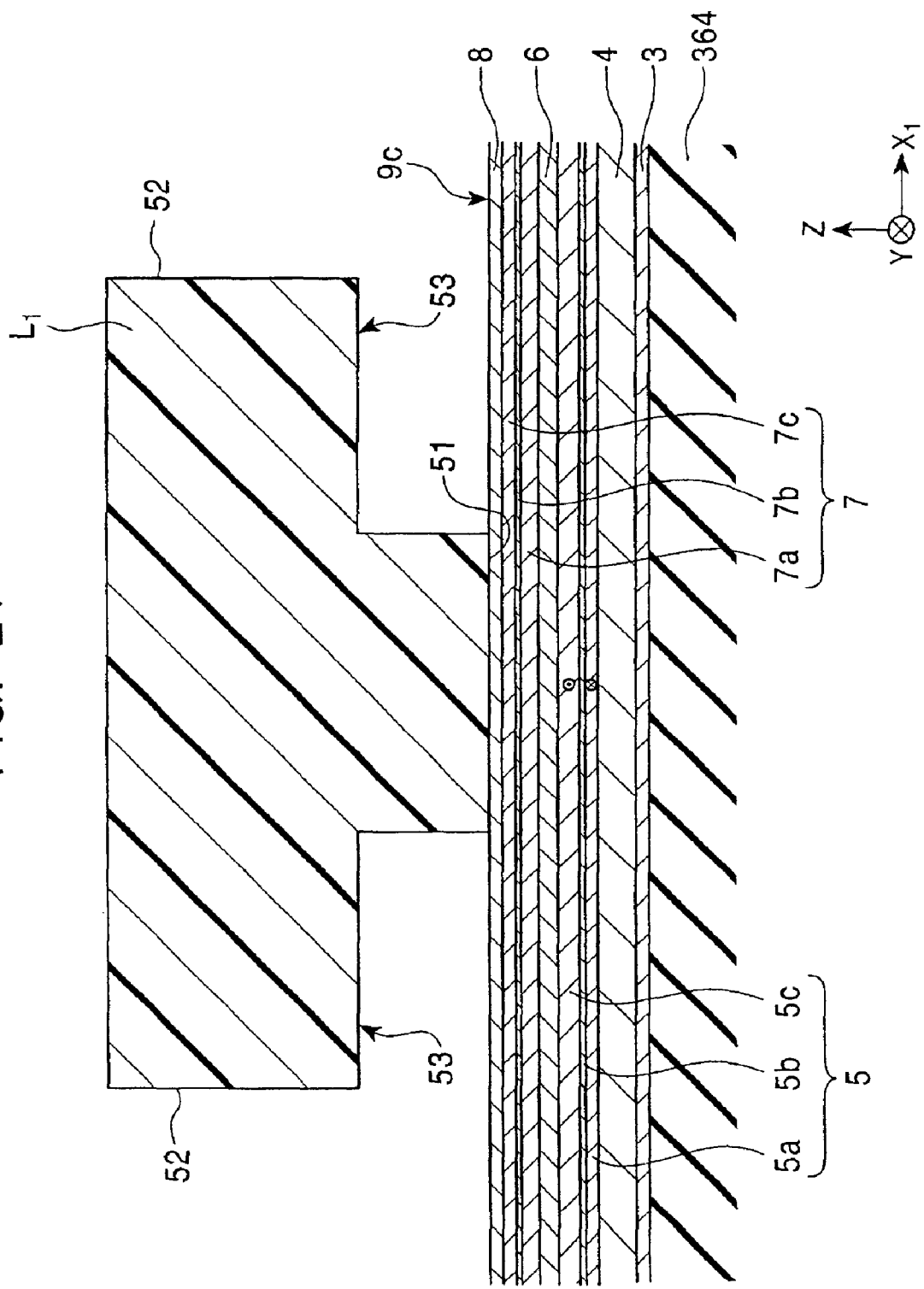
FIG. 21 is a cross-sectional view showing a laminate forming step in a method for making the spin-valve thin-film magnetic element in accordance with the third embodiment of the present invention.

Referring to FIG. 21, in the laminate forming step, the underlayer 3, the antiferromagnetic layer 4, the first pinned ferromagnetic sublayer 5a, the second nonmagnetic interlayer 5b, the second pinned ferromagnetic sublayer 5c, the nonmagnetic conductive layer 6, the first free ferromagnetic sublayer 7a, the first nonmagnetic interlayer 7b, the second free ferromagnetic layer 7c, and the protective layer 8 are deposited in that order on the lower insulating layer (substrate) 364 to form a laminate layer 9c.

The laminate layer 9c is annealed in a magnetic field to pin the magnetic moment of the pinned magnetic layer 5 by an exchange coupling magnetic field from the antiferromagnetic layer 4 to the pinned magnetic layer 5.

Next, a first lift-off resist layer $L_1$ is formed on the laminate layer 9c. The first lift-off resist layer $L_1$ has a contact face 51 which is in contact with the laminate layer 9c and two side faces 52, the contact face 51 lying between these side faces 52. A pair of incisions 53 is provided between the side faces 52 and the contact face 51 in the track width direction.

Figure 22:
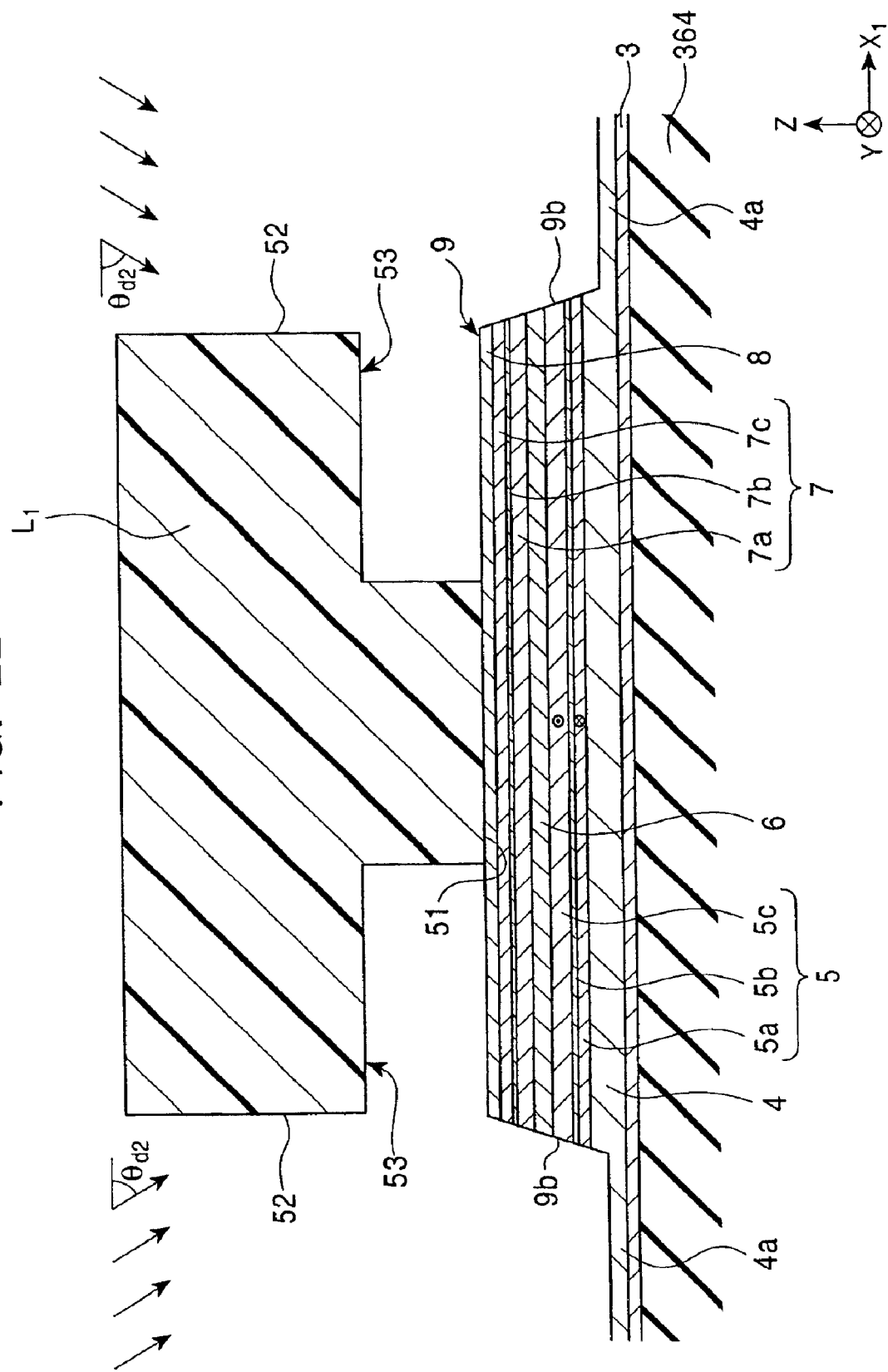
FIG. 22 is a cross-sectional view showing a laminate forming step subsequent to the step shown in FIG. 21.

Referring to FIG. 22, the laminate layer 9c is irradiated with etching particles containing ion beams of inert gas such as Ar at an etching angle $\theta_{d2}$ with respect to the lower insulating layer (substrate) 364 to etch both sides of the laminate layer 9c so that the lower half (extension) 4a of the antiferromagnetic layer 4 remains at each of the both sides which lie outside the side faces 52 of the first lift-off resist layer $L_1$ in the $X_1$ direction (track width direction). The laminate 9 thereby has a trapezoidal cross-section 9 and side faces 9b, and the antiferromagnetic layer 4 has extensions 4a which extend at both sides in the $X_1$ direction.

The irradiation with etching particles is preferably performed by ion milling with Ar or reactive ion etching (RIE). Since these methods use highly directional etching particles, the etching particles can be oriented in a specific direction.

The etching angle $\theta_{d2}$ defining the direction of the etching particles is preferably in the range of 60° to 90°. This etching angle $\theta_{d2}$ can be controlled by adjusting, for example, the angle between an ion gun grid and the lower insulating layer 364.

The both sides of the laminate layer 9c can be anisotropically etched by etching particles which are incident on the laminate layer 9c at the etching angle $\theta_{d2}$ to form the laminate 9 having a trapezoidal cross-section and the side faces 9b.

Figure 23:
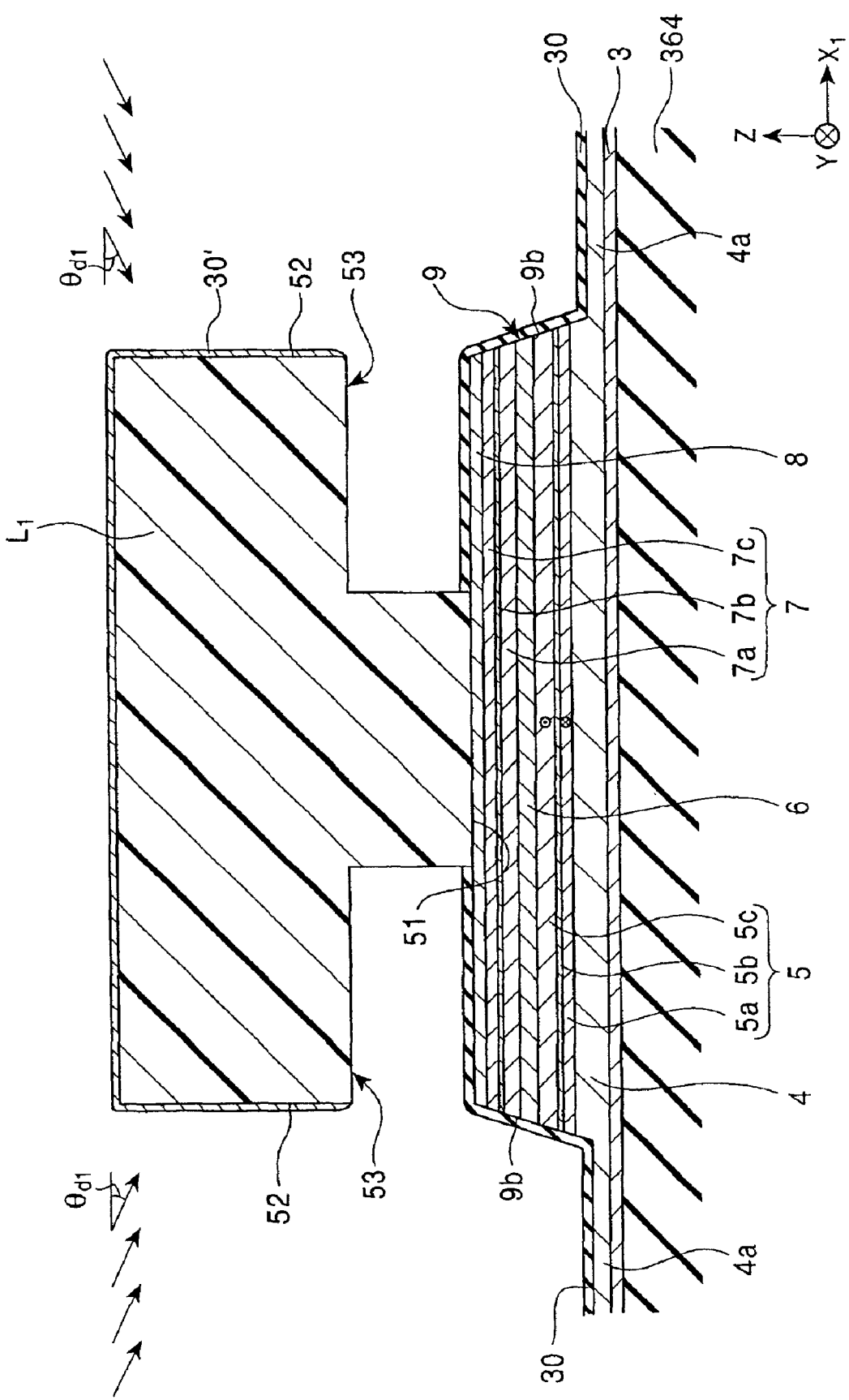
FIG. 23 is a cross-sectional view showing an insulating layer forming step subsequent to the step shown in FIG. 22.

Referring to FIG. 23, in the insulating layer forming step, the insulating layers 30 are deposited on the laminate 9 by a first sputtering process at a sputtering angle $\theta_{d1}$ (angle $\theta_{d2}$>angle $\theta_{d1}$) with respect to the lower insulating layer 364. Sputtering particles also enter the incisions 53 of the first lift-off resist layer $L_1$. As a result, the insulating layers 30 extend over the extensions 4a, the side faces 9b, and both top ends of the laminate 9 below the incisions 53. The sputtering particles also are deposited on the first lift-off resist layer $L_1$ to form a layer 30' which has the same composition as that of the insulating layers 30.

The etching angle $\theta_{d1}$ is preferably in the range of 40° to 80°. The etching angle $\theta_{d1}$ is preferably smaller than the etching angle $\theta_{d2}$. The etching angle $\theta_{d1}$ is controlled by adjusting, for example, the angle between the surface of a target for sputtering and the lower insulating layer 364.

Since the first sputtering process is performed at the etching angle $\theta_{d1}$, sputtering particles enter the incisions 53. The insulating layers 30 thereby extend over the extensions 4a, the side faces 9b, and the top ends 9a of the laminate 9.

Figure 24:
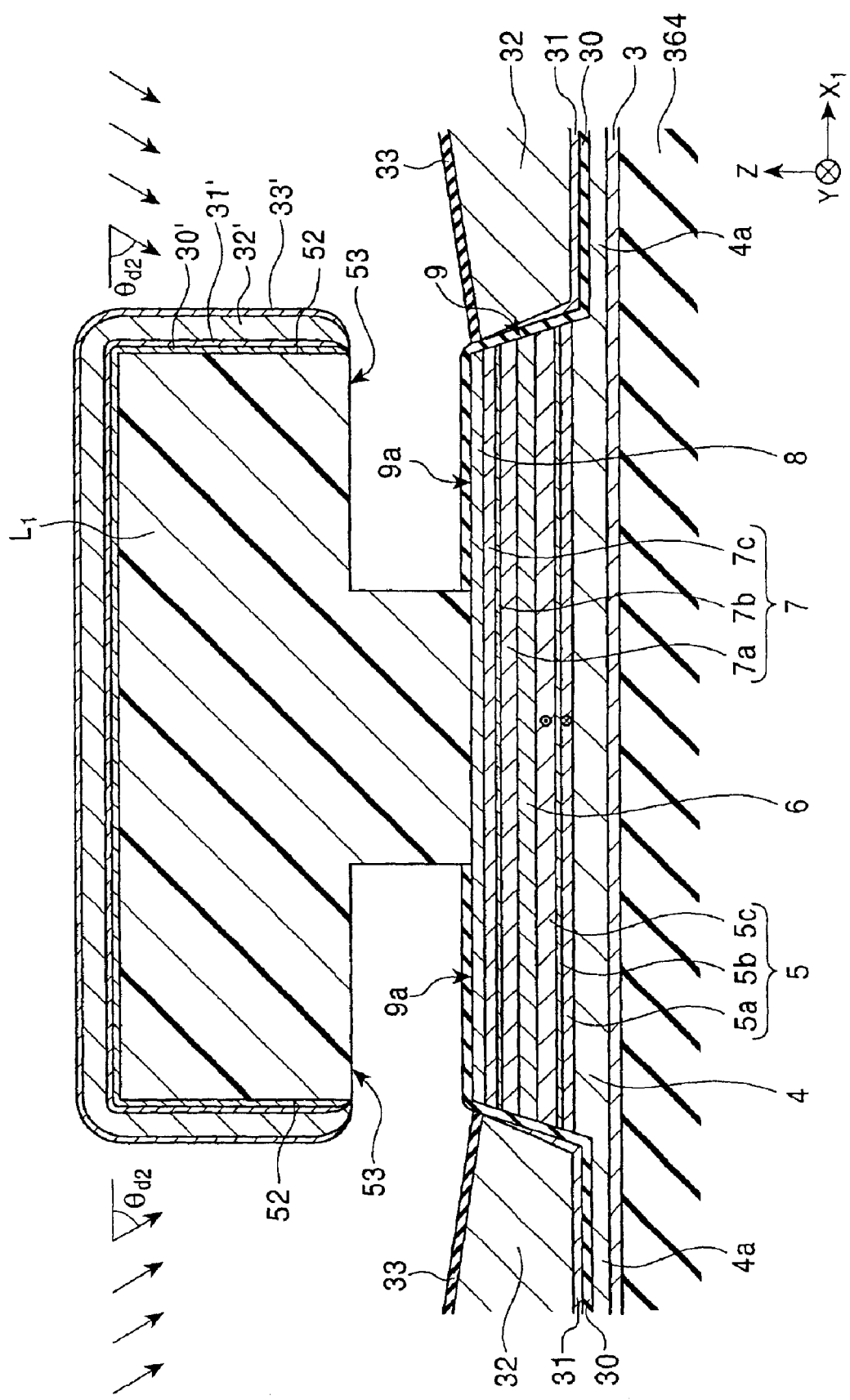
FIG. 24 is a cross-sectional view showing a hard bias layer forming step and an insulating layer forming step subsequent to the step shown in FIG. 23.

Referring to FIG. 24, in the bias layer forming step, the bias underlayers 31 and the hard bias layers 32 are deposited on both sides of the laminate 9 by a second sputtering process (ion beam sputtering or the like) using other types of sputtering particle at the etching angle $\theta_{d2}$ with respect to the lower insulating layer 364. The etching angle $\theta_{d2}$ is preferably in the range of 60° to 90° and may be the same as the etching angle in the laminate forming step.

The bias underlayers 31 and the hard bias layers 32 are deposited on the insulating layers 33 in the region of the extensions 4a and the side faces 9b of the laminate 9. The hard bias layers 32 are preferably deposited up to at least the level of the free magnetic layer 7.

During this bias layer forming step, sputtering particles are deposited on the first lift-off resist layer $L_1$ to form layers 31' and 32' which have the same compositions as those of the bias underlayers 31 and the hard bias layers 32.

Referring to FIG. 24, in the insulating layer forming step, a third sputtering process is performed using another type of sputtering particles at an etching angle $\theta_{d2}$ with respect to the lower insulating layer 364 to form the insulating layers 33 which has the same composition as that of the insulating layers 30 on the hard bias layers 32. Sputtering particles are also deposited on the first lift-off resist layer $L_1$ to form a layer 33' which has the same composition as that of the insulating layers 33.

The third sputtering process is preferably performed by ion beam sputtering or the like as in the above method. The etching angle $\theta_{d2}$ is preferably in the range of 60° to 90° and may be substantially the same as the etching angle in the laminate forming step.

The third sputtering process may be performed at the etching angle $\theta_{d1}$ when the insulating layers 30 are deposited on the tuning coil 30 lying on the top ends 9a of the laminate 9.

Figure 25:
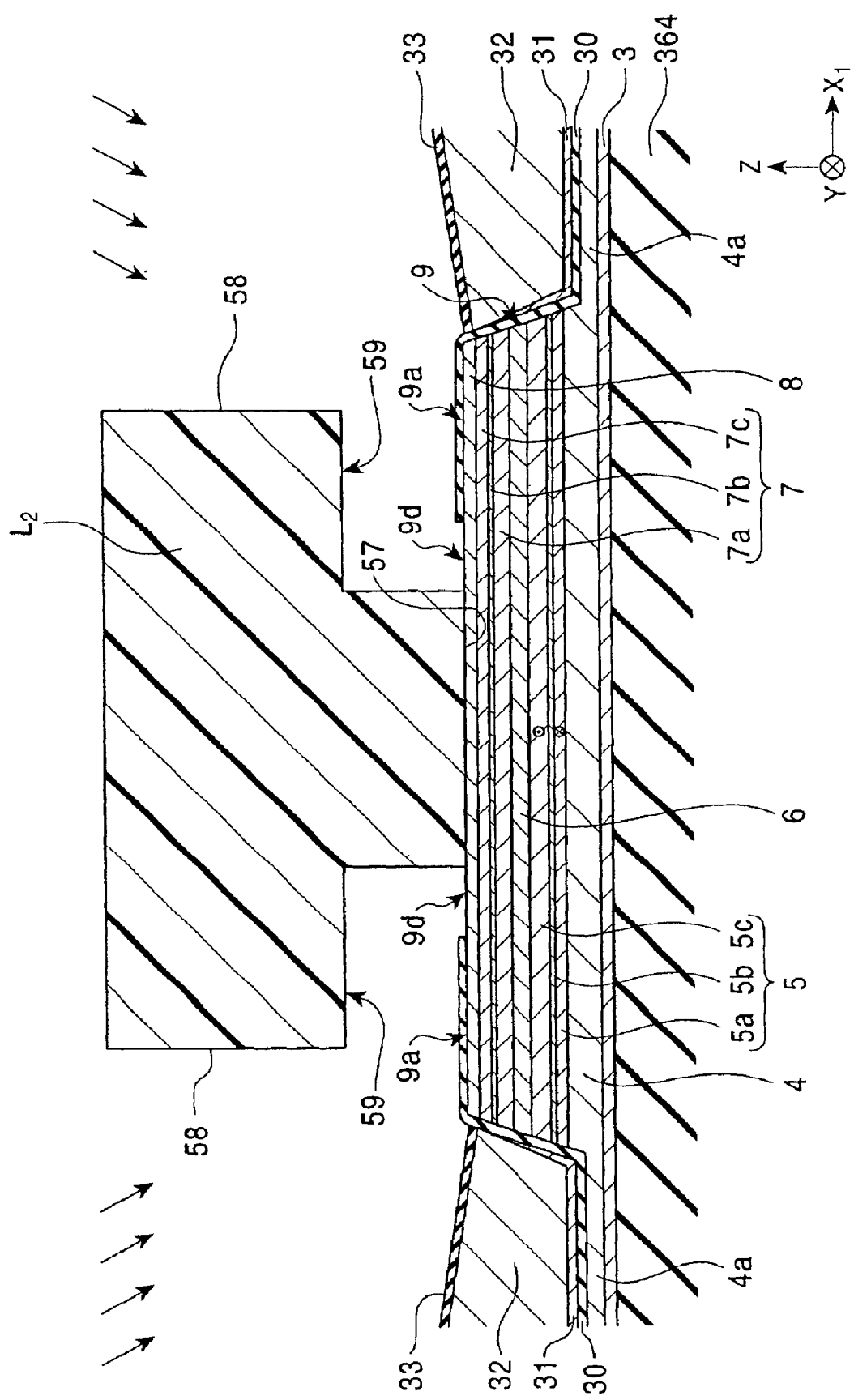
FIG. 25 is a cross-sectional view showing a second resist layer forming step subsequent to the step shown in FIG. 24.

With reference to FIG. 25, in the second resist layer forming step, the first lift-off resist layer $L_1$ is removed, and then a second lift-off resist layer $L_2$ is formed substantially on the central surface of the laminate 9. The second lift-off resist layer $L_2$ has a contact face 57 which is in contact with the laminate 9 and two side faces 58, the contact face 57 lying between these side faces 58. A pair of incisions 59 is provided between the side faces 58 and the contact face 57 in the $X_1$ direction. The width of the contact face 57 in the $X_1$ direction is smaller than that of the contact face 51 of the first lift-off resist layer $L_1$.

By forming the second lift-off resist layer $L_2$ in such a manner, the protective layer 8 is partially exposed under the incisions 59 to form exposed surfaces 9d.

The width of the exposed surfaces 9d in the $X_1$ direction is defined by the difference between the width of the contact face 51 of the first lift-off resist layer $L_1$ in the $X_1$ direction and the width of the contact face 57 of the second lift-off resist layer $L_2$ in the $X_1$ direction. This width of the exposed surfaces 9d corresponds to the width $W_2$ of the edges 34b of the lead layers 34 in FIG. 20. Thus, the first lift-off resist layer $L_1$ and the second lift-off resist layer $L_2$ precisely control the width of the exposed surfaces 9d and the contact area of the lead layers 34 so that the sensing current effectively flows in the laminate 9.

Figure 26:
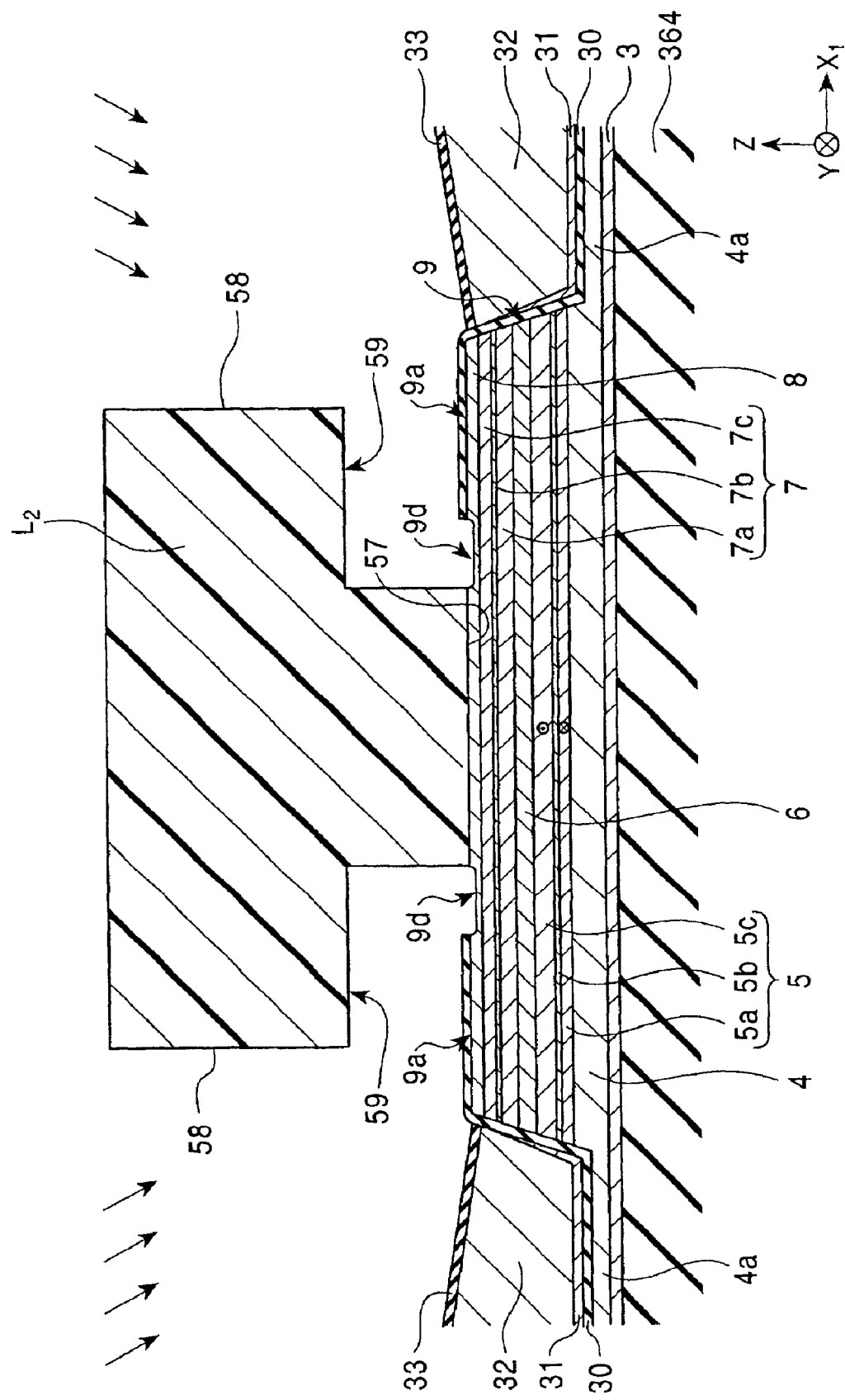
FIG. 26 is a cross-sectional view showing an etching step subsequent to the step shown in FIG. 25.

Referring to FIG. 26, in the etching step, the exposed surfaces 9d are etched by irradiation with second etching particles. The insulating layers 33 are also etched to become thinner in this process.

The surfaces of the exposed surfaces 9d have been contaminated by various contaminants during removing the first lift-off resist layer $L_1$ and forming the second lift-off resist layer $L_2$ in the second resist layer forming step. If the lead layers 34 are formed without removing these contaminants, the contact resistance between the lead layers 34 and the laminate 9 may increase. The exposed surfaces 9d are cleaned by this etching step.

Figure 27:
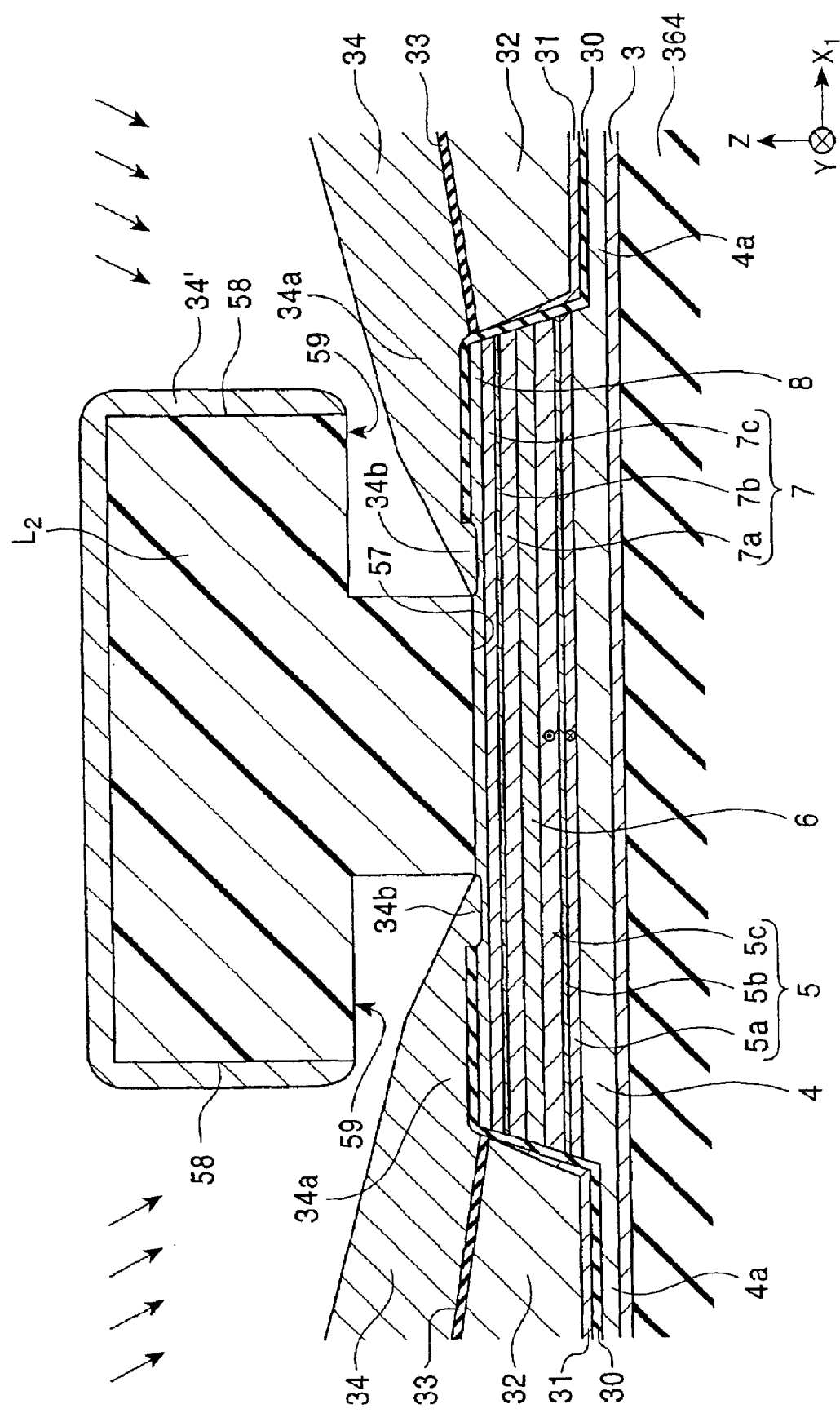
FIG. 27 is a cross-sectional view showing a lead layer forming step subsequent to the step shown in FIG. 26.

Referring to FIG. 27, in the lead layer forming step, the lead layers 34 are deposited on the insulating layers 33 by a fourth sputtering process using another type of sputtering particles. Sputtering particles enter the incisions 59 of the second lift-off resist layer $L_2$, so that the lead layers 34 extend over the insulating layers 33 and the exposed surfaces 9d in the incisions 59.

The sputtering particles are also deposited on the second lift-off resist layer $L_2$ to form a layer 34' having the same composition as that of the lead layers 34.

The fourth sputtering process is preferably performed by ion beam sputtering as described above. Preferably, the etching angle of the fourth sputtering process is substantially equal to the etching angle of the etching particles in the etching step.

As described above, the lead layers 34 have the overlay sections 34a which extend on the exposed surfaces 9d in the central regions of the laminate 9. The edges 34b of the overlay sections 34a come into direct contact with the laminate 9.

In the final stage, the second lift-off resist layer $L_2$ is removed, and the laminate 9 is annealed in a magnetic field so that the hard bias layers 32 generates a bias magnetic field which orients the magnetic moment of the free magnetic layer 7 in the $X_1$ direction. The spin-valve thin-film magnetic element 1 shown in FIG. 20 is thereby formed.

According to the third method for making the spin-valve thin-film magnetic element 1, the first sputtering process is performed at an sputtering angle $\theta_{d1}$ to form the insulating layers 30 in the incisions 53 of the first lift-off resist layer $L_1$. Moreover, the second sputtering process is performed to form the lead layers 34 in the incisions 59 of the second lift-off resist layer $L_2$. Thus, the insulating layers 30 extend on the top ends 9a of the laminate 9. Moreover, the lead layers 34 extend towards the center of the laminate 9 compared with the insulating layers 30 and are in direct contact with the laminate 9. Since the tuning coil 30 blocks shunt of the detecting current from the side faces 9b, the spin-valve thin-film magnetic element 1 does not generate side reading.

Figure 28:
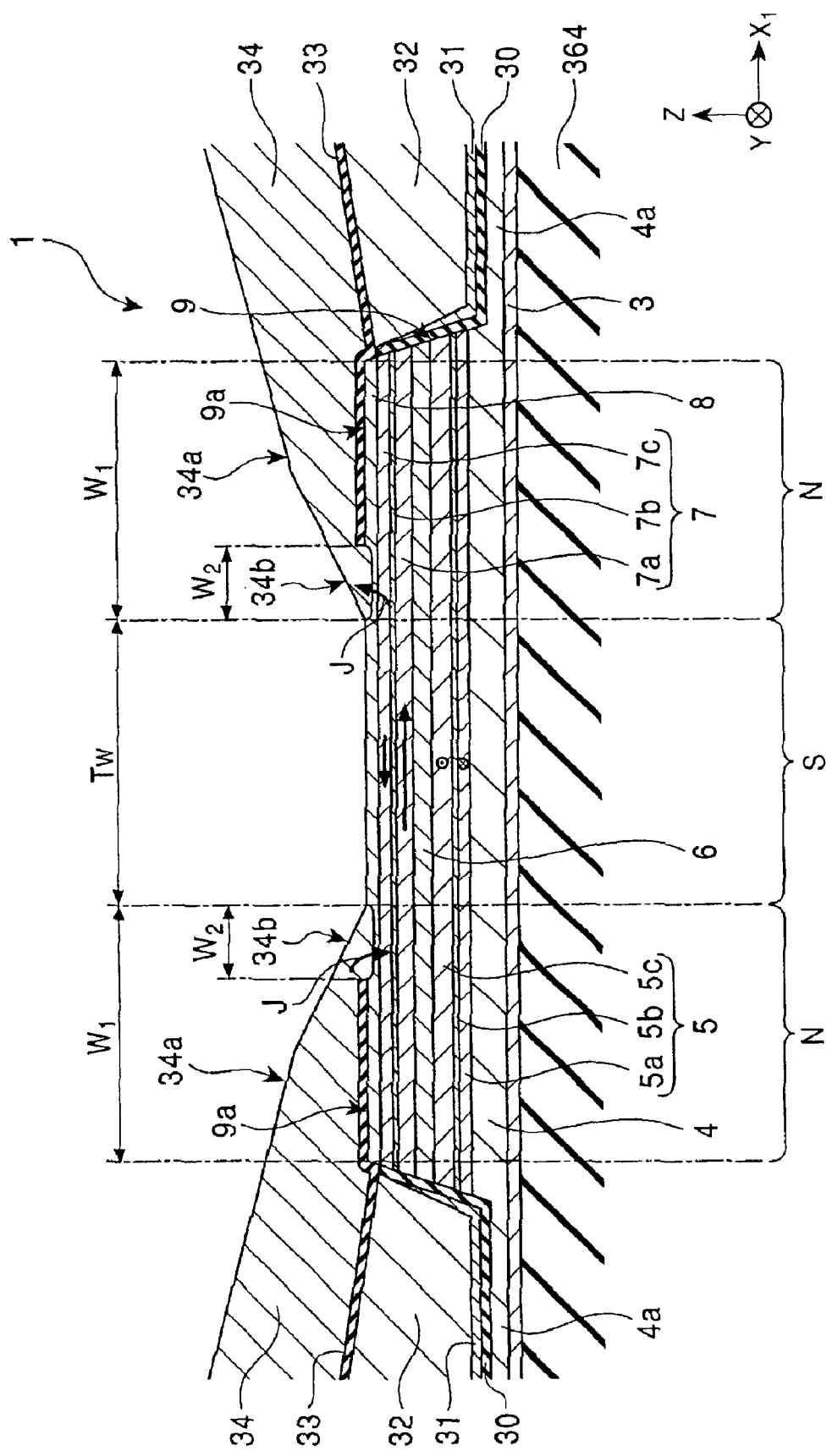
FIG. 28 is a cross-sectional view of a spin-valve thin-film magnetic element in accordance with a modification of the third embodiment of the present invention.
Figure 29:
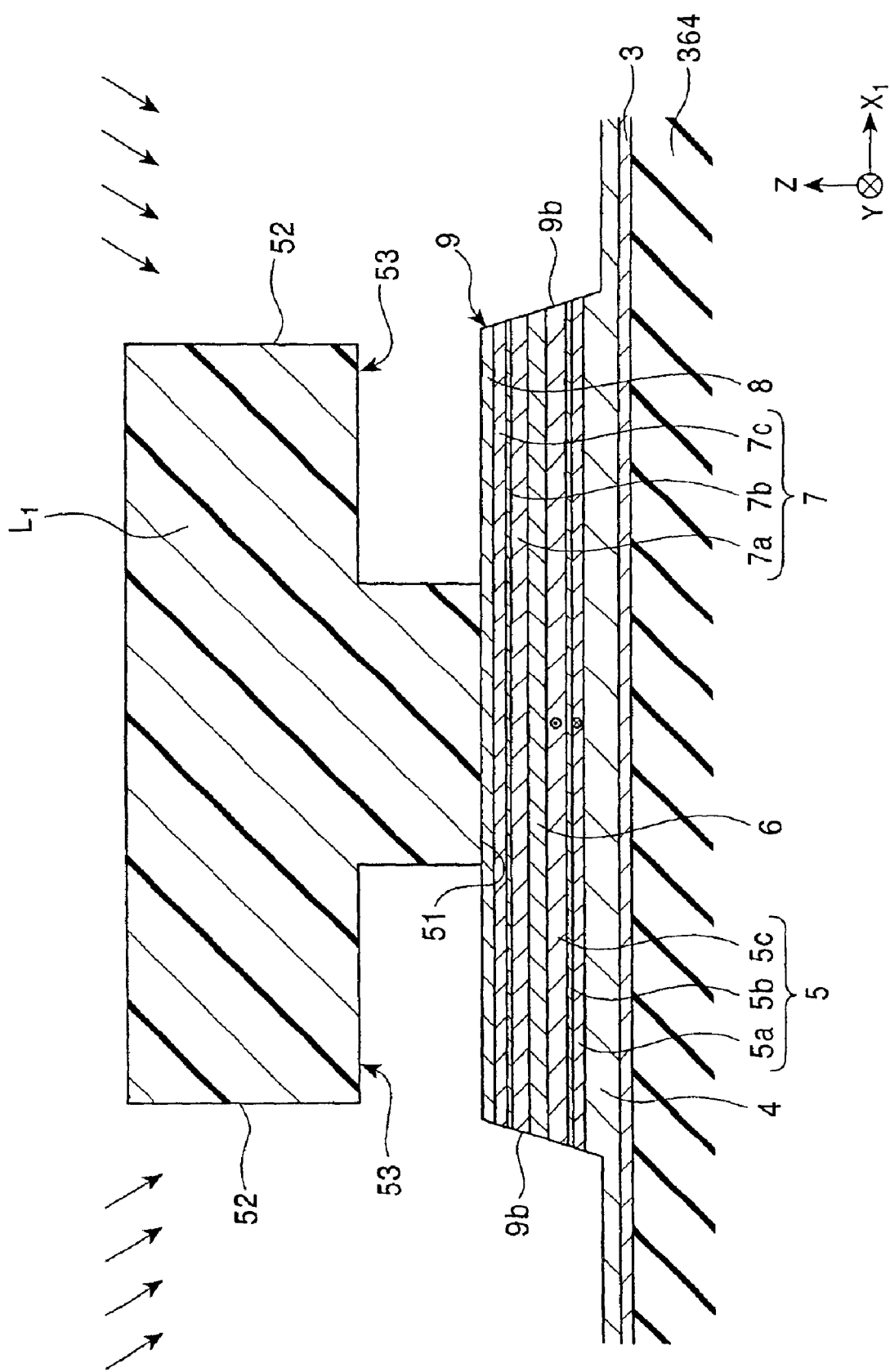
FIG. 29 is a cross-sectional view showing a laminate forming step in another method for making the spin-valve thin-film magnetic element.

A modification of the third embodiment of the spin-valve thin-film magnetic element 1 will now be described with reference to FIG. 28. In this modification, the top ends 9a of the laminate 9 are covered by the insulating layers 33 instead of the tuning coil 30. The other components in this modification are the same as those in the third embodiment and are referred to with the same reference numerals. Since the insulating layers 30 and the insulating bond 33 are composed of substantially the same material, this modification has the same advantages as these in the third embodiment.

A fourth method for making the radiofrequency characteristic A according to this modification will now be described. In the fourth method, the hard bias layers are formed ant then a second lift-off resist layer is formed to form the insulating layers and the lead layers.

The fourth method includes a laminate forming step, a first insulating layer forming step, a bias layer forming step, a second resist layer forming step, a second insulating layer forming step, an etching step, and a lead layer forming step.

As shown in FIG. 21, in the laminate forming step, layers from the underlayer 3 to the protective layer 8 are deposited to form the laminate layer 9c, and the laminate layer 9c is annealed in a magnetic field to pin the magnetic moment of the pinned magnetic layer 5 by an exchange coupling magnetic field from the antiferromagnetic layer 4 to the pinned magnetic layer 5. A first lift-off resist layer $L_1$ is formed on the laminate layer 9c. The first lift-off resist layer $L_1$ has a contact face 51 which is in contact with the laminate layer 9c and two side faces 52, the contact face 51 lying between these side faces 52. A pair of incisions 53 is provided between the side faces 52 and the contact face 51 in the track width direction.

Referring to FIG. 22, the laminate layer 9c is irradiated with etching particles to etch both sides of the laminate layer 9c as in FIG. 22 so that the lower half (extension) 4a of the antiferromagnetic layer 4 remains at each of the both sides in the $X_1$ direction. Preferably, the etching angle of the etching particles is substantially equal to the etching angle $\theta_{d2}$ and thus is in the range of 60° to 90°. The laminate 9 thereby has a trapezoidal cross-section and the side faces 9b, and the antiferromagnetic layer 4 has extensions 4a which extend at both sides in the $X_1$ direction.

Figure 30:
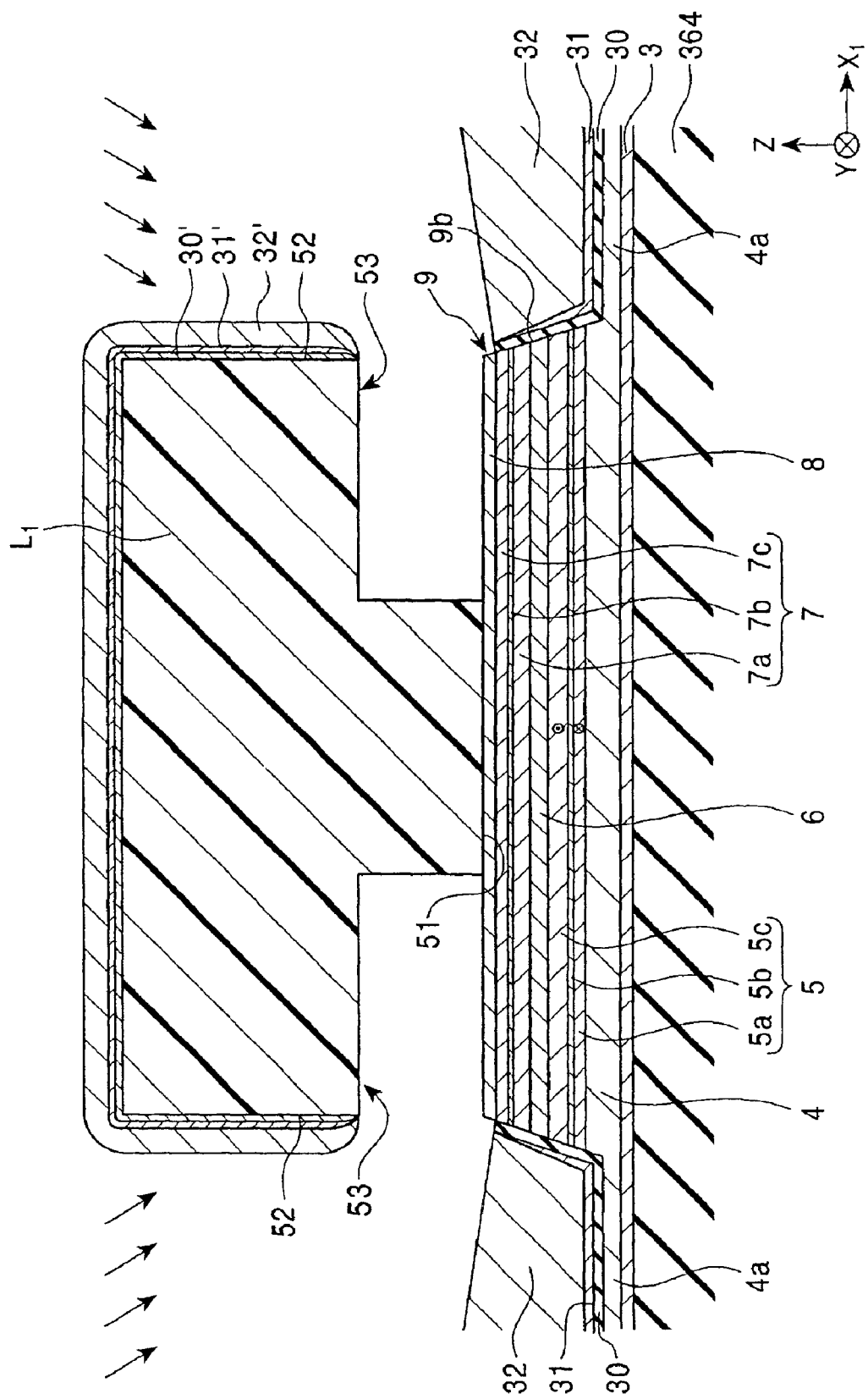
FIG. 30 is a cross-sectional view showing a hard bias layer forming step subsequent to the step shown in FIG. 29.

Referring to FIG. 30, the insulating layers 30, the bias underlayers 31, and the hard bias layers 32 are deposited on both sides of the laminate 9 by a first sputtering process as in FIG. 23 (the first insulating layer forming step and the bias layer forming step) using sputtering particles. The insulating layers 30, the bias underlayers 31, and the hard bias layers 32 are deposited on the side faces 9b and the extensions 4a which extend at both sides of the laminate 9. The hard bias layers 32 are preferably deposited up to at least the level of the free magnetic layer 7.

Preferably, the sputtering angle of the first sputtering process is substantially equal to the etching angle $\theta_{d2}$ and thus is in the range of 60° to 90°.

During this step, sputtering particles are deposited on the first lift-off resist layer $L_1$ to form layers 30', 31', and 32' which have the same compositions as those of the insulating layers 30, the bias underlayers 31, and the hard bias layers 32.

Figure 31:
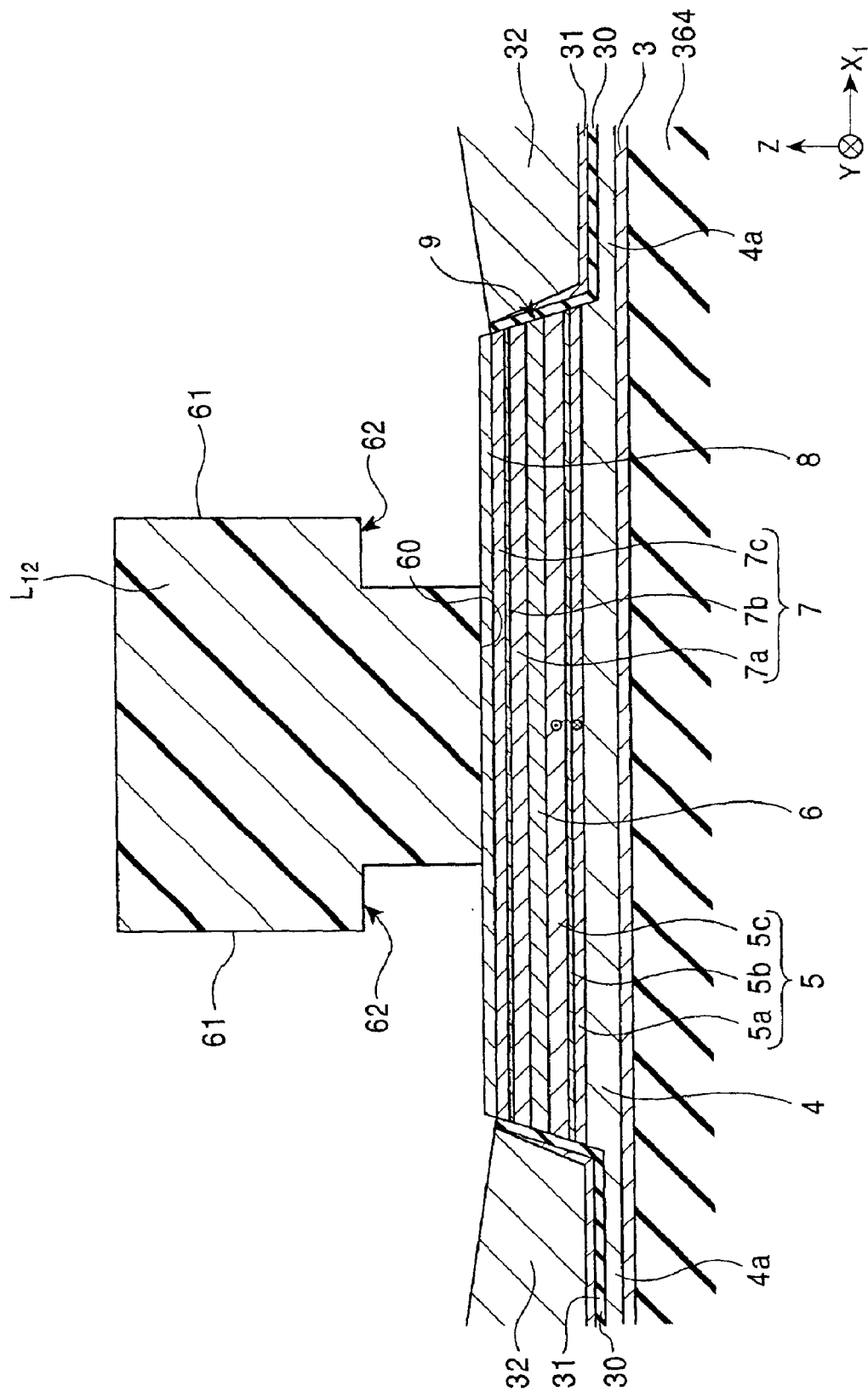
FIG. 31 is a cross-sectional view showing a second resist layer forming step subsequent to the step shown in FIG. 30.

Referring to FIG. 31, in the second resist layer forming step, the first lift-off resist layer $L_1$ is removed and then a second lift-off resist layer $L_{12}$ is formed on the laminate 9. The second lift-off resist layer $L_{12}$ has a contact face 60 which is in contact with the laminate 9 and two side faces 61, the contact face 60 lying between these side faces 61. A pair of incisions 62 is provided between the side faces 61 and the contact face 60 in the $X_1$ direction. The width of the contact face 60 in the $X_1$ direction is smaller than that of the contact face 51 of the first lift-off resist layer $L_1$.

Furthermore, the distance between the side faces 61 is smaller than the distance between the side faces 52 of the first lift-off resist layer $L_1$ and smaller than the width of the upper face in the track width direction of the laminate 9.

Figure 32:
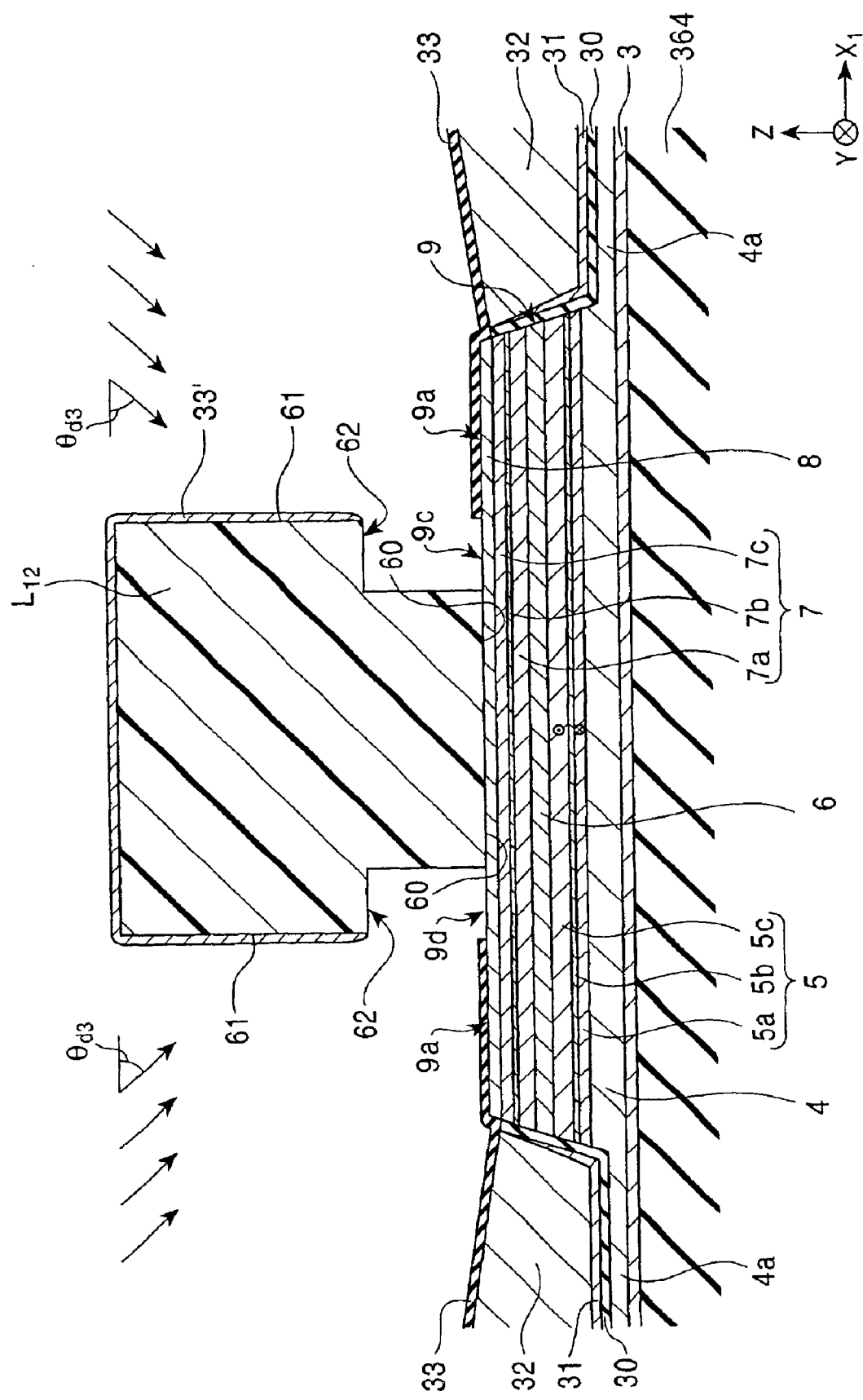
FIG. 32 is a cross-sectional view showing an insulating layer forming step subsequent to the step shown in FIG. 31.
Figure 33:
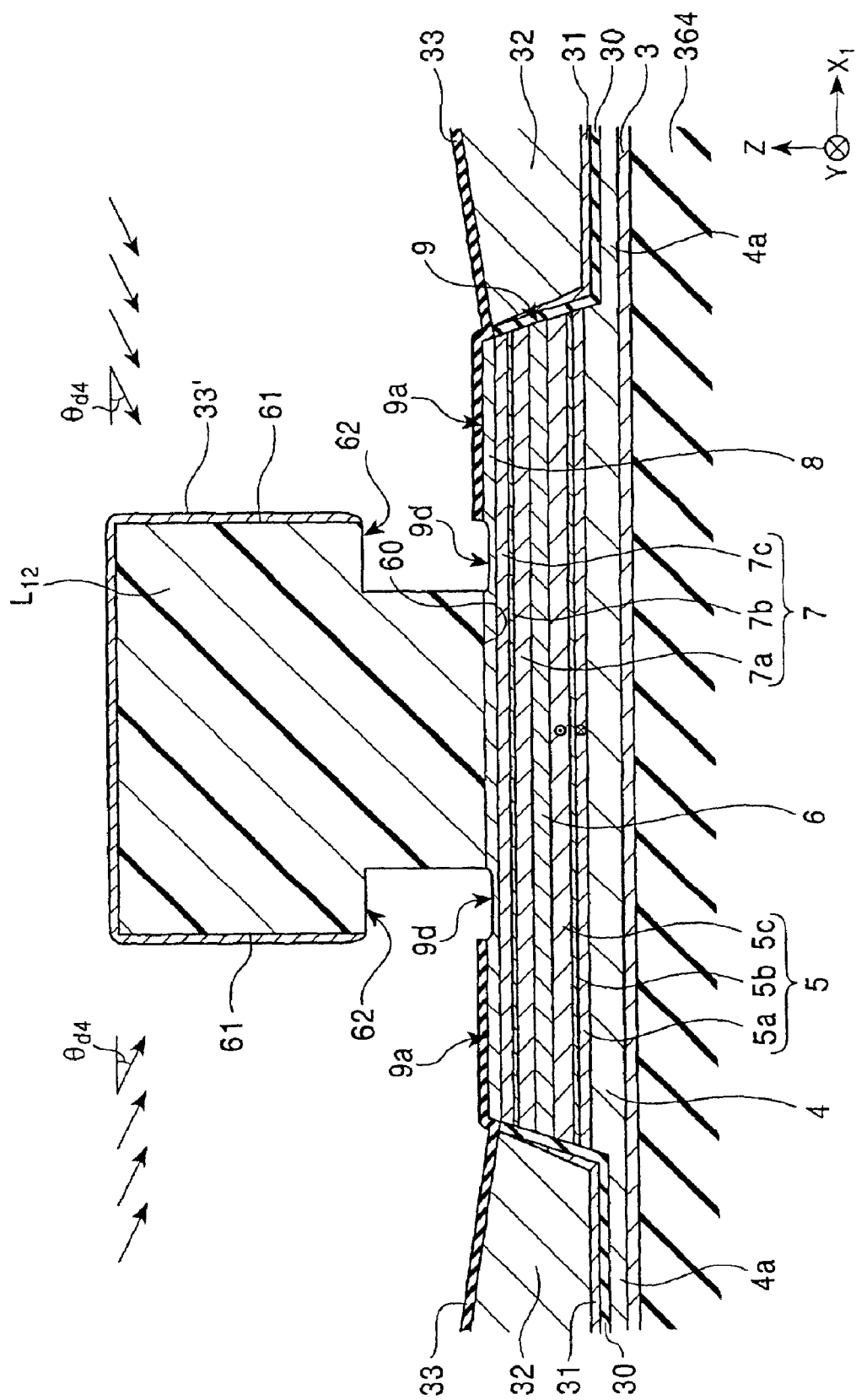
FIG. 33 is a cross-sectional view showing an etching step subsequent to the step shown in FIG. 32.

Referring to FIG. 32, in the insulating layer forming step, the insulating layers 33 are deposited on the laminate 9 using another type of sputtering particle at the outer regions of the side faces 61 of the second lift-off resist layer $L_{12}$ in the $X_1$ direction by a second sputtering process at a sputtering angle $\theta_{d3}$ with respect to the lower insulating layer 364. The insulating layers 33 extend over the top ends 9a of the laminate 9 and the hard bias layers 32 at the outer regions of the side faces 61.

In this process, sputtering particles having the sputtering angle $\theta_{d3}$ do not enter the incisions 62 of the second lift-off resist layer $L_{12}$. As a result, the insulating layers 33 are not formed on the exposed surfaces 9c of the laminate 9 in the incisions 62.

The sputtering particles also are deposited on the second lift-off resist layer $L_{12}$ to form a layer 33' which has the same composition as that of the insulating layers 33.

The second sputtering process is preferably performed by ion beam sputtering or the like as in the above method. The sputtering angle $\theta_{d3}$ is preferably in the range of 60° to 90°. At a sputtering angle $\theta_{d3}$ of less than 60°, the sputtering particles are incident on the incisions 62 of the second lift-off resist layer $L_{12}$. In such a state, the lead layers formed in a subsequent step will not come into contact with the laminate 9. At a sputtering angle $\theta_{d3}$ exceeding 90°, the ends of the insulating layers 33 are not positioned at the side faces 61.

The sputtering angle $\theta_{d3}$ is controlled by adjusting, for example, the angle between the surface of a target for sputtering and the lower insulating layer 364.

Since the second sputtering process is performed at the sputtering angle $\theta_{d3}$, the insulating layers 33 are formed so as to extend over the hard bias layers 32 and the top ends 9a of the laminate 9 and not to extend on the exposed surfaces 9d of the laminate 9 in the incisions 62.

Referring to FIG. 31, in the etching step, the exposed surfaces 9d of the laminate 9 in the incisions 62 are etched by irradiation with second etching particles at an etching angle $\theta_{d4}$ ($\theta_{d3} > \theta_{d4}$). The insulating layers 33 are also etched to become thinner in this process.

The surfaces of the exposed surfaces 9d have been contaminated by various contaminants during removing the first lift-off resist layer $L_1$ and forming the second lift-off resist layer $L_{12}$ in the second resist layer forming step. If the lead layers 34 are formed without removing these contaminants, the contact resistance between the lead layers 34 and the laminate 9 may increase. The exposed surfaces 9d are cleaned by this etching step.

The etching angle $\theta_{d4}$ is preferably in the range of 40° to 80°. Preferably, the etching angle $\theta_{d4}$ is smaller than the sputtering angle $\theta_{d3}$. This etching angle $\theta_{d4}$ can be controlled by adjusting, for example, the angle between an ion gun grid and the lower insulating layer 364.

Since the etching angle $\theta_{d4}$ is smaller than the sputtering angle $\theta_{d3}$, the second etching particles enter the incisions 62 to etch the exposed surfaces 9d of the laminate 9.

At an etching angle $\theta_{d4}$ of less than 40°, the second lift-off resist layer $L_{12}$ is excessively etched. The excess etching of the second lift-off resist layer $L_{12}$ will result in an erroneous size of the lead layers in the lead layer forming step. At an etching angle $\theta_{d4}$ exceeding 80°, the second etching particles do not enter the incisions 62 and the exposed surfaces 9d will not be satisfactorily etched.

Figure 34:
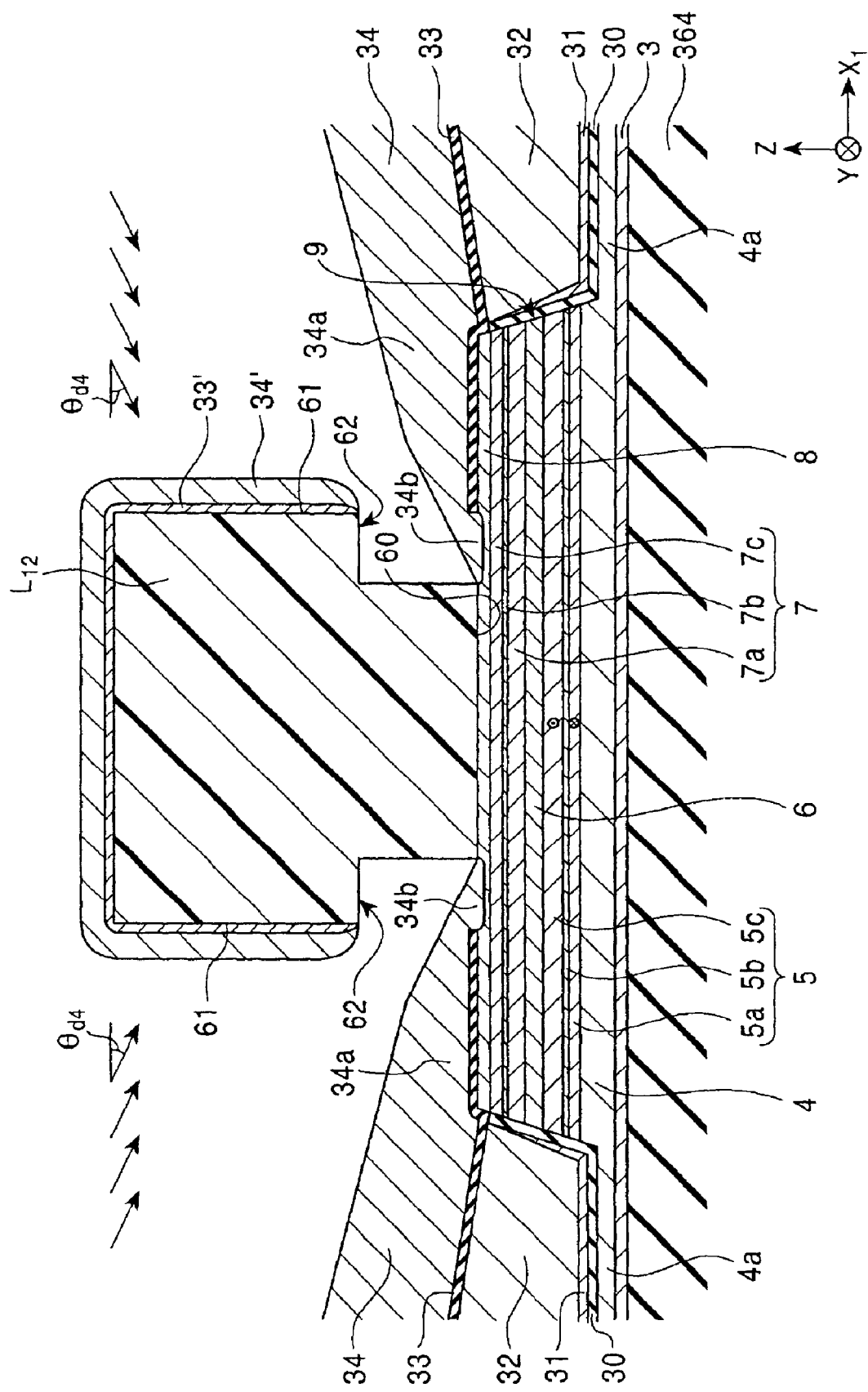
FIG. 34 is a cross-sectional view showing a lead layer forming step subsequent to the step shown in FIG. 33.

Referring to FIG. 34, in the lead layer forming step, the lead layers 34 are deposited on the insulating layers 33 by a third sputtering process using another type of sputtering particle at the sputtering angle $\theta_{d4}$ with respect to the lower insulating layer 364. In this process, sputtering particles enter the incisions 62 of the second lift-off resist layer $L_{12}$, so that the lead layers 34 extend on the exposed surfaces 9d in the incisions 62.

The sputtering particles are also deposited on the second lift-off resist layer $L_{12}$ to form a layer 34' having the same composition as that of the lead layers 34.

The third sputtering process is preferably performed by ion beam sputtering as described above. Preferably, the sputtering angle $\theta_{d4}$ in the third sputtering process is substantially equal to the etching angle $\theta_{d4}$ of the etching particles in the etching step so that the sputtering particles enter the incisions 62 of the second lift-off resist layer $L_{12}$.

As described above, the lead layers 34 have the overlay sections 34a which extend on the exposed surfaces 9d in the central regions of the laminate 9. The edges 34b of the overlay sections 34a come into direct contact with the laminate 9.

In the final stage, the second lift-off resist layer $L_{12}$ is removed, and the laminate 9 is annealed in a magnetic field so that the hard bias layers 32 generates a bias magnetic field which orients the magnetic moment of the free magnetic layer 7 in the $X_1$ direction. The spin-valve thin-film magnetic element 1 shown in FIG. 28 is thereby formed.

According to the fourth method for making the spin-valve thin-film magnetic element 1, the insulating layers 30 are formed on the side faces 9b of the laminate 9, and then the insulating layers 33 are formed at the outer regions of the side faces 61 of the first lift-off resist layer $L_1$ by sputtering at the sputtering angle $\theta_{d3}$. Moreover, the third sputtering process is performed at a sputtering angle $\theta_{d4}$ to form the lead layers 34 in the incisions 62 of the second lift-off resist layer $L_{12}$. Thus, the insulating layers 33 extend on the top ends 9a of the laminate 9, and the lead layers 34 extend towards the center of the laminate 9 compared with the insulating layers 33 and are in direct contact with the laminate 9. Accordingly, the spin-valve thin-film magnetic element 1 does not generate side reading.

Fourth Embodiment

Figure 35:
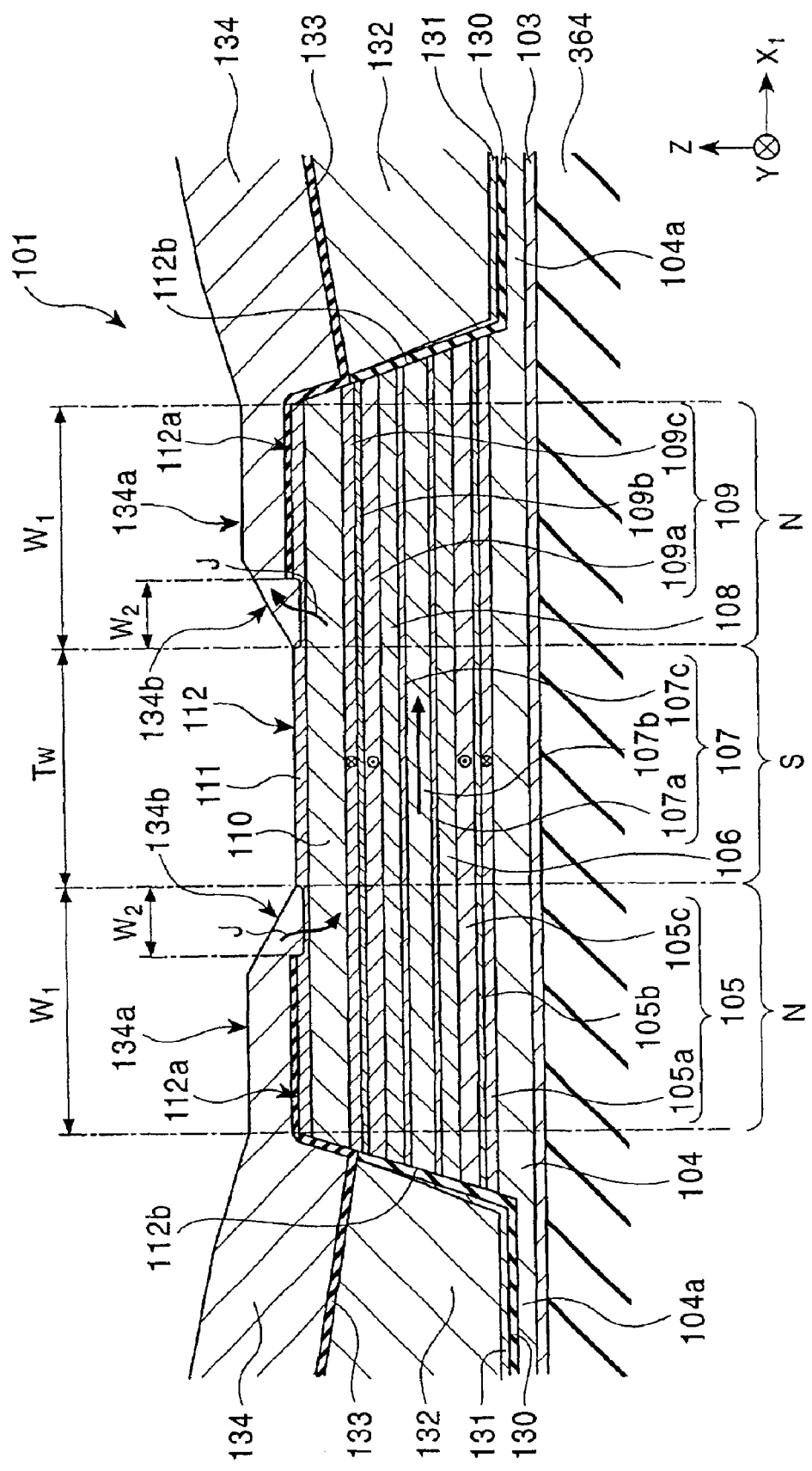
FIG. 35 is a schematic cross-sectional view of a spin-valve thin-film magnetic element in accordance with a fourth embodiment of the present invention.

FIG. 35 is a schematic cross-sectional view, when viewed from a magnetic recording medium, of a spin-valve thin-film magnetic element 101 in accordance with a fourth embodiment of the present invention.

This spin-valve thin-film magnetic element 101 also constitutes a thin-film magnetic head. The thin-film magnetic head and an inductive head constitute a floating magnetic head, like the first embodiment.

This spin-valve thin-film magnetic element 101 is of a dual type in which a first nonmagnetic conductive layer 106, a first pinned magnetic layer 105, and a first antiferromagnetic layer 104 are deposited on one face of a free magnetic layer 107 in the thickness direction, and a second nonmagnetic conductive layer 108, a second pinned magnetic layer 109, and a second antiferromagnetic layer 110 are deposited on the other face of the free magnetic layer 107.

That is, the spin-valve thin-film magnetic element 101 has a lower insulating layer 364 and a laminate 112 formed on the lower insulating layer 364. The laminate 112 includes an underlayer 103, the first antiferromagnetic layer 104, the first pinned magnetic layer 105, the first nonmagnetic conductive layer 106, the free magnetic layer 107, the second nonmagnetic conductive layer 108, the second pinned magnetic layer 109, the second antiferromagnetic layer 110, and a protective layer 111, in that order from the bottom. The laminate 112 has a trapezoidal cross-section.

Hard bias layers 132 composed of a CoPt alloy or the like are formed on both sides of the laminate 112 to orient the magnetic moment of the free magnetic layer 107. Furthermore, lead layers 134 are formed on the hard bias layers 132 to supply a sensing current to the laminate 112. The lead layers 134 are composed of Cr, Ta, W, Au, Rh, Cu, or the like.

The laminate 112 of this spin-valve thin-film magnetic element 101 has a dual spin-valve structure, unlike the third embodiment.

The free magnetic layer 107 is a composite of a first antidiffusion sublayer 107a composed of Co or the like, a free ferromagnetic layer 107b composed of a NiFe alloy or the like, and a second antidiffusion sublayer 107c composed of Co or the like. The first antidiffusion sublayer 107a and the second antidiffusion sublayer 107c prevent interdiffusion between the free ferromagnetic layer 107b and the first nonmagnetic conductive layer 106 and between the free ferromagnetic layer 107b and the second nonmagnetic conductive layer 108.

The thickness of each of the first antidiffusion sublayer 107a and the second antidiffusion sublayer 107c is preferably in the range of 0.2 nm to 1 nm, and the thickness of the free ferromagnetic layer 107b is preferably in the range of 1 nm to 5 nm.

The magnetic moment of the free magnetic layer 107 is oriented in the $X_1$ direction by a bias magnetic field from the hard bias layers 132. Since the free magnetic layer 107 is aligned in a single-domain state, Barkhausen noise of the spin-valve thin-film magnetic element 101 can be reduced.

The first antiferromagnetic layer 104 and the second antiferromagnetic layer 110 are provided to pin the magnetic moments of the first pinned magnetic layer 105 and the second pinned magnetic layer 109, respectively. These antiferromagnetic layers are preferably composed of the same PtMn alloy as that for the antiferromagnetic layer 4 in the third embodiment.

The first antiferromagnetic layer 104 and the second antiferromagnetic layer 110 may be composed of either an XMn alloy or a PtX'Mn alloy wherein X is one metal selected from Pt, Pd, Ir, Rh, Ru, and Os and X' is at least one element selected from Pd, Cr, Ru, Ni, Ir, Rh, Os, Au, Ag, Ne, Ar, Xe, and Kr, like the antiferromagnetic layer 4 in the third embodiment.

The composition of the PtMn alloy, the XMn alloy, and the PtX'Mn alloy and the thickness of the first antiferromagnetic layer 104 and the second antiferromagnetic layer 110 are substantially the same as those of the antiferromagnetic layer 4 in the third embodiment.

The thickness of the second antiferromagnetic layer 110 is preferably 12 nm or less and more preferably in the range of 8 nm to 12 nm.

Since the thickness of the second antiferromagnetic layer 110 having relatively high resistance is reduced to 12 nm or less, the sensing current from one lead layer 134 effectively flows into the laminate 112. Since the thickness of the second antiferromagnetic layer 110 is adjusted to 8 nm or more, the exchange coupling magnetic field is sufficiently large to pin the magnetic moment of the second pinned magnetic layer 109.

Using an alloy having the above composition, the first antiferromagnetic layer 104 and the second antiferromagnetic layer 110 are annealed in a magnetic field to generate a large exchange coupling magnetic field. This exchange coupling magnetic field firmly pins the magnetic moment of the first pinned magnetic layer 105 and the magnetic moment of the second pinned magnetic layer 109. In particular, a first antiferromagnetic layer 104 and a second antiferromagnetic layer 110 composed of a PtMn alloy exhibit an exchange coupling magnetic field exceeding $6.4 \times 10^4$ A/m and have an extremely high blocking temperature of 653 K (380° C.) in which these antiferromagnetic layers lose the exchange coupling magnetic field.

The first pinned magnetic layer 105 is a composite of a first pinned ferromagnetic sublayer 105a, a first nonmagnetic interlayer 105b, and a second pinned ferromagnetic sublayer 105c. The second pinned ferromagnetic sublayer 105c is thicker than the first pinned ferromagnetic sublayer 105a.

The magnetic moment of the first pinned ferromagnetic sublayer 105a is pinned in the Y direction by an exchange coupling magnetic field with the first antiferromagnetic layer 104, while the second pinned ferromagnetic sublayer 105c is antiferromagnetically coupled with the first pinned ferromagnetic sublayer 105a and the magnetic moment of the second pinned ferromagnetic sublayer 105c is pinned in the opposite direction of the Y direction.

Since the magnetic moments of the first pinned ferromagnetic sublayer 105a and the second pinned ferromagnetic sublayer 105c are antiparallel to each other, these magnetic moments mutually counteract. Since the second pinned ferromagnetic sublayer 105c is thicker than the first pinned ferromagnetic sublayer 105a, a small magnetic moment remains in the second pinned ferromagnetic sublayer 105c. Thus, the overall magnetic moment of the first pinned magnetic layer 105 is pinned in the opposite direction of the Y direction.

The second pinned magnetic layer 109 is a composite of a third pinned ferromagnetic sublayer 109a, a second nonmagnetic interlayer 109b, and a fourth pinned ferromagnetic sublayer 109c. The fourth pinned ferromagnetic sublayer 109c is thicker than the third pinned ferromagnetic sublayer 109a.

The magnetic moment of the fourth pinned ferromagnetic sublayer 109c is pinned in the Y direction by an exchange coupling magnetic field with the second antiferromagnetic layer 110, while the third pinned ferromagnetic sublayer 109a is antiferromagnetically coupled with the fourth pinned ferromagnetic sublayer 109c and the magnetic moment of the third pinned ferromagnetic sublayer 109a is pinned in the opposite direction of the Y direction.

Like the first pinned magnetic layer 105, the magnetic moments of the third pinned ferromagnetic sublayer 109a and fourth pinned ferromagnetic sublayer 109c mutually counteract. Since the fourth pinned ferromagnetic sublayer 109c is thicker than the third pinned ferromagnetic sublayer 109a, a small magnetic moment remains in the fourth pinned ferromagnetic sublayer 109c. Thus, the overall magnetic moment of the second pinned magnetic layer 109 is pinned in the Y direction in the drawing.

Accordingly, the first pinned ferromagnetic sublayer 105a and the second pinned ferromagnetic sublayer 105c in the first pinned magnetic layer 105 and the third pinned ferromagnetic sublayer 109a and the fourth pinned ferromagnetic sublayer 109c in the second pinned magnetic layer 109 are antiferromagnetically coupled with each other, and small magnetic moments remain in the second pinned ferromagnetic sublayer 105c and the fourth pinned ferromagnetic sublayer 109c. Accordingly, the first pinned magnetic layer 105 and the second pinned magnetic layer 109 exhibit a synthetic ferrimagnetic state.

Moreover, the magnetic moment of the free magnetic layer 107 is substantially orthogonal to the magnetic moments of the first pinned magnetic layer 105 and the second pinned magnetic layer 109.

As shown in FIG. 35, the magnetic moment of the second pinned ferromagnetic sublayer 105c lying in the vicinity of the free magnetic layer 107 and the magnetic moment of the third pinned ferromagnetic sublayer 109a lying in the vicinity of the free magnetic layer 107 are oriented in the same direction. Thus, the magnetoresistive effect generated by the interaction between the free magnetic layer 107 and the first pinned magnetic layer 105 and the magnetoresistive effect generated by the interaction between the free magnetic layer 107 and the second pinned magnetic layer 109 do not counteract, resulting in a high rate of change in magnetoresistance of the spin-valve thin-film magnetic element 101.

The first, second, third, and fourth pinned ferromagnetic sublayers 105a, 105c, 109a, and 109c, respectively, are composed of a NiFe alloy, elemental Co, a CoNiFe alloy, a CoFe alloy, a CoNi alloy, or the like, and preferably composed of elemental Co. Preferably, the first, second, third, and fourth pinned ferromagnetic sublayers 105a, 105c, 109a, and 109c, respectively, are composed of the same material.

The first nonmagnetic interlayer 105b and the second nonmagnetic interlayer 109b are preferably composed of at least one metal of Ru, Rh, Ir, Cr, Re, and Cu and more preferably Ru.

Each of the first pinned ferromagnetic sublayer 105a and the fourth pinned ferromagnetic sublayer 109c has a thickness in the range of 1 nm to 3 nm. Each of the second pinned ferromagnetic sublayer 105c and the third pinned ferromagnetic sublayer 109a has a thickness in the range of 2 nm to 3 nm. Each of the first nonmagnetic interlayer 105b and the second nonmagnetic interlayer 109b has a thickness in the range of 0.7 nm to 0.9 nm.

Each of the first pinned magnetic layer 105 and the second pinned magnetic layer 109 has two pinned ferromagnetic sublayers (first, second, third, and fourth pinned ferromagnetic sublayers 105a, 105c, 109a, and 109c, respectively). Alternatively, each layer may have three or more pinned ferromagnetic sublayers. In such a case, it is preferable that these pinned ferromagnetic sublayers be separated by nonmagnetic interlayers and the magnetic moments of two adjacent pinned ferromagnetic sublayers be antiparallel to each other so that the overall layer is in a ferrimagnetic state.

Accordingly, the first and second pinned magnetic layers 105 and 109, respectively, exhibit synthetic ferrimagnetism and the magnetic moments thereof are firmly pinned.

The first and second nonmagnetic conductive layers 106 and 108 moderate magnetic coupling between the free magnetic layer 107 and the first pinned magnetic layer 105 and between the free magnetic layer 107 and the second pinned magnetic layer 109, respectively. Furthermore, a sensing current primarily flows in the first and second nonmagnetic conductive layers 106 and 108, respectively. Thus, the first and second nonmagnetic conductive layers 106 and 108, respectively, are preferably composed of a conductive nonmagnetic material, such as Cu, Cr, Au, and Ag, and more preferably composed of Cu. The first and second nonmagnetic conductive layers 106 and 108, respectively, preferably have a thickness in the range of 2 nm to 3 nm.

The first antiferromagnetic layer 104 extends to both sides in the $X_1$ direction compared with the free magnetic layer 107. The insulating layers 130, the hard bias layers 132, the insulating layers 133, and the lead layers 134 are deposited in that order on the extensions 104a of the first antiferromagnetic layer 104.

Bias underlayers 131 composed of Ta, W, or Cr are disposed between the insulating layers 130, which are located on the extensions 104a and side faces 112b of the laminate 112, and the hard bias layers 132. When the hard bias layers 132 composed of Cr are formed on the bias underlayers 131, the hard bias layers 132 have a large coercive force and a large remanence ratio, thus increasing a bias magnetic field which is required for single-domain alignment of the free magnetic layer 107.

The hard bias layers 132 are composed of, for example, a CoPt alloy and are provided at both sides of the laminate 112 in the $X_1$ direction (track width direction). Since the hard bias layers 132 are disposed at both sides of the free magnetic layer 107 in the $X_1$ direction, a bias magnetic field is effectively applied to the free magnetic layer 107, and the magnetic moment of the free magnetic layer 107 are aligned, thus reducing Barkhausen noise.

The side faces 112b of the laminate 112 are covered by the insulating layers 130 which extend from between the hard bias layers 132 and the extensions 104a to between the side faces 112b and the hard bias layers 132.

The hard bias layers 132 are covered by the insulating layers 133 which extend to cover the side faces 112b and both top ends 112a of the laminate 112 in the $X_1$ direction. The insulating layers 133 are joined to the insulating layers 130 at the side faces 112b of the laminate 112. The top ends 112a are adjacent to the hard bias layers 132.

Preferably, the insulating layers 130 and the insulating layers 133 are composed of the same material as that for the insulating layers 30 and the insulating layers 33 in the third embodiment and have the same thickness as that of the insulating layers 30 and the insulating layers 33.

The lead layers 134 are formed on the hard bias layers 132 separated by the insulating layers 133, and extend toward the center of the laminate 112 compared with the insulating layers 133. In other words, the lead layers 134 have overlay sections 134a, and edges 134b thereof extend toward the center of the laminate 112 and are in contact with the laminate 112.

The two lead layers 134 are disposed at a distance Tw in the $X_1$ direction. This distance Tw defines an optical track width of the spin-valve thin-film magnetic element 101.

A preferred width $W_1$ of the overlay sections 134a and a preferred width $W_2$ of the edges 134b are the same as those in the third embodiment.

The lead layers 134 are in contact with the laminate 112 only at the edges 134b thereof and are insulated from the laminate 112 and the hard bias layers 132 by the insulating layers 133 at the other portions.

Thus, a sensing current from one lead layer 134 flows into the laminate 112 only through one edge 134b and then into the other lead layer 134 through the other edge 134b, as shown by arrows J in FIG. 35.

Since the lead layers 134 are insulated from the hard bias layers 132 by the insulating layers 133 and since the hard bias layers 132 are insulated from the side faces 112b of the laminate 112 by the insulating layers 130, the sensing current does not flow through the hard bias layers 132 into the side faces 112b and the top ends 112a.

Moreover, the insulating layers 133 between the overlay sections 134a and the top ends 112a of the laminate 112 prevent leakage of the sensing current therebetween.

Accordingly, in this spin-valve thin-film magnetic element 101, the sensing current is concentrated into the sensitive region S in the center which is not provided with the lead layers 134, like the spin-valve thin-film magnetic element 1 in the third embodiment.

In contrast, in regions covered by the edges 134b of the lead layers 134 and the insulating layers 133, the sensing current is low. These regions exhibit a poor MR effect and thus low detection sensitivity to the leakage magnetic field. In particular, the sensing current does not flow into the top ends 112a covered by the insulating layers 133, and the these top ends 112a do not have sensitivity to the leakage magnetic field from the magnetic recording medium. These regions are referred to as insensitive regions N, as shown in FIG. 35.

As described above, the laminate 112 is divided into the sensitive region S, which contributes to reading the recording magnetic field from the magnetic recording medium, and the insensitive regions N, which does not contribute to reading the recording magnetic field. Since the width Tw of the sensitive region S corresponds to the track width, the track width of the spin-valve thin-film magnetic element 101 can be reduced.

Moreover, the sensitive region S of the laminate 112 is distant from the hard bias layers 132; hence, the sensitive region S is not pinned by a strong bias magnetic field, resulting in improved output characteristics of the spin-valve thin-film magnetic element 101.

Since the insulating layers 133 and the insulating layers 130 prevent the sensing current from flowing in the top ends 112a of the laminate 112, the top ends 112a do not exhibit an MR effect. Thus, the spin-valve thin-film magnetic element 101 does not generate side reading.

Additionally, although the insulating layers 133 extend over the side faces 112b and the top ends 112a in the spin-valve thin-film magnetic element 101 in this embodiment, the insulating layers 130 may be formed to extend to the top ends 112a, like the insulating layers 30 shown in FIG. 20.

In a method for making the above-mentioned spin-valve thin-film magnetic element 101, the first antiferromagnetic layer 104, the first pinned ferromagnetic sublayer 105a, the first nonmagnetic interlayer 105b, the second pinned ferromagnetic sublayer 105c, the first nonmagnetic conductive layer 106, the first antidiffusion sublayer 107a, the free ferromagnetic sublayer 107b, the second antidiffusion sublayer 107c, the second nonmagnetic conductive layer 108, the third pinned ferromagnetic sublayer 109a, the second nonmagnetic interlayer 109b, the fourth pinned ferromagnetic sublayer 109c, the second antiferromagnetic layer 110, and the protective layer 111 are deposited in that order in the laminate forming step. The other steps are the same as those in the third embodiment. That is, the spin-valve thin-film magnetic element 101 according to the fourth embodiment can also be made by any one of the two methods described in the third embodiment.

The present invention may have any modification of the above embodiments.

For example, in the third embodiment, the free magnetic layer 7 may have a ferromagnetic single-layer structure or a ferromagnetic-antidiffusion double-layer structure, in place of the ferromagnetic-nonmagnetic-ferromagnetic triple-layer structure. Similarly, the pinned magnetic layer 5 may have a ferromagnetic single-layer structure.

In the third embodiment, the free magnetic layer 7 and the protective layer 8 may be separated by a back layer. The back layer extends the mean free path of spin-up conduction electrons and thus increases the rate of change in resistance of the magnetoresistive element.

In the third embodiment, the laminate 9 may have a top-type single spin-valve configuration in which the antiferromagnetic layer lies at a position distant from the lower insulating layer (substrate) rather than the free magnetic layer. In the top-type configuration, for example, the underlayer, the free magnetic layer, the nonmagnetic conductive layer, the pinned magnetic layer, the antiferromagnetic layer, and the protective layer may be deposited in that order.

In the fourth embodiment, the free magnetic layer 107 may be a composite of two free ferromagnetic layers separated by a nonmagnetic conductive layer. These free ferromagnetic layers are antiferromagnetically coupled.

The first pinned magnetic layer 105 and/or the second pinned magnetic layer 109 may have a ferromagnetic single-layer structure.

In the individual embodiments, the bias underlayers 31 or 131 may be omitted, and in such a case, the hard bias layers may be composed of a laminate including a FeCo film and a CoPt film.

In the spin-valve thin-film magnetic element according to the third or fourth embodiment, the magnetic moment of the pinned magnetic layer may be pinned by a sensing current magnetic field which is generated by the sensing current, in place of the antiferromagnetic layer.

What is claimed is:

1. A spin-valve thin-film magnetic element comprising:
   a laminate comprising at least a free magnetic layer and a pinned magnetic layer and exhibiting a magnetoresistive effect;
   a pair of hard bias layers lying at least on both sides of the free magnetic layer in the track width direction and orienting the magnetic moment of the free magnetic layer in one direction;
   a pair of insulating layers extending over the hard bias layers and both top ends of the laminate in the track width direction; and
   a pair of lead layers extending on said pair of insulating layers,
   wherein said pair of lead layers have overlay sections which extend towards the center of the laminate and edges of the overlay sections extend beyond ends of the insulating layers towards the center of the laminate, the edges of the overlay sections being in contact with the laminate, surfaces of portions of the laminate in contact with the edges of the overlay sections being recessed.

2. A spin-valve thin-film magnetic element according to claim 1, wherein the width of the edge of each of the overlay sections in the track width direction is in the range of 0.01 µm to 0.05 µm.

3. A spin-valve thin-film magnetic element according to claim 1, wherein the insulating layers comprise at least one oxide selected from the group consisting of aluminum oxide, silicon oxide, tantalum oxide, titanium oxide, zirconium oxide, hafnium oxide, chromium oxide, vanadium oxide, and niobium oxide.

4. A spin-valve thin-film magnetic element according to claim 1, wherein each of the insulating layers has a thickness in the range of 0.5 nm to 20 nm.

5. A spin-valve thin-film magnetic element according to claim 1, wherein each of the overlay sections has a width in the range of 0.1 µm to 0.3 µm in the track width direction.

6. A spin-valve thin-film magnetic element according to claim 1, wherein the laminate comprises the free magnetic layer, a nonmagnetic conductive layer, and an antiferromagnetic layer, for pinning the magnetic moment of the pinned magnetic layer by an exchange coupling magnetic field, which are deposited in that order.

7. A spin-valve thin-film magnetic element according to claim 1, wherein the laminate comprises a nonmagnetic conductive layer, the pinned magnetic layer, and an antiferromagnetic layer, for pinning the magnetic moment of the pinned magnetic layer by an exchange coupling magnetic field, which are deposited, in that order, on each of the two sides of the free magnetic layer in the thickness direction.

8. A thin-film magnetic head comprising a spin-valve thin-film magnetic element according to claim 1, the spin-valve thin-film magnetic element functioning as a read element for magnetically recorded information.

9. A thin-film magnetic head according to claim 8, wherein the width of the edge of each of the overlay sections in the track width direction is in the range of 0.01 µm to 0.05 µm.

10. A thin-film magnetic head according to claim 8, wherein the insulating layers comprise at least one oxide selected from the group consisting of aluminum oxide, silicon oxide, tantalum oxide, titanium oxide, zirconium oxide, hafnium oxide, chromium oxide, vanadium oxide, and niobium oxide.

11. A thin-film magnetic head according to claim 8, wherein each of the insulating layers has a thickness in the range of 0.5 nm to 20 nm.

12. A thin-film magnetic head according to claim 8, wherein each of the overlay sections has a width-in the range of 0.1 µm to 0.3 µm in the track width direction.

13. A thin-film magnetic head according to claim 8, wherein the laminate comprises the free magnetic layer, a nonmagnetic conductive layer, and an antiferromagnetic layer for pinning the magnetic moment of the pinned magnetic layer by an exchange coupling magnetic field which are deposited in that order.

14. A thin-film magnetic head according to claim 8, wherein the laminate comprises a nonmagnetic conductive layer, the pinned magnetic layer, and an antiferromagnetic layer for pinning the magnetic moment of the pinned magnetic layer by an exchange coupling magnetic field are deposited, in that order, on each of the two sides of the free magnetic layer in the thickness direction.

15. A floating magnetic head comprising a slider and a thin-film magnetic head which is provided on one side face of the slider, the thin-film magnetic head comprising a spin-valve thin-film magnetic element according to claim 1, the spin-valve thin-film magnetic element functioning as a read element for magnetically recorder information.

16. A floating magnetic head according to claim 15, wherein the width of the edge of each of the overlay sections in the track width direction is in the range of 0.01 µm to 0.05 µm.

17. A floating magnetic head according to claim 15, wherein the insulating layers comprise at least one oxide selected from the group consisting of aluminum oxide, silicon oxide, tantalum oxide, titanium oxide, zirconium oxide, hafnium oxide, chromium oxide, vanadium oxide, and niobium oxide.

18. A floating magnetic head according to claim 15, wherein each of the insulating layers has a thickness in the range of 0.5 nm to 20 nm.

19. A floating magnetic head according to claim 15, wherein each of the overlay sections has a width in the range of 0.1 µm to 0.3 µm in the track width direction.

20. A floating magnetic head according to claim 15, wherein the laminate comprises the free magnetic layer, a nonmagnetic conductive layer, and an antiferromagnetic layer for pinning the magnetic moment of the pinned magnetic layer by an exchange coupling magnetic field which are deposited in that order.

21. A floating magnetic head according to claim 15, wherein the laminate comprises a nonmagnetic conductive layer, the pinned magnetic layer, and an antiferromagnetic layer for pinning the magnetic moment of the pinned magnetic layer by an exchange coupling magnetic field are deposited, in that order, on each of the two sides of the free magnetic layer in the thickness direction.

22. A spin-valve thin-film magnetic element comprising:

a substrate;

a laminate on the substrate, the laminate comprising at least a free magnetic layer and a pinned magnetic layer and exhibiting a magnetoresistive effect;

a pair of hard bias layers lying at least on both sides of the free magnetic layer in the track width direction and orienting the magnetic moment of the free magnetic layer in one direction;

a pair of lead layers lying at least on the hard bias layers; and a pair of insulating layers, each lying at least between one side face of the laminate in the track width direction and each lead layer, wherein the pair of lead layers have overlay sections which extend on top ends of the laminate, edges of the overlay sections extending beyond ends of the insulating layers towards the center of the laminate, the edges of the overlay sections being in contact with the laminate, surfaces of portions of the laminate in contact with the edges of the overlay sections being recessed.

23. A thin-film magnetic head according to claim 22, wherein each of the insulating layers has a thickness in the range of 0.5 nm to 5 nm at the side faces of the laminate.

24. A thin-film magnetic head according to claim 22, wherein the insulating layers comprise at least one oxide selected from the group consisting of aluminum oxide, silicon oxide, tantalum oxide, titanium oxide, zirconium oxide, hafnium oxide, chromium oxide, vanadium oxide, and niobium oxide.

25. A thin-film magnetic head according to claim 22, wherein the insulating layers further extend between the hard bias layers and the substrate.

26. A spin-valve thin-film magnetic element according to claim 25, wherein the hard bias layers and the insulating layers are separated by bias underlayers.

* * * * *